US010361455B2

(12) United States Patent
Allenic et al.

(10) Patent No.: US 10,361,455 B2
(45) Date of Patent: *Jul. 23, 2019

(54) ANNEALED GARNET ELECTROLYTE SEPARATORS

(71) Applicant: QuantumScape Corporation, San Jose, CA (US)

(72) Inventors: Arnold Allenic, San Jose, CA (US); Cheng-Chieh Chao, San Jose, CA (US); Lei Cheng, San Jose, CA (US); Niall Donnelly, Malvern, PA (US); Will Gardner, Concord, MA (US); Tim Holme, Mountain View, CA (US); Sriram Iyer, Cupertino, CA (US); Shuang Li, Sunnyvale, CA (US)

(73) Assignee: QuantumScape Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/908,732

(22) Filed: Feb. 28, 2018

(65) Prior Publication Data

US 2018/0191028 A1 Jul. 5, 2018

Related U.S. Application Data

(63) Continuation of application No. 15/007,908, filed on Jan. 27, 2016, now Pat. No. 9,966,630.

(51) Int. Cl.
*H01M 2/14* (2006.01)
*H01M 10/0565* (2010.01)
(Continued)

(52) U.S. Cl.
CPC ..... *H01M 10/0562* (2013.01); *C04B 35/4885* (2013.01); *C04B 35/62218* (2013.01);
(Continued)

(58) Field of Classification Search
CPC ......... H01M 10/0562; H01M 10/0565; H01M 2/145
See application file for complete search history.

(56) References Cited

U.S. PATENT DOCUMENTS 4,259,061 A 3/1981 Dubetsky
4,340,436 A 7/1982 Dubetsky et al.
(Continued)

FOREIGN PATENT DOCUMENTS

CN 1746757 3/2006
CN 101518164 8/2009
(Continued)

OTHER PUBLICATIONS

Fu et al., "Stabilizing the Garnet Solid-Electrolyte/Polysulfide Interface in Li—S Batteries", Chemistry of Materials, vol. 29, No. 19, Sep. 26, 2017, pp. 8037-8041.
(Continued)

*Primary Examiner* — Stewart A Fraser
(74) *Attorney, Agent, or Firm* — Squire Patton Boggs (US) LLP

(57) ABSTRACT

Set forth herein are pellets, thin films, and monoliths of lithium-stuffed garnet electrolytes having engineered surfaces. These engineered surfaces have a list of advantageous properties including, but not limited to, low surface area resistance, high Li$^+$ ion conductivity, low tendency for lithium dendrites to form within or thereupon when the electrolytes are used in an electrochemical cell. Other advantages include voltage stability and long cycle life when used in electrochemical cells as a separator or a membrane between the positive and negative electrodes. Also set forth herein are methods of making these electrolytes including, but not limited to, methods of annealing these electrolytes under controlled atmosphere conditions. Set forth herein, additionally, are methods of using these electrolytes in electrochemical cells and devices. The instant disclosure further includes electrochemical cells which incorporate the lithium-stuffed garnet electrolytes set forth herein.

47 Claims, 15 Drawing Sheets

(51) Int. Cl.
*H01M 10/0562* (2010.01)
*H01M 10/052* (2010.01)
*H01M 10/056* (2010.01)
*H01M 10/058* (2010.01)
*C04B 35/488* (2006.01)
*C04B 35/622* (2006.01)

(52) U.S. Cl.
CPC ......... *H01M 2/145* (2013.01); *H01M 10/052* (2013.01); *H01M 10/056* (2013.01); *H01M 10/058* (2013.01); *H01M 10/0565* (2013.01); *C04B 2235/3203* (2013.01); *C04B 2235/3227* (2013.01); *C04B 2235/6025* (2013.01); *C04B 2235/6567* (2013.01); *C04B 2235/764* (2013.01)

(56) References Cited

U.S. PATENT DOCUMENTS

| | | |
|---|---|---|
| 4,492,783 A | 1/1985 | Tanaka et al. |
| 5,014,763 A | 5/1991 | Frank |
| 5,130,067 A | 7/1992 | Flaitz et al. |
| 5,256,242 A | 10/1993 | Imaeda et al. |
| 5,279,994 A | 1/1994 | Kerkar |
| 5,296,318 A | 3/1994 | Gozdz et al. |
| 5,456,000 A | 10/1995 | Gozdz et al. |
| 5,460,904 A | 10/1995 | Gozdz et al. |
| 5,620,637 A | 4/1997 | Kaga et al. |
| 5,874,162 A | 2/1999 | Bastian et al. |
| 5,922,493 A | 7/1999 | Humphrey, Jr. et al. |
| 6,277,524 B1 | 8/2001 | Kanno |
| 6,306,535 B1 | 10/2001 | Tomimatsu et al. |
| 6,322,923 B1 | 11/2001 | Spotnitz et al. |
| 6,447,712 B1 | 9/2002 | Dogan et al. |
| 6,656,641 B1 | 12/2003 | Kumar |
| 6,852,138 B1 | 2/2005 | Topsoe et al. |
| 6,863,862 B2 | 3/2005 | Rasouli et al. |
| 6,924,065 B2 | 8/2005 | Noh |
| 7,108,827 B1 | 9/2006 | Hata et al. |
| 7,736,810 B2 | 6/2010 | Noh |
| 7,794,557 B2 | 9/2010 | Hui et al. |
| 7,901,658 B2 | 3/2011 | Weppner et al. |
| 7,923,149 B2 | 4/2011 | Hwang et al. |
| 8,092,941 B2 | 1/2012 | Weppner et al. |
| 8,268,488 B2 | 9/2012 | Neudecker |
| 8,283,843 B2 | 10/2012 | Pan et al. |
| 8,309,258 B2 | 11/2012 | Kanamura et al. |
| 8,329,605 B2 | 12/2012 | Bernard-Granger et al. |
| 8,431,287 B2 | 4/2013 | Teramoto |
| 8,658,317 B2 | 2/2014 | Weppner et al. |
| 8,697,292 B2 | 4/2014 | Kanno et al. |
| 8,828,580 B2 | 9/2014 | Visco et al. |
| 8,865,355 B2 | 10/2014 | Iriyama et al. |
| 8,877,388 B1 | 11/2014 | Ihlefeld et al. |
| 8,940,446 B1 | 1/2015 | Holme et al. |
| 9,034,526 B2 | 5/2015 | Teshima et al. |
| 9,093,717 B2 | 7/2015 | Sakamoto et al. |
| 2002/0054419 A1 | 5/2002 | Beteille et al. |
| 2003/0049499 A1 | 3/2003 | Murakawa et al. |
| 2003/0072870 A1 | 4/2003 | Brandle et al. |
| 2003/0148179 A1 | 8/2003 | Uyama et al. |
| 2004/0191617 A1 | 9/2004 | Visco et al. |
| 2005/0016839 A1 | 1/2005 | Horne et al. |
| 2006/0197245 A1 | 9/2006 | Cheng et al. |
| 2007/0015061 A1 | 1/2007 | Klaassen |
| 2007/0148553 A1 | 6/2007 | Weppner et al. |
| 2007/0231704 A1 | 10/2007 | Inda |
| 2008/0145751 A1 | 6/2008 | Ogumi et al. |
| 2009/0162755 A1 | 6/2009 | Neudecker |
| 2009/0194222 A1 | 8/2009 | Teramoto |
| 2009/0197172 A1 | 8/2009 | Inda |
| 2009/0226790 A1 | 9/2009 | Kanamura et al. |
| 2009/0301769 A1 | 12/2009 | Seppa et al. |
| 2009/0311567 A1 | 12/2009 | Visco et al. |
| 2009/0317724 A1 | 12/2009 | Kumar et al. |
| 2010/0047696 A1 | 2/2010 | Yoshida et al. |
| 2010/0203383 A1 | 8/2010 | Weppner et al. |
| 2011/0045355 A1 | 2/2011 | Ichikawa et al. |
| 2011/0052972 A1 | 3/2011 | Sohn |
| 2011/0053000 A1 | 3/2011 | Kanamura et al. |
| 2011/0053001 A1 | 3/2011 | Babic et al. |
| 2011/0053002 A1 | 3/2011 | Yamamura et al. |
| 2011/0133136 A1 | 6/2011 | Weppner et al. |
| 2011/0223487 A1 | 9/2011 | Johnson et al. |
| 2011/0244337 A1 | 10/2011 | Ohta et al. |
| 2011/0262796 A1 | 10/2011 | Shimooka et al. |
| 2011/0281175 A1 | 11/2011 | Hudson et al. |
| 2012/0196189 A1 | 8/2012 | Babic et al. |
| 2012/0237834 A1 | 9/2012 | Ogasa |
| 2012/0276439 A1 | 11/2012 | Fujita et al. |
| 2013/0085055 A1 | 4/2013 | Raj et al. |
| 2013/0122380 A1 | 5/2013 | Visco et al. |
| 2013/0177811 A1 | 7/2013 | Roffat et al. |
| 2013/0189562 A1 | 7/2013 | Dolle et al. |
| 2013/0216783 A1 | 8/2013 | Duan et al. |
| 2013/0230778 A1 | 9/2013 | Saimen et al. |
| 2013/0260257 A1 | 10/2013 | Choi |
| 2013/0288875 A1 | 10/2013 | Miyagawa et al. |
| 2013/0344416 A1 | 12/2013 | Sakamoto et al. |
| 2014/0057153 A1 | 2/2014 | Visco et al. |
| 2014/0060723 A1 | 3/2014 | Herle et al. |
| 2014/0072870 A1 | 3/2014 | Otsuka et al. |
| 2014/0093785 A1 | 4/2014 | Sugiura et al. |
| 2014/0099538 A1 | 4/2014 | Johnson et al. |
| 2014/0120409 A1 | 5/2014 | Ouchi et al. |
| 2014/0120421 A1 | 5/2014 | Ouchi et al. |
| 2014/0134483 A1 | 5/2014 | Ouchi et al. |
| 2014/0162113 A1 | 6/2014 | Ohta et al. |
| 2014/0170504 A1 | 6/2014 | Baek et al. |
| 2014/0186720 A1 | 7/2014 | Kintaka |
| 2014/0193695 A1 | 7/2014 | Hoshina et al. |
| 2014/0205910 A1 | 7/2014 | Weppner et al. |
| 2014/0287305 A1 | 9/2014 | Wachsman et al. |
| 2014/0295287 A1 | 10/2014 | Eisele et al. |
| 2014/0377665 A1 | 12/2014 | Yoshida et al. |
| 2015/0015542 A1 | 1/2015 | Hou |
| 2015/0024292 A1 | 1/2015 | Yamada et al. |
| 2015/0037688 A1 | 2/2015 | Otsuka et al. |
| 2015/0044576 A1 | 2/2015 | Eisele et al. |
| 2015/0056520 A1 | 2/2015 | Thokchom et al. |
| 2015/0099188 A1 | 4/2015 | Holme et al. |
| 2015/0099190 A1 | 4/2015 | Holme et al. |
| 2015/0130115 A1 | 5/2015 | Sung et al. |
| 2015/0180001 A1 | 6/2015 | Johnson et al. |
| 2015/0200420 A1 | 7/2015 | Holme et al. |
| 2015/0243974 A1 | 8/2015 | Holme et al. |
| 2015/0295274 A1 | 10/2015 | Engel et al. |
| 2015/0333307 A1 | 11/2015 | Thokchom et al. |
| 2016/0056500 A1 | 2/2016 | Holme et al. |
| 2016/0087321 A1 | 3/2016 | Wöhrle et al. |
| 2016/0111751 A1 | 4/2016 | Badding et al. |
| 2016/0149260 A1 | 5/2016 | Badding et al. |
| 2016/0190639 A1 | 6/2016 | Sung et al. |
| 2016/0204466 A1 | 7/2016 | Nogami et al. |
| 2016/0211547 A1 | 7/2016 | Hwang et al. |
| 2016/0240887 A1 | 8/2016 | Hatta et al. |
| 2016/0244665 A1 | 8/2016 | Vosgroene et al. |
| 2016/0293988 A1 | 10/2016 | Sakamoto et al. |
| 2016/0308243 A1 | 10/2016 | Herle et al. |
| 2016/0308244 A1 | 10/2016 | Badding et al. |
| 2017/0005367 A1 | 1/2017 | Van Berkel et al. |
| 2017/0054139 A1 | 2/2017 | Kerkamm |
| 2017/0162901 A1 | 6/2017 | Chen et al. |
| 2017/0214048 A1 | 7/2017 | Qian et al. |

FOREIGN PATENT DOCUMENTS

| | | |
|---|---|---|
| CN | 102010183 | 4/2011 |
| CN | 102280659 A | 12/2011 |
| CN | 103117413 | 5/2013 |
| JP | 2000-128629 | 5/2000 |
| JP | 2004-63261 | 2/2004 |
| JP | 2006-8488 | 1/2006 |
| JP | 2012224520 A | 11/2012 |

(56) References Cited

FOREIGN PATENT DOCUMENTS

| JP | 2012-243743 | 12/2012 |
| --- | --- | --- |
| JP | 2013-107779 A | 6/2013 |
| JP | 2013-134852 | 7/2013 |
| JP | 2013-214421 | 10/2013 |
| JP | 2015-130481 A | 7/2015 |
| JP | 2015-215998 | 12/2015 |
| WO | WO 2011/038773 | 4/2011 |
| WO | WO 2012/114175 | 8/2012 |
| WO | WO 2013/010692 | 1/2013 |
| WO | WO 2013/128769 | 9/2013 |
| WO | WO 2015/054320 | 4/2015 |
| WO | WO 2015/076944 | 5/2015 |
| WO | WO 2016/069749 | 5/2016 |
| WO | WO 2017/197406 A1 | 11/2017 |
| WO | WO 2018/075972 A1 | 4/2018 |

OTHER PUBLICATIONS

Fu et al., "Toward Garnet Electrolyte-based Li Metal Batteries: An ultrathin, highly effective, artificial solid-state electrolyte/metallic Li interface", Science Advances, vol. 3, No. 4, Apr. 7, 2017, pp. 1-11.
Agrawal et al., "Solid polymer electrolytes: materials designing and all-solid-state battery applications: an overview", Journal of Physics D: Applied Physics 41, 2008, 223001, 18 pages.
Ahmad et al., "Concentration and mobility of mobile $Li^+$ ions in $Li_6BaLa_2Ta_2O_{12}$ and $Li_5La_3Ta_2O_{12}$ garnet lithium ion conductors," J Mater Sci: Mater Electron, 2015, vol. 26, pp. 8136-8142.
Ahmad, Mohamad M., "Lithium ionic conduction and relaxation dynamics of spark plasma sintered $Li_5La_3Ta_2O_{12}$ garnet nanoceramics," Ahmad Nanoscale Research Letters, 2015, 10:58, 10 pages.
Ahn et al., "Local impedance spectroscopic and microstructural analyses of Al-in-diffused $Li_7La_3Zr_2O_{12}$," Journal of Power Sources, 2014, vol. 254, pp. 287-292.
Allen et al., "Effect of substitution (Ta, Al, Ga) on the conductivity of $Li_7La_3Zr_2O_{12}$", issued on Journal of Power Sources 2012, vol. 206, pp. 315-319.
Arora et al., "Battery Separators", Chemical Reviews, 2004, vol. 104, pp. 4419-4462.
Baek et al., "Garnet related lithium ion conductor processed by spark plasma sintering for all solid state batteries," Journal of Power Sources, 2014, vol. 249, pp. 197-206.
Baggetto et al., "High Energy Density All-Solid-State Batteries: A Challenging Concept Towards 3D Integration", Advanced Functional Materials, 2008, vol. 18, pp. 1057-1066.
Bernuy-Lopez et al., "Atmosphere Controlled Processing of Ga-Substituted Garnets for High Li-Ion Conductivity Ceramics," Chem. Mater. 2014, vol. 26, pp. 3610-3617.
Bonderer et al., "Free-Standing Ultrathin Ceramic Foils," Journal of the American Ceramic Society, 2010, vol. 93, No. 11, pp. 3624-3631.
Bruce et al.,"$Li-O_2$ and Li—S batteries with high energy storage", Nature Materials, Jan. 2012, vol. 11, pp. 19-29.
Buschmann et al. "Lithium metal electrode kinetics and ionic conductivity of the solid lithium ion conductors $Li_7La_3Zr_2O_{12}$ and $Li_7La_3Zr_2Ta_xO_{12}$with garnet-type strucutre," Journal of Power Sources, 2012, vol. 206, pp. 236-244.
Buschmann et al., "Structure and dynamics of the fast lithium ion conductor :$Li_7La_3Zr_2O_{12}$," Phys. Chem. Chem. Phys., 2011, vol. 13, pp. 19378-19392.
Cao et al., "Effect of Sb—Ba codoping on the ionic conductivity of $Li_7La_3Zr_2O_{12}$ ceramic," Ceramics International, 2015, vol. 41, pp. 6232-6236.
Chen et al., "Origin of High Li+ Conduction in Doped $Li_7La_3Zr_2O_{12}$ Garnets," Chemistry of Materials, 2015, vol. 27, pp. 5491-5494.
Chen et al., "Sol-gel derived Li—La—Zr—O thin films as solid electrolytes for lithium-ion batteries", Journal of Materials Chemistry A, 2014, vol. 2, pp. 13277-13282.

Cheng et al., "Effect of microstructure and surface impurity segregation on the electrical and electrochemical properties of dense Al-substituted $Li_7La_3Zr_2O_{12}$," J. Mater. Chem. A, 2014, vol. 2, pp. 172-181.
Cheng et al., "Effect of Surface Microstructure on Electrochemical Performance of Garnet Solid Electrolytes," ACS Appl. Mater. Interfaces, 2015, vol. 7, pp. 2073-2081.
Cheng et al., "Interrelationships among Grain Size, Surface Composition Air Stability, and Interfacial Resistance of Al-Substitued $Li_7La_3Zr_2O_{12}$ Solid Electrolytes," ACS Appl. Mater. Interfaces, 2015, vol. 7, pp. 17649-17655.
Cheng et al., "The origin of high electrolyte-electrode interfacial resistances in lithium cells containing garnet type solid electrolytes," Phys. Chem. Chem. Phys., 2014, vol. 16, pp. 18294-18300.
David et al., "Microstructure and Li-Ion Conductivity of Hot-Pressed Cubic $Li_7La_3Zr_2O_{12}$," J. Am. Cerami. Soc., 2015, pp. 1-6.
Deng et al., "Effect of the morphology of Li—La—Zr—O Solid electrolyte coating on the electrochemical performance of spinel $LiMn_{1.95}Ni_{0.05}O_{3.98}F_{0.02}$ cathode materials," J. Mater. Chem. A, 2014, vol. 2, pp. 18889-18897.
Dhivya et al., "Effect of Simultaneous Substitution of Y and Ta on the Stabilization of Cubic Phase, Microstructure, and $Li^+$ Conductivity of $Li_7La_3Zr_2O_{12}$ Lithium Garnet," ACS Appl. Mater. Interfaces, 2014, vol. 6, pp. 17606-17615.
Dhivya et al., "$Li^+$ transport properties of W substituted $Li_7La_3Zr_2O_{12}$ cubic lithium garnets," AIP Advances, 2013, vol. 3, pp. 082115.1-082115.21, 22 pages.
Djenadic, Ruzica et al., "Nebulized spray pyrolysis of Al-doped $Li_7La_3Zr_2O_{12}$ solid electrolyte for battery applications," Solid State Ionics, 2014, vol. 263, pp. 49-56.
Dong et al., "Electrochemical perofmrance and lithium-ion insertion/extraction mechanism studies of the novel $Li_2ZrO_3$ anode materials," Electrochimica Acta, 2015, vol. 161, pp. 219-225.
Duvel, Andre, et al., "Mechanosynthesis of Solid Electrolytes: Preparation, Characterization, and Li Ion Transport Properties of Garnet-Type Al-Doped $Li_7La_3Zr_2O_{12}$ Crystallizing with Cubic Symmetry," The Journal of Physical Chemistry, 2012, vol. 116, pp. 15192-15202.
Extended European Search Report dated Feb. 22, 2017 for European application No. 14864783.7; 9 pages.
Ferrese et al., "Lithium Redistribution in Lithium-Metal Batteries", Journal of the Electrochemical Society, 159, 2012, pp. A1615-A1623.
Fries, R. et al., "Fabrication and properties of an anisotropic PZT/Polymer 0-3 composite," J. Mater. Sci.: Mater. in Electronics, 1994, vol. 5, pp. 238-243.
Geiger, Charles, A., et al., "Crystal Chemistry and Stability of "$Li_7La_3Zr_2O_2$" Garnet: A Fast Lithium-Ion Conductor," Inorganic Chemistry, 2011, vol. 50, pp. 1089-1097.
Goodenough, John, B., "Solid Electrolytes for Next Generation Batteries," Texas Materials Institute, The University of Texas at Austin, May 14-18, 2012, DOE Vehicle Technologies Annual Merit Review Meeting, 18 pages.
Gorte et al., "Anodes for Direct Oxidation of Dry Hydrocarbons in a Solid-Oxide Fuel Cell", Advanced Materials, 2000, vol. 12, No. 19, pp. 1465-1469.
Gu et al., "Effects of penta-and trivalent dopants on structures and conductivity $Li_7La_3Zr_2O_{12}$," Solid State Ionics, 2015, vol. 274, pp. 100-105.
Han et a., "Experimental visualization of lithium conduction pathways in garnet-type $Li_7La_3Zr_2O_{12}$," Chem. Commun., 2012, vol. 48, pp. 9840-9842.
Hayashi et al., "New Phases in $La_2O_3-Li_2O-Ta_2O_5$ System," Mat. Res. Bull. 1986, vol. 21, No. 3, pp. 289-293.
Herrmann et al., "Micro-segregation in liquid phase sintered silicon carbide ceramics," Journal of the European Ceramic Society, 2010, vol. 30, pp. 1495-1501.
Hitz et al., "Highly Li-Stuffed Garnet-Type $Li_{7+x}La_3Zr_{2-x}Y_xO_{12}$," Journal of the Electrochemical Society, 2013, vol. 160, No. 8, pp. A1248-A1255.
Hyooma et al.,"Crystal Structures of $La_3Li_5M_2O_{12}$ (M=Nb, Ta)," Mat. Res. Bull. 1988, vol. 23, No. 10, pp. 1399-1407.

(56) References Cited

OTHER PUBLICATIONS

International Search Report and Written Opinion dated Apr. 15, 2016 in PCT/US2016/015209, 14 pages.
International Search Report and Written Opinion dated Dec. 1, 2016 in PCT/2016/043428, 11 pages.
International Search Report and Written Opinion dated Mar. 10, 2015 in PCT/US2014/059578, 15 pages.
International Search Report and Written Opinion dated Mar. 23, 2015 in PCT/US2014/059575, 16 pages.
Ishiguro et al., "Stability of Nb-Doped Cubic $Li_7La_3Zr_2O_2$ with Lithium Metal," Journal of the Electrochemical Society, 2013, vol. 160, No. 10, pp. A1690-A1693.
Ito, Seitaro et al., "A rocking chair type all-solid-state lithium ion battery adopting $Li_2O$—$ZrO_2$ coated $LiNi_{0.8}Co_{0.15}Al_{0.05}O_2$ and a sulfide based electrolyte," Journal of Power Sources, 248, 2014, pp. 943-950.
Jalem et al., "Effects of Gallium doping in Garnet-Type $Li_7La_3Zr_2O_{12}$ Solid Electrolytes," Chemistry of Materials, 2015, vol. 27, pp. 2821-2831.
Jalem et al., "Insights into the Lithium-Ion Conduction Mechanism of Garnet-Type Cubic $Li_5La_3Ta_2O_{12}$ by ab-Initio Calculations," J. Phys. Chem. C 2015, vol. 119, pp. 20783-20791.
Janani et al., "Influence of sintering additives on densification and $Li^+$ conductivity of Al doped $Li_7La_3Zr_2O_{12}$ lithium garnet," RSC Adv. 2014, vol. 4, pp. 51228-51238.
Janani et al., "Optimization of Lithium Content and Sintering Aid for Maximized $Li^+$ Conductivity and Density in Ta-Doped $Li_7La_3Zr_2O_{12}$," J. Am. Ceram. Soc., 2015, pp. 1-8; DOI: 10.1111/jace.13578.
Jin et al., "Al-doped $Li_7La_3Zr_2O_2$ synthesized by a polymerized complex method," Journal of Power Sources, 2011, vol. 196, pp. 8683-8687.
Jung et al., "Ceramic separators based on $Li^+$-conducting inorganic electrolyte for high-performance lithium-ion batteries with enhanced safety," Journal of Power Sources, 2015, vol. 293, pp. 675-683.
Kang et al., "First-Principles Study of Chemical Stability of Lithium Oxide Garnets $Li_7La_3M_2O_{12}$ (M=Zr, Sn, or Hf)," The Journal of Physical Chemistry C, 2014, vol. 118, pp. 17402-17406.
Kato et al., "Preparation of thick-film electrode-solid electrolyte composites on $Li_7La_3Zr_2O_{12}$ and their electrochemical properties," Journal of Power Sources, 303, 2016, pp. 65-72.
Katsui et al., "Preparation of cubic and tetragonal $Li_7La_3Zr_2O_{12}$ flim by metal organic chemical vapor deposition," Thin Solid Films, vol. 584, Jun. 2015, pp. 130-134.
Kc et al., "Point defects in garnet-type solid electrolyte (c-$Li_7La_3Zr_2O_{12}$) for Li-ion batteries," Solid State Ionics, 2014, vol. 261, pp. 100-105.
Kerman et al., "Complex oxide nanomembranes for energy conversion and storage: A review", Journal of Materials Research, vol. 29, No. 3, Feb. 14, 2014, pp. 320-337.
Kihira et al., "Effect of Simultaneous Substitution of Alkali Metals and Nb in $Li_7La_3Zr_2O_{12}$ on Lithium-Ion Conductivity," ECS Electrochemistry Letters, 2013, vol. 2, No. 7, pp. A56-A59.
Kim et al., "Characterization of the interface between $LiCoO_2$ and $Li_7La_3Zr_2O_{12}$ in an all-solid-state rechargeable lithium battery," Journal of Power Sources, 196, 2011, pp. 764-767.
Kim et al., "Epitaxial growth and lithium ion conductivity of lithium-oxide garnet for an all solid-state battery electrolyte†", Dalton Transactions, 2013, vol. 42, pp. 13112-13117.
Kim et al., "The Effect of Relative Density on the Mechanical Properties of Hot-Pressed Cubic $Li_7La_3Zr_2O_{12}$," J. Am. Ceram. Soc., 2016, pp. 1-8.
Klenk et al., "Local structure and dyanmics of lithium garnet ionic conductors: tetragonal and cubic $Li_7La_3Zr_2O_7$," Phys. Chem. Chem. Phys., 2015, vol. 17, pp. 8758-8768.
Kokal et al., "Preparation and characterization of three dimensionally ordered macroporous $Li_5La_3Ta_2O_{12}$ by colloidal crystal templating for all-solid-state lithium-ion batteries," Ceramics International, 2015, vol. 41, pp. 737-741.

Kokal et al., "Sol-gel synthesis and lithium ion conductivity of $Li_7La_3Zr_2O_{12}$ with garnet-related type structure," Solid State Ionics, 2011, vol. 185, pp. 42-46.
Kong et al., "Transparent Ceramics, Topics in Mining," Springer International Publishing Switzerland, 2015, pp. 29-91.
Kotobuki et al., "Compatibility of $Li_7La_3Zr_2O_{12}$ Solid Electrolyte to All-Solid-State Battery Using Li Metal Anode," Journal of the Electrochemical Society, 2010, vol. 157, No. 10, pp. A1076-A1079.
Kotobuki et al., "Preparation of Sintered $Li_5La_3Nb_2O_{12}$ Garnet-type Li Ion Conductor via Spark Plasma Sintering Synthesis," Int. J. Electroact. Mater. 2014, vol. 2, pp. 17-21.
Kotobuki et al., "Fabrication of all-solid-state lithium battery with lithium metal anode using $Al_2O_3$-added $Li_7La_3Zr_2O_{12}$ solid electrolyte," Journal of Power Sources, 2011, vol. 196, pp. 7750-7754.
Lai et al., "Ultrahigh-Energy-Density Microbatteries Enabled by New Electrode Architecture and Micropackaging Design," Adv. Mater., 2010, vol. 22, pp. E139-E144.
Lallemant et al., "Transparent polycrystalline alumina obtained by SPS: Green bodies processing effect," Journal of the European Ceramic Society, 2012, vol. 32, pp. 2909-2915.
Langer et al., "Syntheis of single phase cubic Al-substituted $Li_7La_3Zr_2O_{12}$ by solid state lithiation of mixed hydroxides,"Journal of Alloys and Compounds, 2015, vol. 645, pp. 64-69.
Lau et al., "Density Functional Investigation of the Thermodynamic Stability of Lithium Oxide Bulk Crystalline Structures as a Function of Oxygen Pressure", J. Phys. Chemistry C, 2011, vol. 115, pp. 23625-23633.
Lee et al., "High lithium ion conductivity of $Li_2La_3Zr_2O_{12}$ synthesized by solid state reaction," Solid State Ionics, 2014, vol. 258, pp. 13-17.
Li et al., "Optimizing Li conductivity in a garnet framework," J. Mater. Chem., 2012, vol. 22, pp. 15357-15361.
Li et al., "The reaction of $Li_{6.5}La_3Zr_{1.5}Ta_{0.5}O_{12}$ with water," Solid State Ionics, 2015, vol. 269, pp. 57-61.
Li et al., "W-Doped $Li_7La_3Zr_2O_{12}$ Ceramic Electrolytes for Solid State Li-ion Batteries," Electrochimica Acta, 2015, vol. 180, pp. 37-42.
Liu et al., "High Ion Conductivity in Garnet-type F-doped $Li_7La_3Zr_2O_{12}$," Journal of Inorganic Materials, Sep. 2015, vol. 30, No. 9, pp. 995-1001.
Liu et al., "Reversible ion exchange and structural stability of garnet-type Nb-doped $Li_7La_3Zr_2O_{12}$ in water for applications in lithium batteries," Journal of Power Sources, 2015, vol. 282, pp. 286-293.
Liu et al., "Achieving high capacity in bulk-type solid-state lithium ion battery based on $Li_{6.75}La_3Zr_{1.75}Ta_{0.25}O_{12}$ electrolyte: Interfacial resistance," Journal of Power Sources, 2016, vol. 324, pp. 349-357.
Matsuda et al., "Phase formation of a garnet-type lithium-ion conductor $Li_{7-3x}Al_xLa_3Zr_2O_{12}$," Solid State Ionics, 2015, vol. 277, pp. 23-29.
Matsui et al., "Phase stability of a garnet-type lithium ion conductor $Li_7La_3Zr_2O_{12}$," Dalton Transactions, 2014, vol. 43, pp. 1019-1024.
Matsui et al., "Phase transformation of the garnet structured lithium ion conductor: $Li_7La_3Zr_2O_{12}$", Solid State Ionics, 2014, vol. 262, pp. 155-159.
McCloskey et al., "On the Mechanism of Nonaqueous $Li$—$O_2$ Electrochemistry on C and Its Kinetic Overpotentials: Some Implications for Li-Air Batteries", J. Phys. Chemistry C, 2012, vol. 116, pp. 23897-23905.
Miara et al., "Effect of Rb and Ta Doping on the Ionic Conductivity and Stability of the Garnet $Li_{7+2x-y}(La_{3-x}Rb_x)(Zr_{2-y}Ta_y)O_{12}$ ($0 \leq x \leq 0.375$, $0 \leq y \leq 1$) Superionic Conductor: A First Principles Investigation," Chem. Mater. 2013, vol. 25, pp. 3048-3055.
Miara et al., "First-Principles Studies on Cation Dopants and Electrolyte|Cathode Interphases for Lithium Garnets," Chemestry of Materials, 2015, vol. 27, pp. 4040-4047.
Minami et al., "Crystallization Process for Superionic $Li_7P_3S_{11}$ Glass-Ceramic Electrolytes", Journal of the American Ceramic Society, 2011, vol. 94, pp. 1779-1783.
Mitterdorfer et al., "Fabrication of thin electrolytes for second-generation solid oxide fuel cells," Solid State Ionics, 2000, vol. 131, pp. 79-96.

(56) References Cited

OTHER PUBLICATIONS

Miyauchi et al., "New Amorphous Thin Films of Lithium Ion Conductive Solid Electrolyte," Solid State Ionics 9 & 10, 1983, pp. 1469-1472.
Mizuno et al., "Environmentally Friendly Flux Growth of High-Quality, Idiomorphic $Li_5La_3Nb_2O_{12}$ Crystals," Cryst. Growth Des., 2013, vol. 13, pp. 479-484.
Moshkovich et al., "The study of the anodic stability of alkyl carbonate solutions by in situ FTIR spectroscopy, EQCM, NMR and MS," Journal of Electroanalytical Chemistry, 2001, vol. 497, pp. 84-96.
Mukhopadhyay et al., "Structure and Stoichiometry in Supervalent Doped $Li_7La_3Zr_2O_{12}$," Chem. Mater., 2015, vol. 27, pp. 3658-3665.
Murugan et al., "Schnelle Lithiumionenleitung in granatartigem $Li_7La_3Zr_2O_{12}$", Angew. Chem., 2007, vol. 119, pp. 7925-7928, with English mashine translation.
Murugan et al., "Fast Lithium Ion Conduction in Garnet-Type $Li_7La_3Zr_2O_{12}$," Angew. Chem. Int. Ed., 2007, 46, pp. 7778 -7781.
Narayanan et al., "Dopant Concentration-Porosity-Li-Ion Conductivity Relationship in Garnet-Type $Li_{5+2x}La_3Ta_{2-x}Y_xO_{12}$ ($0.05 \leq x \leq 0.75$) and Their Stability in Water and 1 M LiCl," Inorganic Chemistry, 2015, vol. 54, pp. 6968-6977.
Nemori et al., "Stability of garnet-type solid electrolyte $Li_xLa_3A_{2-y}B_yO_{12}$ (A=Nb or Ta, B=Sc or Zr)," Solid State Ionics, 2015, vol. 282, pp. 7-12.
Neudecker et al., "'Lithium-Free' Thin-Film Battery with In Situ Plated Li Anode," Journal of the Electrochemical Society, 2000, vol. 147, No. 2, pp. 517-523.
Ni et al., "Room temperature elastic moduli and Vickers hardness of hot-pressed LLZO cubic garnet," J. Mater. Sci., 2012, vol. 47, pp. 7978-7985.
Nyman et al., "Alternative Approach to Increasing Li Mobility in Li—La—Nb/Ta Garnet Electrolytes," Chem. Mater., 2010, vol. 22, No. 19, pp. 5401-5410.
Office Action dated May 8, 2015 in U.S. Appl. No. 14/531,929, 12 pages.
Office Action of Chinese application No. 201480055386.4 dated Jan. 4, 2017 together with English translation; 9 pages.
Office Action of Chinese application No. 201480055387.9 dated Dec. 22, 2016 together with English translation; 7 pages.
Office Action of Japanese application No. 2016-520586 dated Nov. 28, 2017 together with English translation; 8 pages.
Ohta et al., "Co-sinterable lithium garnet-type oxide electrolyte with cathode for all-solid-state lithium ion battery," Journal of Power Sources, 2014, vol. 265, pp. 40-44.
Ohta et al., "High lithium ionic conductivity in the garnet-type oxide $Li_{7-x}La_3(Zr_{2-x},Nb_x)O_{12}(X=0-2)$," Journal of Power Sources, 2011, vol. 196, pp. 3342-3345.
Ohta et al., "All-solid-state lithium ion battery using garnet-type oxide and Li3BO3 solid electrolytes fabricated by screen-printing," Journal of Power Sources, vol. 238, 2013, pp. 53-56.
Ohta et al., "Electrochemical performance of an all-solid-state lithium ion battery with garnet-type oxide electrolyte," Journal of Power Sources, vol. 202, 2012, pp. 332-335.
Onodera et al., "Flux Growth of Idiomorphic Garnet-Type Solid Electrolyte Crystals for All-Solid-State Lithium-Ion Rechargeable Batteries," The Electrochemical Society, 2012, Abstract #1198, 1 page.
Park et al., "Effects of crystallinity and impurities on the electrical conductivity of Li—La—Zr—O thin films," Thin Solid Films, 2015, vol. 576, pp. 55-60.
Peng et al., "A Reversible and Higher-Rate Li—$O_2$ Battery", Science, Aug. 3, 2012, vol. 337, pp. 563-567.
Puech et al., "Elaboration and characterization of a free standing LiSICON membrane for aqueous lithiumeair battery," Journal of Power Sources, vol. 214, 2012, pp. 330-336.
Quartarone et al., "Electrolytes for solid-state lithium rechargeable batteries: recent advances and perspectives", Chemical Society Reviews, vol. 40, 2011, pp. 2525-2540.
Ramakumar et al., "Structure and Li+ dyanmics of Sb-doped $Li_7La_3Zr_2O_{12}$ fast lithium ion conductors," Phys. Chem. Chem. Phys. 2013, vol. 15, pp. 11327-11338.
Ramzy et al., "Tailor-Made Development of Fast Li Ion Conducting Garnet-Like Solid Electrolytes," American Chemical Society, Applied Materials and Interfaces, 2010, vol. 2, No. 2, pp. 385-390.
Rangasamy et al., "A High Conducting Oxide—Sulfide Composite Lithium Superionic Conductor," J. Mater. Chem. A, published 2014, vol. 2, pp. 4111-4116.
Rangasamy et al., "The effect of 24c-site (A) cation substitution on the tetragonal-cubic phase transition in $Li_{7-x}La_{3-x}A_xZr_2O_{12}$ garnet-based ceramic electrolyte," Journal of Power Sources, 2013, vol. 230, pp. 261-266.
Rangasamy et al., "The role of Al and Li concentration on the formation of cubic garnet solid electrolyte of nominal composition $Li_7La_3Zr_2O_{12}$," Solid State Ionics, 2012, vol. 206, pp. 28-32.
Rao et al.,"In Situ Neutron Diffraction Monitoring of $Li_7La_3Zr_2O_{12}$ Formation: Toward a Rational Synthesis of Garnet Solid Electrolytes," Chemistry of Materials, 2015, vol. 27, pp. 2903-2910.
Raskovalov et al, "Structure and transport properties of $L1_7La_3Zr_{2-075x}Al_xO_{12}$ supersonic solid electrolytes," Journal of Power Sources, 2013, vol. 238, pp. 48-52.
Reed, James S., Principles of Ceramics Processing, 2nd Edition, John Wiley & Sons, Inc., New York, pp. 60-61.
Reinacher et al., "Preparation an electrical properties of garnet-type $Li_6BaLa_2Ta_2O_{12}$ lithium solid electrolyte thin films prepared by pulsed laser deposition," Solid State Ionics, 2014, vol. 258, pp. 1-7.
Ren et al., "Direct observation of lithium dendrites inside garnet-type lithium-ion solid electrolyte," Electrochemistry Communications, 2015, vol. 57, pp. 27-30.
Ren et al., "Effects of Li source microstructure and ionic conductivity of Al-contained $Li_{6.75}La_3Zr_{1.75}Ta_{0.25}O_{12}$ cermics," Journal of the European Ceramic Society, 2015, vol. 35, pp. 561-572.
Rettenwander et al., "Site Occupation of Ga and Al in Stabilized Cubic $Li_{7-3(x+y)}Ga_xAl_yLa_3Zr_2O_{12}$ Garnets as Deduced from $^{27}Al$ and $^{71}Ga$ MAS NMR at Ultrahigh Magnetic Fields," Chemistry of Materials, 2015, vol. 27, pp. 3135-3142.
Rettenwander et al., "Synthesis, Crystal Chemistry, and Electrochemical Properties of $Li_{7-2x}La_3Zr_{2-x}Mo_xO_{12}$ (x=0.1-0.4): Stabilization of the Cubic Garnet Polymorph via Substitution of $Zr^{4+}$ by $Mo^{6+}$," Inorganic Chemistry, 2015, vol. 54, pp. 10440-10449.
Rettenwander et al., "DFT study of the role of $Al^{3+}$ in the fast ion-conductor $Li_{7-3x}Al^{3+}{}_xLa_3Zr_2O_{12}$ Garnet," Chem. Mater. 2014, vol. 26, pp. 2617-2623.
Rosero-Navarro et al., "Preparation of $Li_7La_3(Zr_2-x,Nb_x)O_{12}$ and $Li_3BO_3/LiBO_2$ composites at low temperatures using a sol—gel process," Solid State Ionics, 2016, vol. 285, pp. 6-12.
Sakamoto et al., "Synthesis of nano-scale fast ion conducting cubic $Li_7La_3Zr_2O_{12}$", Nanotechnology, 2013, vol. 24, 424005, 8 pages.
Sakamoto, Jeff, "Garnet-based ceramic electrolyte: Enabling Li metal anodes and solid state batteries," Beyond Lithium Ion VI, Jun. 4-6, 2013, Boulder, CO., 36 pages.
Sakuda et al., "Evaluation of elastic modulus of $Li_2S$—$P_2S_5$ glassy solid electrolyte by ultrasonic sound velocity measurement and compression test", Journal of the Ceramic Society of Japan 121, 2013, pp. 946-949.
Satyanarayana et al., "Structure and Li+ dynamics of Sb-doped $Li_7La_3Zr_2O_{12}$ fast lithium ion conductors", Phys. Chem. Chem. Phys., 2013, vol. 15, pp. 11327-11338.
Schafbauer et al., "Tape Casting as a Multi Purpose Shaping Technology for Different Applications in Energy Issues", Materials Science Forum vols. 706-709, 2012, pp. 1035-1040.
Schmidt et al., "In-situ, non-destructive acoustic characterization of solid state electrolyte cells", Journal of Power Sources, 2016, vol. 324, pp. 126-133.
Second Office Action of Chinese Application No. 201480055386.4 dated Nov. 1, 2017 together with English translation, 10 pages.
Sharafi et al., Characterizing the Li—$Li_7La_3Zr_2O_{12}$ interface stability and kinetics as a function of temperature and current density, Journal of Power Sources, 2016, vol. 302, pp. 135-139.
Shimonishi et al., "Synthesis of garnet-type $Li_{7-x}La_3Zr_2O_{12-1/2x}$ and its stability in aqueous solutions," Solid State Ionics, 2011, vol. 183, pp. 48-53.

(56) References Cited

OTHER PUBLICATIONS

Shin et al.' "Synergistic multi-doping effects on the $Li_7La_3Zr_2O_{12}$ solid electrolyte for fast lithium ion conduction," Scientific Reports, 2015, pp. 1-9.
Song et al., "Crystal structure, migration mechanism and electrochemical performance of Cr-stabilized garnet," 2014, vol. 268, pp. 135-139.
Suárez et al., "Sintering to Transparency of Polycrystalline Ceramic Materials," 2012, ISBN: 978-953-51-0017-1, 28 pages; InTech, Available from: http://www.intechopen.com/books/sintering-of-ceramics-new-emerging-techniques/sintering-to-transparencyof-polycrystalline-ceramic-materials.
Sudo et al., "Interface behavior between garnet-type lithium-conducting solid electrolyte and lithium metal," Solid State Ionics, 2014, vol. 262, pp. 151-154.
Suzuki et al., "Transparent cubic garnet-type solid electrolyte of $Al_2O_3$-doped $Li_7La_3Zr_2O_{12}$," Solid State Ionics, 2015, vol. 278, pp. 172-176.
Tadanaga et al., "Low temperature synthesis of highly ion conductive $Li_7La_3Zr_2O_{12}$—$Li_3BO_3$ composites," Electrochemistry Communications, 2013, vol. 33, pp. 51-54.
Takada, "Progress and prospective of solid-state lithium batteries", Acta Materialia 61, 2013, pp. 759-770.
Takeda et al., "High Pressure Form of Fluoride Garnets $Na_3M_2Li_3F_{12}$ (M=& Fe)," Mat. Res. Bull., 1977, vol. 12, No. 7, pp. 689-692.
Tan et al., "Fabrication and characterization of $Li_7La_3Zr_2O_{12}$ thin films for lithium ion battery," ECS Solid Sate Letters, vol. 1, No. 6, Oct. 3, 2012, pp. Q57-Q60.
Teng, Shiang, et al. "Recent Developments in garnet based solid state electrolytes for thin film batteries," Current Opinion in Solid State and Materials Science, Feb. 2014, vol. 18, Issue 18, pp. 29-38.
Thangadurai et al., "Fast Solid-State Li Ion Conducting Garnet-Type Structure Metal Oxides for Energy Storage," J. Phys. Chem. Lett, 2015, vol. 6, pp. 292-299.
Thangadurai et al., "$Li_6ALa_2N O_{12}$ (A=Ca, Sr, Ba): A New Class of Fast Lithium Ion Conductors with Garnet-Like Structure," J. Am. Ceram. Soc., 2005, vol. 88, No. 2, pp. 411-418.
Thangadurai et al., "Novel Fast Lithium Ion Conduction in Garnet-Type $Li_5La_3M_2O_{12}$ (M=Nb, Ta)," J. Am. Ceram. Soc., 2003, vol. 86, No. 3, pp. 437-440.
Thangadurai et al., "Garnet-type solid-state fast Li ion conductors for Li batteries: critical review", Chemical Society Reviews, 2014, vol. 43, pp. 4714-4727.
Thompson et al., "A Tale of Two Sites: On Defining the Carrier Concentration in Garnet-Based Ionic Conductors for Advanced Li Batteries," Adv. Energy Mater., 2015, 1500096, pp. 1-9.
Toda, S., et al., "Low temperature cubic garnet-type $CO_2$-doped $Li_7La_3Zr_2O_{12}$," Solid State Ionics, 2013, vol. 233, pp. 102-106.
Tong et al., "Highly Conductive Li Garnets by a Multielement Doping Strategy", Inorganic Chemistry, 2015, vol. 54, pp. 3600-3607.
Ulissi Ulderico et al., "All solid-state battery using layered oxide cathode, lithium-carbon composite anode and thio-LISICON electrolyte," Solid State Ionics, vol. 296, 2016, pp. 13-17.
Wainwright et al., "Forces generated by anode growth in cylindrical $Li/MoS_2$ cells," Journal of Power Sources, 1991, vol. 34, pp. 31-38.

Wang et al., "Correlation and mechanism of lithium ion diffusion with the crystal strcutre of $Li_7La_3Zr_2O_{12}$ revealed by an internal friction technique," Phys. Chem. Chem. Phys., 2014, vol. 16, pp. 7006-7014.
Wang et al., "The synergistic effects of al and Te on the structure and Li+-mobility of garnet-type solid electrolytes", J. Mater. Chem. A. 2014, vol. 2, pp. 20271-20279.
Wang et al., "Transparent ceramics: Processing, materials and applications," Progress in Solid State Chemistry, 2013, vol. 41, pp. 20-54.
Wang, Dawei et al., "Toward Understanding the Lithium Transport Mechanism in Garnet-type Solid Electrolytes: Li+ Ion Exchanges and Their Mobility at Octahedral/Tetrahedral Sites," Chem. Mater. 2015, vol. 27, pp. 6650-6659.
Wang, Shutao et al., "Syntheses and structures of lithium zirconates for high-temperature $CO_2$ absorption," J. Mater. Chem. A, 2013, vol. 1, pp. 3540-3550.
Wang, Yuxing et al., "Phase transition in lithium garnet oxide ionic conductors $Li_7La_3Zr_2O_{12}$: The role of Ta substitution and $H_2/CO_2$ exposure," Journal of Power Sources, 2015, vol. 275, pp. 612-620.
Wilkinson et al., "Effects of physical constraints on Li cycability," Journal of Power Sources, 1991, vol. 36, pp. 517-527.
Wolfenstine et al., "A preliminary investigation of fracture toughness of $Li_7La_3Zr_2O_{12}$ and its comparisoin to other solid Li-ion conductors," Materials letters, 2013, vol. 96, pp. 117-120.
Wolfenstine et al., "Chemical stability of cubic $Li_7La_3Zr_2O_{12}$ with molten lithium at elevated temperature", J. Mater. Sci., 2013, vol. 48, pp. 5846-5851.
Xie et al., "Lithium Distribution in Aluminum-Free Cubic $Li_7La_3Zr_2O_{12}$", issued on Chem. Mater. 2011, vol. 23, pp. 3587-3589.
Xie et al., "Low-temperature synthesis of $Li_7La_3Zr_2O_{12}$ with cubic garnet-type structure," Materials Research Bulletin, 2012, vol. 47, pp. 1229-1232.
Xu et al., "Multistep sintering to synthesize fast lithium garnets," Journal of Power Sources, 2016, vol. 302, pp. 291-297.
Yang et al., "Nanostructured Garnet-Type Solid Electrolytes for Lithium Batteries: Electrospinning Synthesis of $Li_7La_3Zr_2O_{12}$ Nanowires and Particle Size-Dependent Phase Transformation", J.Physical Chemistry C, 2015, vol. 119, pp. 14947-14953.
Yi et al., "Flame made nanoparticles permit processing of dense, flexible, Li+ conducting ceramic electrolyte thin films of cubic-$Li_7La_3Zr_2O_{12}$ (c-LLZO) ," J. Mater. Chem. A, 2016, vol. 4, pp. 12947-12954.
Yoshima et al., "Thin hybrid electrolyte based on garnet-type lithium-ion conductor $Li_7La_3Zr_2O_{12}$ for 12 V-class bipolar batteries," Journal of Power Sources, 2016, vol. 302, pp. 283-290.
Zaiss et al., "Fast ionic conduction in cubic hafnium garnet $Li_7La_3Hf_2O_{12}$," Ionics, Springer-Verlag, 2010, vol. 16, pp. 855-858.
Zhang et al., "Effect of lithium ion concentration on the microstructure evolution and its association with the ionic conductivity of cubic garnet-type nominal $Li_7Al_{0.25}La_3Zr_2O_{12}$ solid electrolytes", Solid State Ionics, 2016, vol. 284, pp. 53-60.
Zhang et al., "Field assisted sintering of dense Al-substituted cubic phase $Li_7La_3Zr_2O_{12}$ solid electrolytes," Journal of Power Sources, 2014, vol. 268, pp. 960-964.
Zhang et al., "Preparation of cubic $Li_7La_3Zr_2O_{12}$ solid electrolyte using a nano-sized core-shell structured precursor," Journal of Alloys and Compounds, 2015, vol. 644, pp. 793-798.

ANNEALED GARNET ELECTROLYTE SEPARATORS

CROSS-REFERENCE TO RELATED APPLICATIONS

This application is a continuation of U.S. patent application Ser. No. 15/007,908, entitled ANNEALED GARNET ELECTROLYTE SEPARATORS, filed Jan. 27, 2016, the disclosure of which is incorporated herein by reference in its entirety.

BACKGROUND

A series of technological challenges must be overcome in order to transition the current energy economy, based on the consumption of nonrenewable petroleum-based energy resources, into one in which humans sustainably produce, store, and consume renewable energy. With respect to automotive transportation, in particular, first and foremost among these challenges is the unmet need for renewable energy storage devices which are suitable replacements for the internal combustion engine. Rechargeable batteries, and lithium (Li) rechargeable batteries in particular, may be suitable substitutes in electric and hybrid-electric vehicles, but the high cost and limited performance of the conventional batteries available today has restricted large-scale market adoption of this technology. A key component of such batteries which limits its performance is the electrolyte.

In a rechargeable Li ion battery, $Li^+$ ions move from a negative electrode to a positive electrode during discharge and in the opposite direction during charge. An electrolyte physically separates and electrically insulates the positive and negative electrodes while also providing a medium for $Li^+$ ions to conduct between the electrodes. The electrolyte ensures that electrons, produced when Li metal oxidizes at the negative electrode during discharge of battery (e.g., $Li \leftrightarrow Li^+ + e^-$), conduct between the electrodes by way of an external and parallel electrical pathway to the pathway taken by the $Li^+$ ions. If $Li^+$ ions and electrons recombine, as can happen when they share a conduction path, before both conduct separately from the negative to the positive electrode, no useful work is captured and Li dendrites may form and lead to thermal runaway. In some electrochemical devices, electrolytes may be used in combination with, or intimately mixed with, cathode (i.e., positive electrode) active materials to facilitate the conduction of $Li^+$ ions within the cathode region, for example, from the electrolyte-cathode interface and into and/or with the cathode active material.

Conventional rechargeable batteries rely on liquid-based electrolytes which include lithium salts dissolved in organic solvents (e.g., 1M solutions of $LiPF_6$ salts in 1:1 ethylene carbonate:diethylene carbonate solvents). However, these liquid electrolytes suffer from several problems including flammability during thermal runaway and outgassing at high voltages. Solid state ion-conducting ceramics, such as lithium-stuffed garnet oxide materials, have been proposed as next generation electrolyte separators in a variety of electrochemical devices including $Li^+$ ion rechargeable batteries. When compared to liquid-based electrolytes, solid state electrolytes are attractive for safety reasons, such as not being flammable, as well as for economic reasons which include low processing costs. Solid state lithium-stuffed garnet electrolyte membranes and separators, in particular, are well suited for electrochemical devices because of their high $Li^+$ ion conductivity, their electric insulating properties, as well as their chemical compatibility with Li metal anodes (i.e., negative electrodes). Moreover, solid state lithium-stuffed garnet electrolyte membranes can be prepared as thin films, which are thinner and lighter than conventional electrolyte separators. See, for example, US Patent Application Publication No. 2015/0099190, published Apr. 9, 2015 and filed Oct. 7, 2014, entitled GARNET MATERIALS FOR LI SECONDARY BATTERIES AND METHODS OF MAKING AND USING GARNET MATERIALS, the entire contents of which are incorporated by reference in its entirety for all purposes. When these thinner and lighter lithium-stuffed garnet separators are incorporated into electrochemical cells, the resulting electrochemical cells are thought to achieve higher volumetric and gravimetric energy densities because of the volume and weight reduction afforded by the solid state separators.

Certain solid state lithium-stuffed garnet electrolytes are known. See, for example, U.S. Pat. Nos. 8,658,317; 8,092,941; and 7,901,658; also U.S. Patent Application Publication Nos. 2013/0085055; 2011/0281175; 2014/0093785; and 2014/0170504; also Bonderer, et al. "Free-Standing Ultrathin Ceramic Foils," Journal of the American Ceramic Society, 2010, 93(11):3624-3631; and Murugan, et al., *Angew Chem. Int. Ed.* 2007, 46, 7778-7781). However, to date and the best of Applicants knowledge, there are no public disclosures of commercially viable thin film solid state lithium-stuffed garnet electrolyte separators or membranes for Li rechargeable batteries which have a sufficiently long cycle life at high current densities and which conduct large amounts of lithium without forming lithium dendrites. There are also, to the best of Applicants knowledge, no public disclosures of commercially viable thin film solid state lithium-stuffed garnet electrolyte separators which have low interfacial and bulk ionic resistance and/or impedance.

Some of the contributors to bulk and interfacial resistance and/or impedance in lithium-stuffed garnet electrolytes are impurities in the lithium-stuffed garnet oxide, which include but are not limited to secondary phases other than a pure lithium-stuffed garnet oxide which can be found at either or all of the electrolyte's bulk, surface and/or interface with other materials. Resistive secondary phases, e.g., $Li_2CO_3$ on the surface or interface of a lithium-stuffed garnet solid electrolyte are also a source of high impedance and poor cycling performance in lithium-stuffed garnet electrolytes. Previously, researchers mechanically processed lithium-stuffed garnet electrolytes to remove secondary phases from its surfaces. These techniques included sanding or polishing the electrolyte surfaces to physically remove surface contaminants. However, these mechanical processing techniques are cost-prohibitive for high volume production, tend to be destructive to the material being processed, and tend not to prevent the formation of new surface contaminants or otherwise stabilize the mechanically polished surface.

There is therefore a need for improved thin film solid state electrolytes and, in particular, lithium-stuffed garnet electrolytes, which demonstrate commercially viable cycle life properties at high $Li^+$ current densities. What is needed in the relevant field is, for example, new thin film solid state ion-conducting electrolytes as well as processes for making and using these solid state electrolytes. The instant disclosure sets forth such materials and methods of making and using the same, as well other solutions to other problems in the relevant field.

BRIEF SUMMARY

The present disclosure relates generally to components for lithium rechargeable batteries as well as to lithium-stuffed garnet electrolyte membranes and separators for lithium rechargeable batteries. Some of the electrolytes disclosed herein have low interfacial impedance, a reduced tendency for lithium dendrites to form therein or thereupon when used as electrolyte separators in electrochemical cells, and/or have advantageous surface chemical compositions and features. Also provided herein are methods of making these solid-state electrolyte membranes and separators including certain annealing methods for producing the aforementioned advantageous surface chemical compositions and features. The instant disclosure includes, in some examples, intermediate temperature annealing methods, in inert or reducing environments, for removing surface species, e.g., $Li_2CO_3$, which otherwise result in high impedance and poor electrochemical performance in the electrolyte if not removed. The instant disclosure includes, in some examples, serial heat treatment steps, in inert or reducing environments, for removing surface species, e.g., $Li_2CO_3$, which otherwise result in high impedance and poor electrochemical performance in the electrolyte if not removed.

In one embodiment, the instant disclosure sets forth a thin electrolyte membrane or separator, having top and bottom surfaces, wherein the length or width of either the top or bottom surfaces is at least 10 times the membrane or separator thickness, and wherein the membrane or separator thickness is from about 10 nm to about 100 µm; wherein the electrolyte bulk is characterized by the chemical formula $Li_xLa_3Zr_2O_{12}\ y(Al_2O_3)$, wherein $3 \leq x \leq 8$ and $0 \leq y \leq 1$; and wherein either the top or bottom surface is characterized as having less than 1 µm layer thereupon which includes a lithium carbonate, lithium hydroxide, lithium oxide, a hydrate thereof, an oxide thereof, or a combination thereof. As used herein, the thickness of the layer on the membrane or separator is only as thick or is thinner than the thickness of the membrane or separator, not including any layers thereupon. Herein, x and y are rational numbers.

As used herein, having less than 1 µm layer thereupon refers to a surface coating, or surface adhered or bonded layer, which is chemically distinct from the bulk material on which the surface coating is present. In some examples, this layer is a native oxide or an oxide which spontaneously forms on the surface of the materials described herein post-synthesis and upon exposure to air.

In a second embodiment, the instant disclosure sets forth a method of making a thin electrolyte membrane or separator, having top and bottom surfaces, wherein the length or width of either the top or bottom surfaces is at least 10 times the membrane or separator thickness, and wherein the membrane or separator thickness is from about 10 nm to about 100 µm; wherein the electrolyte bulk is characterized by the chemical formula $Li_xLa_3Zr_2O_{12}\ y(Al_2O_3)$, wherein $3 \leq x \leq 8$ and $0 \leq y \leq 1$; and wherein either the top or bottom surface is characterized as having less than 1 µm layer thereupon which includes a lithium carbonate, lithium hydroxide, lithium oxide, a hydrate thereof, an oxide thereof, or a combination thereof. As used herein, the thickness of the layer on the membrane or separator is only as thick or is thinner than the thickness of the membrane or separator, not including any layers thereupon. In some examples, the method includes preparing a thin film lithium-stuffed garnet electrolyte by calcining lithium-stuffed electrolyte garnet electrolyte precursors in the presences of binders and or dispersants to prepare calcined thin films of lithium-stuffed garnet electrolytes and subsequently sintering and annealing the thin films by heating the films a second or third time in a reducing or inert atmosphere and at elevated temperatures.

In a third embodiment, the instant disclosure sets forth methods of reducing the area-specific resistance (ASR) of a lithium-stuffed garnet electrolyte membrane or separator, wherein the method includes annealing the membrane or separator by heating it after it is sintered in a reducing atmosphere and at elevated temperatures. In some embodiments, the heating is between 500 and 750° C. and the reducing atmosphere is $Ar:H_2$ or Ar or an inert atmosphere.

In a fourth embodiment, the instant disclosure sets forth an electrochemical device which includes the electrolyte membranes and/or separators set forth herein.

In a fifth embodiment, the instant disclosure sets forth methods of using electrochemical devices which include the electrolyte membranes and/or separators set forth herein, wherein the methods include bonding lithium metal to a surface of the electrolyte membrane or separator using a formation cycle.

In a sixth embodiment, the instant disclosure sets forth methods of laminating, depositing, or bonding lithium metal onto an electrolyte membranes and/or separators set forth herein.

Figure 1:
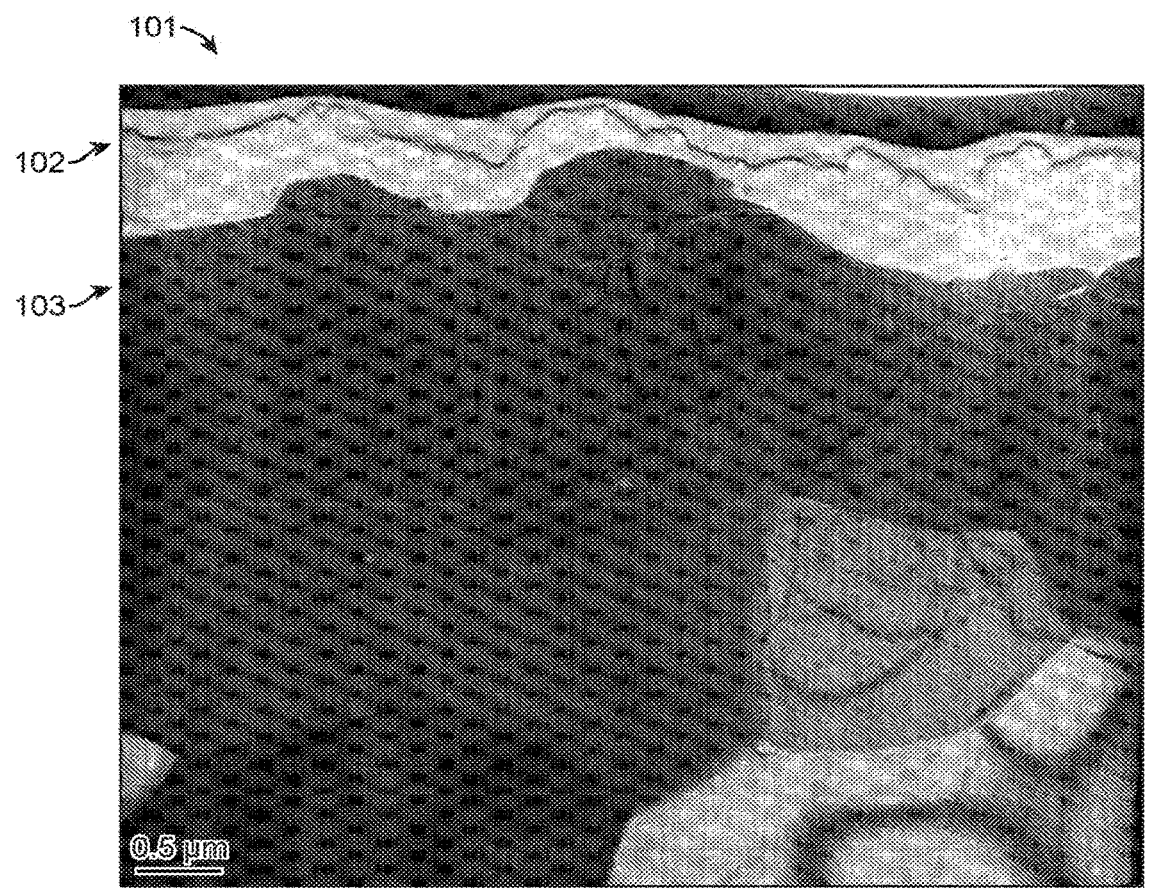
FIG. 1 shows a transmission electron microscopy (TEM) image of Sample A (untreated)—a lithium-stuffed garnet prepared according to Example 2. The scale bar in the image is 0.5 µm.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the inventions herein are not intended to be limited to the embodiments presented, but are to be accorded their widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

General Description

Though solid state electrolytes possess a host of theoretical advantages, there exists a need for improvements in the chemistry, processing and engineering of these electrolytes and their surfaces and interfaces with lithium metal in order to make them more commercially viable for use in electrochemical cells. One of the major problems associated with electrolytes is that researchers have had difficulty controlling the surface chemistry of for these electrolytes to operate in commercial devices. As an example, surface contamination by $Li_2CO_3$ and/or LiOH is thought to be detrimental to the performance of these electrolytes. These species may block fast charge transfer kinetics at the surface of the electrolyte and lead to high interfacial resistance. Other minor impurity phases at the surface, e.g. $LiAlO_2$ may also lead to high interfacial resistance. See, for example, Sharafi, Asma, et al. Journal of Power Sources 302 (2016) 135-139. See, for example, Cheng, L., et al., "Interrelationships among Grain Size, Surface Composition, Air Stability, and Interfacial Resistance of Al-Substituted $Li_7La_3Zr_2O_{12}$ Solid Electrolytes," ACS Appl. Mater. Interfaces, 2015, 7 (32), pp 17649-17655, DOI: 10.1021/acsami.5b02528; Cheng, L., et al., ACS Appl. Mater. Interfaces, 2015, 7 (3), pp 2073-2081, DOI: 10.1021/am508111r, doi/abs/10.1021/am508111r; and Cheng, L., et al., Phys. Chem. Chem. Phys., 2014, 16, 18294-18300, DOI: 10.1039/C4CP02921F.

I. Definitions

As used herein, the term "about," when qualifying a number, e.g., 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C. For example, evaporating a solvent at about 80° C. includes evaporating a solvent at 79° C., 80° C., or 81° C.

As used herein the phrase "about 1 to about 600 minutes," refers to the range 0.1 to 1.1 to 540-660 minutes and the minute values therebetween. As used herein the phrase "about 10 μm to about 100 μm" refers to the range 9 μm-11 μm to 90 μm-110 μm and the integer values therebetween. As used herein the phrase "about 500° C. to about 900° C.," refers to the range 450° C.-550° C. to 810° C.-990° C. and the integer temperature values therebetween.

As used herein, the term, "Ra," is a measure of surface roughness wherein Ra is an arithmetic average of absolute values of sampled surface roughness amplitudes. Surface roughness measurements can be accomplished using, for example, a Keyence VK-X100 instrument that measures surface roughness using a laser.

As used herein, the term, "Rt," is a measure of surface roughness wherein Rt is the maximum peak height of sampled surface roughness amplitudes.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, the phrases "electrochemical cell" or "battery cell" shall mean a single cell including a positive electrode and a negative electrode, which have ionic communication between the two using an electrolyte. In some embodiments, the same battery cell includes multiple positive electrodes and/or multiple negative electrodes enclosed in one container.

As used herein, a "binder" refers to a material that assists in the adhesion of another material. Binders useful in the present invention include, but are not limited to, polypropylene (PP), atactic polypropylene (aPP), isotactive polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), PE-co-poly(methylene cyclopentane) (PE-co-PMCP), stereoblock polypropylenes, polypropylene polymethylpentene copolymer, acrylics, acrylates, polyvinyl butyral, vinyl family, cellulose family, polyethylene glycol, resins, polyvinyl alcohol, polymethyl methacrylate, polyvinyl pyrrolidone, polyacrylamide, polyethylene oxide (PEO), PEO block copolymers, silicone, and the like.

Figure 13:
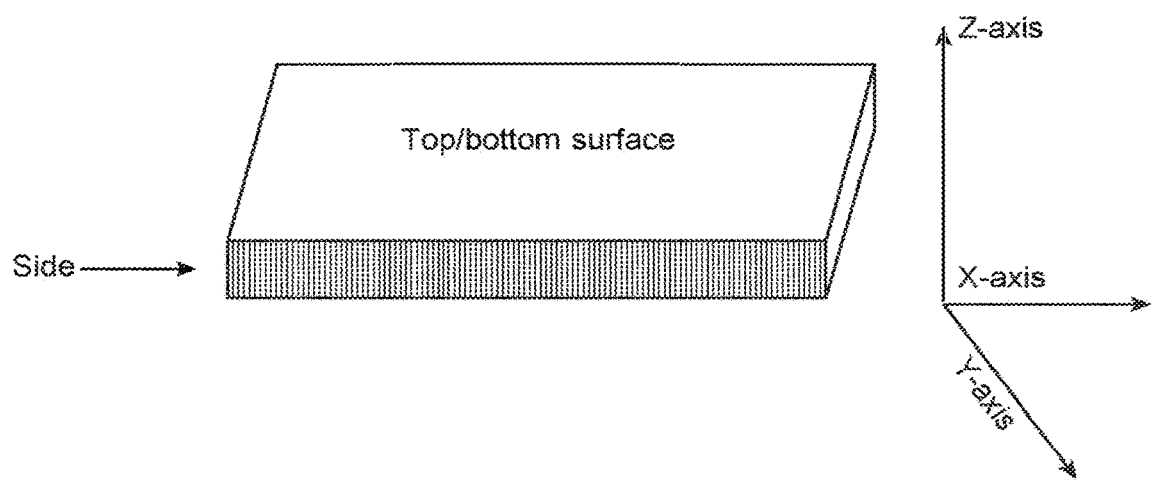
FIG. 13 shows an rectangular shape
Figure 14:
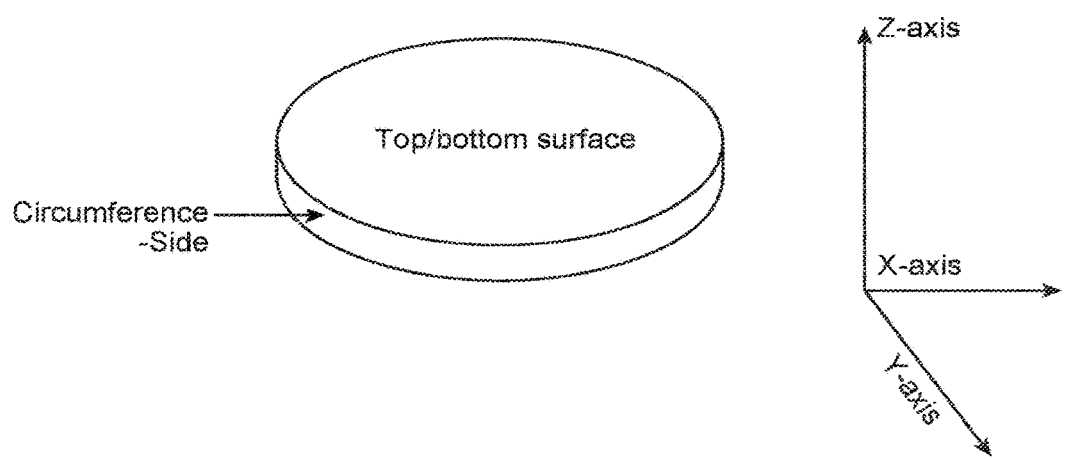
FIG. 14 shows a disc shape.

As used herein, the term "surface" refers to material that is near or at an interface between two different phases, chemicals, or states of matter. For example, a thin film garnet membrane or separator when exposed to air has a surface described by the periphery or outside portion of the membrane or separator which contacts the air. For rectangular-shaped membranes or separators, there is a top and a bottom surface which both individually have higher surface areas than each of the four side surfaces individually. In this rectangular membrane or separator example, such as the example shown in FIG. 13, there are also four side surfaces which have surface areas less than either or both of the top and bottom surfaces. For disc-shaped membranes or separators, such as the example shown in FIG. 14, there is a top and a bottom surface which both individually have higher surface areas than the circumference-side of the disc. When used as an electrolyte membrane or separator in an electrochemical cell, the top or bottom surface is the side or part of the membrane or separator which contacts the negative electrode (i.e., Li metal), which contacts the positive electrode (i.e. cathode or catholyte in cathode), and/or which contacts a layer or bonding agent disposed between the membrane or separator and the positive electrode. A surface has larger x- and y-axis physical dimensions that it does z-axis physical dimensions, wherein the z-axis is the axis perpendicular to the surface. The depth or thickness of a surface can be of molecular order of magnitude or up to 1 micron. Oxide surfaces can include dangling bonds, excess hydroxyl groups, bridging oxides, or a variety of other species which result in the oxide surface having a chemical composition that may be stoichiometrically different from the bulk. For example, in some of the membranes or separators set forth herein, the bulk is characterized by a chemical formula of $Li_xLa_7Zr_2O_{12}Al_2O_3$ and the surface is characterized by a chemical formula of $Li_yLa_7Zr_2O_{12}Al_2O_3$, wherein, in this paragraph, x is greater than y.

As used herein, the term "bulk," refers to a portion or part of a material that is extended in space in three-dimensions by at least 1 micron. The bulk refers to the portion or part of a material which is exclusive of its surface, as defined above.

As used herein, the terms "cathode" and "anode" refer to the electrodes of a battery. During a charge cycle in a Li-secondary battery, Li ions leave the cathode and move through an electrolyte and to the anode. During a charge cycle, electrons leave the cathode and move through an external circuit to the anode. During a discharge cycle in a Li-secondary battery, Li ions migrate towards the cathode through an electrolyte and from the anode. During a discharge cycle, electrons leave the anode and move through an external circuit to the cathode.

As used herein, a "catholyte" refers to an ion conductor that is intimately mixed with, or that surrounds, or that contacts the positive electrode active material. Catholytes suitable with the embodiments described herein include, but are not limited to, catholytes having the common name LPS, LXPS, LXPSO, where X is Si, Ge, Sn, As, Al, LATS, or also Li-stuffed garnets, or combinations thereof, and the like. Catholytes may also be liquid, gel, semi-liquid, semi-solid, polymer, and/or solid polymer ion conductors known in the art. Catholytes include those catholytes set forth in US Patent Application Publication No. 2015-0171465, which published on Jun. 18, 2015, entitled SOLID STATE CATHOLYTE OR ELECTROLYTE FOR BATTERY USING LiAMPBSC (M=Si, Ge, AND/OR Sn), filed May 15, 2014, the contents of which are incorporated by reference in their entirety. Catholytes include those catholytes set forth in US Patent Application Publication No. 2015/0099190, published on Apr. 9, 2015, entitled GARNET MATERIALS FOR LI SECONDARY BATTERIES AND METHODS OF MAKING AND USING GARNET MATERIALS, and filed Oct. 7, 2014, the contents of which are incorporated by reference in their entirety.

As used herein, the phrase "solid state catholyte," or the term "catholyte" refers to an ion conductor that is intimately mixed with, or surrounded by, a cathode (i.e., positive electrode) active material (e.g., a metal fluoride optionally including lithium).

In some examples the catholyte may include a gel electrolyte such as, but not limited to, the electrolyte compositions set forth in U.S. Pat. No. 5,296,318, entitled RECHARGEABLE LITHIUM INTERCALATION BATTERY WITH HYBRID POLYMERIC ELECTROLYTE; also U.S. Pat. No. 5,460,904; also U.S. Pat. No. 5,456,000, to Gozdz, et al., or those compositions set forth in US Patent Application No. 20020192561, entitled SEPARATORS FOR WINDING-TYPE LITHIUM SECONDARY BATTERIES HAVING GEL-TYPE POLYMER ELECTROLYTES AND MANUFACTURING METHOD FOR THE SAME, which published Dec. 19, 2002.

As used herein, the phrase "current collector" refers to a component or layer in a secondary battery through which electrons conduct, to or from an electrode in order to complete an external circuit, and which are in direct contact with the electrode to or from which the electrons conduct. In some examples, the current collector is a metal (e.g., Al, Cu, or Ni, steel, alloys thereof, or combinations thereof) layer which is laminated to a positive or negative electrode. During charging and discharging, electrons move in the opposite direction to the flow of Li ions and pass through the current collector when entering or exiting an electrode.

As used herein, the term "electrolyte," refers to a material that allows ions, e.g., Li+, to migrate therethrough but which does not allow electrons to conduct therethrough. Electrolytes are useful for electrically isolating the cathode and anodes of a secondary battery while allowing ions, e.g., $Li^+$, to transmit through the electrolyte. Electrolytes are ionically conductive and electrically insulating material. Electrolytes are useful for electrically insulating the positive and negative electrodes of a secondary battery while allowing for the conduction of ions, e.g., $Li^+$, through the electrolyte.

As used herein, the phrase "$d_{50}$ diameter" or "median diameter $(d_{50})$" refers to the median size, in a distribution of sizes, measured by microscopy techniques or other particle size analysis techniques, such as, but not limited to, scanning electron microscopy or dynamic light scattering. $D_{50}$ describes a characteristic dimension of particles at which 50% of the particles are smaller than the recited size. As used herein "diameter $(d_{90})$" refers to the size, in a distribution of sizes, measured by microscopy techniques or other particle size analysis techniques, including, but not limited to, scanning electron microscopy or dynamic light scattering. $D_{90}$ includes the characteristic dimension at which 90% of the particles are smaller than the recited size. As used herein "diameter $(d_{10})$" refers to the size, in a distribution of sizes, measured by microscopy techniques or other particle size analysis techniques, including, but not limited to, scanning electron microscopy or dynamic light scattering. $D_{10}$ includes the characteristic dimension at which 10% of the particles are smaller than the recited size.

As used herein, the term "rational number" refers to any number which can be expressed as the quotient or fraction (e.g., p/q) of two integers (e.g., p and q), with the denominator (e.g., q) not equal to zero. Example rational numbers include, but are not limited to, 1, 1.1, 1.52, 2, 2.5, 3, 3.12, and 7.

As used herein the phrase "free-standing thin film," refers to a film that is not adhered or supported by an underlying substrate. In some examples, free-standing thin film is a film that is self-supporting, which can be mechanically manipulated or moved without need of substrate adhered or fixed thereto.

As used herein, the molar ratios, unless specified to the contrary, describe the ratio of constituent elements as batched in the reaction used to make the described material.

As used herein, a "thickness" by which is film is characterized refers to the distance, or median measured distance, between the top and bottom faces of a film. As used herein, the top and bottom faces refer to the sides of the film having the largest surface areas.

As used herein, the phrase "film thickness" refers to the distance, or median measured distance, between the top and bottom faces of a film. As used herein, the top and bottom faces refer to the sides of the film having the largest surface areas.

As used herein the word "thickness" in the phrase "a thin electrolyte membrane, having top and bottom surfaces and a thickness therebetween" refers to the distance, or median measured distance, between the top and bottom surfaces of a film. As used herein, the top and bottom surfaces refer to the sides of the film having the largest surface areas.

As used herein, electrolyte separator or membrane thickness is measured by cross-sectional scanning electron microscopy.

As used herein the phrase "active electrode material," or "active material," refers to a material that is suitable for use as a Li rechargeable battery and which undergoes a chemical reaction during the charging and discharging cycles. For examples, and "active cathode material," includes a metal fluoride that converts to a metal and lithium fluoride during the discharge cycle of a Li rechargeable battery.

As used herein the phrase "active anode material" refers to an anode material that is suitable for use in a Li rechargeable battery that includes an active cathode material as defined above. In some examples, the active material is Lithium metal. In some of the methods set forth herein, the sintering temperatures are high enough to melt the Lithium metal used as the active anode material.

As used herein the phrase "free-standing thin film," refers to a film that is not adhered or supported by an underlying substrate. In some examples, free-standing thin film is a film that is self-supporting, which can be mechanically manipulated or moved without need of substrate adhered or fixed thereto.

As used herein, the phrase "density as determined by geometric measurements," refers to measurements of density obtained by physical mass and volume measurements. Density is determined by the ratio of measured mass to the measured volume. Customary techniques including the Archimedes method have been employed for such determinations.

As used herein, the phrase "current collector" refers to a component or layer in a secondary battery through which electrons conduct, to or from an electrode in order to complete an external circuit, and which are in direct contact with the electrode to or from which the electrons conduct. In some examples, the current collector is a metal (e.g., Al, Cu, or Ni, steel, alloys thereof, or combinations thereof) layer which is laminated to a positive or negative electrode. During charging and discharging, electrons move in the opposite direction to the flow of Li ions and pass through the current collector when entering or exiting an electrode.

As used herein, the phrase "slot casting," refers to a deposition process whereby a substrate is coated, or deposited, with a solution, liquid, slurry, or the like by flowing the solution, liquid, slurry, or the like, through a slot or mold of fixed dimensions that is placed adjacent to, in contact with, or onto the substrate onto which the deposition or coating occurs. In some examples, slot casting includes a slot opening of about 1 to 100 µm.

As used herein, the term "laminating" refers to the process of sequentially depositing a layer of one precursor specie, e.g., a lithium precursor specie, onto a deposition substrate and then subsequently depositing an additional layer onto an already deposited layer using a second precursor specie, e.g., a transition metal precursor specie. This laminating process can be repeated to build up several layers of deposited vapor phases. As used herein, the term "laminating" also refers to the process whereby a layer comprising an electrode, e.g., positive electrode or cathode active material comprising layer, is contacted to a layer comprising another material, e.g., garnet electrolyte. The laminating process may include a reaction or use of a binder which adheres of physically maintains the contact between the layers which are laminated.

As used herein, the phrase "green film" refers to an unsintered film including at least one member selected from garnet materials, precursors to garnet materials, calcined garnet materials, binder, solvent, carbon, dispersant, or combinations thereof.

As used herein the phrase "providing an unsintered thin film," refers to the provision of, generation or, presentation of, or delivery of an unsintered thin film or a green film defined above. For example, providing an unsintered thin film refers to the process of making an unsintered thin film available, or delivering an unsintered thin film, such that the unsintered thin film can be used as set forth in a method described herein.

As used herein the phrase "unsintered thin film," refers to a thin film, including the components and materials described herein, but which is not sintered by a sintering method set forth herein. Thin refers, for example, to a film that has an average thickness dimensions of about 10 nm to about 100 µm. In some examples, thin refers to a film that is less than about 1 µm, 10 µm or 50 µm in thickness.

As used herein, the phrase "evaporating the cathode current collector," refers to a process of providing or delivering a metal, such as, but not limited to, copper, nickel, aluminum, or an combination thereof, in vapor or atomized form such that the metal contacts and forms an adhering layer to the cathode, catholyte, or combinations thereof or to the anode, anolyte, or combinations thereof. This process results in the formation of a metal layer on a cathode or anode such that the metal layer and the cathode or anode are in electrical communication.

As used herein the term "making," refers to the process or method of forming or causing to form the object that is made. For example, making an energy storage electrode includes the process, process steps, or method of causing the electrode of an energy storage device to be formed. The end result of the steps constituting the making of the energy storage electrode is the production of a material that is functional as an electrode.

As used herein the phrase "energy storage electrode," refers to, for example, an electrode that is suitable for use in an energy storage device, e.g., a lithium rechargeable battery or Li-secondary battery. As used herein, such an electrode is capable of conducting electrons and Li ions as necessary for the charging and discharging of a rechargeable battery.

As used herein, the phrase "electrochemical device" refers to an energy storage device, such as, but not limited to a Li-secondary battery that operates or produces electricity or an electrical current by an electrochemical reaction, e.g., a conversion chemistry reaction such as $3Li + FeF_3 \leftrightarrow 3LiF + Fe$.

As used herein, the phrase "providing" refers to the provision of, generation or, presentation of, or delivery of that which is provided.

As used herein, the phrase "lithium stuffed garnet" refers to oxides that are characterized by a crystal structure related to a garnet crystal structure. Lithium-stuffed garnets include compounds having the formula $Li_4La_BM'_CM''_DZr_EO_F$, $Li_4La_BM'_CM''_DTa_EO_F$, or $Li_4La_BM'_CM''_DNb_EO_F$, wherein $4<A<8.5$, $1.5<B<4$, $0\leq C\leq2$, $0\leq D\leq2$; $0\leq E<2$, $10<F<13$, and M' and M" are each, independently in each instance selected from Al, Mo, W, Nb, Sb, Ca, Ba, Sr, Ce, Hf, Rb, or Ta, or $Li_aLa_bZr_cAl_dMe''_eO_f$, wherein $5<a<7.7$; $2<b<4$; $0<c\leq2.5$; $0\leq d<2$; $0\leq e<2$, $10<f<13$ and Me" is a metal selected from Nb, Ta, V, W, Mo, or Sb and as described herein. Garnets, as used herein, also include those garnets described above that are doped with $Al_2O_3$. Garnets, as used herein, also include those garnets described above that are doped so that $Al^{3+}$ substitutes for $Li^+$. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (t1+t2+t3=subscript 2) so that the La:(Zr/Nb/Ta) ratio is 3:2. Also, garnet used herein includes, but is not limited to, $Li_xLa_3Zr_2O_{12}+yAl_2O_3$, wherein x ranges from 5.5 to 9; and y ranges from 0 to 1. In some examples x is 7 and y is 1.0. In some examples x is 7 and y is 0.35. In some examples x is 7 and y is 0.7. In some examples x is 7 and y is 0.4. Also, garnets as used herein include, but are not limited to, $Li_xLa_3Zr_2O_{12}+yAl_2O_3$.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein, the phrase "garnet precursor chemicals" or "chemical precursor to a Garnet-type electrolyte" refers to chemicals which react to form a lithium stuffed garnet material described herein. These chemical precursors include, but are not limited to lithium hydroxide (e.g., LiOH), lithium oxide (e.g., $Li_2O$), lithium carbonate (e.g., $LiCO_3$), zirconium oxide (e.g., $ZrO_2$), lanthanum oxide (e.g., $La_2O_3$), aluminum oxide (e.g., $Al_2O_3$), aluminum (e.g., Al), aluminum nitrate (e.g., $AlNO_3$), aluminum nitrate nonahydrate, niobium oxide (e.g., $Nb_2O_5$), tantalum oxide (e.g., $Ta_2O_5$).

As used herein the phrase "garnet-type electrolyte," refers to an electrolyte that includes a garnet or lithium stuffed garnet material described herein as the ionic conductor.

As used herein, the phrase "doped with alumina" means that $Al_2O_3$ is used to replace certain components of another material, e.g., a garnet. A lithium stuffed garnet that is doped with $Al_2O_3$ refers to garnet wherein aluminum (Al) substitutes for an element in the lithium stuffed garnet chemical formula, which may be, for example, Li or Zr.

As used herein, the phrase "aluminum reaction vessel" refers to a container or receptacle into which precursor chemicals are placed in order to conduct a chemical reaction to produce a product, e.g., a lithium stuffed garnet material.

As used herein, the phrase "high conductivity," refers to a conductivity, such as ionic conductivity, that is greater than $10^{-5}$ S/cm at room temperature. In some examples, high conductivity includes a conductivity greater than $10^{-5}$ S/cm at room temperature.

As used herein, the phrase "Zr is partially replaced by a higher valence species" refers to the substitution of $Zr^{4+}$ with a species that has, for example, a $5^+$ or $6^+$ charge. For example, if some $Nb^{5+}$ can reside in a lattice position in a garnet crystal structure where a Zr atom resides and in doing so substitute for $Zr^{4+}$, then Zr is partially replaced by Nb. This is also referred to as niobium doping.

As used herein, the phrase "subscripts and molar coefficients in the empirical formulas are based on the quantities of raw materials initially batched to make the described examples" means the subscripts, (e.g., 7, 3, 2, 12 in $Li_7La_3Zr_2O_{12}$ and the coefficient 0.35 in $0.35Al_2O_3$) refer to the respective elemental ratios in the chemical precursors (e.g., LiOH, $La_2O_3$, $ZrO_2$, $Al_2O_3$) used to prepare a given material, (e.g., $Li_7La_3Zr_2O_{12}.0.35Al_2O_3$).

As used herein, the term "grains" refers to domains of material within the bulk of a material that have a physical boundary which distinguishes the grain from the rest of the material. For example, in some materials both crystalline and amorphous components of a material, often having the same chemical composition, are distinguished from each other by the boundary between the crystalline component and the amorphous component. The approximate diameter or maximum dimensions of the boundaries of a crystalline component, or of an amorphous component, is referred herein as the grain size.

As used herein the phrase "active electrode material," or "active material," refers to a material that is suitable for use as a Li rechargeable battery and which undergoes a chemical reaction during the charging and discharging cycles. For examples, and "active cathode material," includes a metal fluoride that converts to a metal and lithium fluoride during the discharge cycle of a Li rechargeable battery.

As used herein the phrase "active anode material" refers to an anode material that is suitable for use in a Li rechargeable battery that includes an active cathode material as defined above. In some examples, the active material is Lithium metal. In some of the methods set forth herein, the sintering temperatures are high enough to melt the Lithium metal used as the active anode material.

As used herein the phrase "conductive additive," refers to a material that is mixed with the cathode active material in order to improve the conductivity of the cathode. Examples includes, but are not limited to, carbon and the various forms of carbon, e.g., ketjen black, VGCF, acetylene black, graphite, graphene, nanotubes, nanofibers, the like, and combinations thereof.

As used herein the phrase "casting a film," refers to the process of delivering or transferring a liquid or a slurry into a mold, or onto a substrate, such that the liquid or the slurry forms, or is formed into, a film. Casting may be done via doctor blade, meyer rod, comma coater, gravure coater, microgravure, reverse comma coater, slot dye, slip and/or tape casting, and other methods known to those skilled in the art.

As used herein the phrase "applying a pressure," refers to a process whereby an external device, e.g., a calender, induces a pressure in another material.

As used herein the phrase "burning the binder or calcining the unsintered film," refers to the process whereby a film that includes a binder is heated, optionally in an environment that includes an oxidizing specie, e.g., $O_2$, in order to burn the binder or induce a chemical reaction that drives off, or removes, the binder, e.g., combustion, or which causes a film having a binder to sinter, to become more dense or less porous.

As used herein the phrase "composite electrode," refers to an electrode that is composed of more than one material. For example, a composite electrode may include, but is not limited to, an active cathode material and a garnet-type electrolyte in intimate mixture or ordered layers or wherein the active material and the electrolyte are interdigitated.

As used herein the phrase "inert setter plates," refer to plates, which are normally flat, and which are unreactive with a material that is sintered. Inert setter plates can be metallic or ceramic, and, optionally, these setter plates can be porous to provide for the diffusion of gases and vapors therethrough when a sintered material is actually sintered. Inert setter plates are exemplified in U.S. Provisional Patent Application No. 62/148,337, filed Apr. 16, 2015.

As used herein the phrase "free-standing thin film," refers to a film that is not adhered or supported by an underlying substrate. In some examples, free-standing thin film is a film that is self-supporting, which can be mechanically manipulated or moved without need of substrate adhered or fixed thereto.

As used herein the phrase "wherein either the top or bottom surface is characterized as having substantially no layer thereupon comprising a lithium carbonate, lithium hydroxide, lithium oxide, lithium peroxide, a hydrate thereof, an oxide thereof, or a combination thereof," refers to a material set forth herein where the material's top or bottom surface is not observed to have a lithium carbonate, lithium hydroxide, lithium oxide, lithium peroxide, a hydrate thereof, an oxide thereof, or a combination thereof when analyzed by Raman, FT-IR, or XPS spectroscopy.

i. Electrolytes

In some examples, set forth herein is a thin electrolyte separator, having top and bottom surfaces and a thickness therebetween, wherein the top or bottom surface length or width is greater than the thickness by a factor of ten (10) or more, and the thickness is from about 10 nm to about 100 μm. In some examples, the electrolyte bulk is characterized by the chemical formula $Li_xLa_3Zr_2O_{12}$ $y(Al_2O_3)$, wherein $3 \leq x \leq 8$ and $0 \leq y \leq 1$. In some examples, the top or bottom surface is characterized as having a layer thereupon, greater than 1 nm and less than 1 μm, comprising a lithium carbonate, lithium hydroxide, lithium oxide, lithium peroxide, a hydrate thereof, an oxide thereof, or a combination thereof.

In some examples, set forth herein is a thin electrolyte separator, having top and bottom surfaces and a thickness therebetween, wherein the top or bottom surface length or width is greater than the thickness by a factor of ten (10) or more, and the thickness is from about 10 nm to about 100 μm. In some examples, the electrolyte bulk is characterized by the chemical formula LixLa3Zr2O12 y(Al2O3), wherein $3 \leq x \leq 8$ and $0 \leq y \leq 1$. In certain examples, either the top or bottom surface is characterized as having substantially no layer thereupon comprising a lithium carbonate, lithium hydroxide, lithium oxide, lithium peroxide, a hydrate thereof, an oxide thereof, or a combination thereof. In certain examples, either the top or bottom surface is characterized as having substantially no layer thereupon comprising a lithium carbonate. In certain examples, either the top or bottom surface is characterized as having substantially no layer thereupon comprising a lithium hydroxide. In certain examples, either the top or bottom surface is characterized as having substantially no layer thereupon comprising a lithium oxide. In certain examples, either the top or bottom surface is characterized as having substantially no layer thereupon comprising a lithium peroxide. In certain examples, either the top or bottom surface is characterized as having substantially no layer thereupon comprising a hydrate of any of the aforementioned. In certain examples, either the top or bottom surface is characterized as having substantially no layer thereupon comprising a peroxide of any of the aforementioned. In certain examples, either the top or bottom surface is characterized as having substantially no layer thereupon comprising an oxide of any of the aforementioned.

In some examples, the electrolyte separator has a top or bottom surface length or width is from about 100 μm to 100 cm.

In some examples, the electrolyte separator has an x as 3, 3.5, 4, 4.5, 5, 5.5, 6, 6.5, 7, 7.5, or 8.

In some examples, the electrolyte separator bulk is characterized by the chemical formula $Li_3La_3Zr_2O_h0.2(Al_2O_3)$, $Li_3La_3Zr_2O_h0.25(Al_2O_3)$, $Li_3La_3Zr_2O_h0.3(Al_2O_3)$, $Li_3La_3Zr_2O_h0.35(Al_2O_3)$, $Li_3La_3Zr_2O_h0.4(Al_2O_3)$, $Li_3La_3Zr_2O_h0.45(Al_2O_3)$, $Li_3La_3Zr_2O_h0.5(Al_2O_3)$, $Li_3La_3Zr_2O_h0.55(Al_2O_3)$, $Li_3La_3Zr_2O_h0.6(Al_2O_3)$, $Li_3La_3Zr_2O_h0.65(Al_2O_3)$, $Li_3La_3Zr_2O_h0.7(Al_2O_3)$, $Li_3La_3Zr_2O_h0.75(Al_2O_3)$, $Li_3La_3Zr_2O_h0.8(Al_2O_3)$, $Li_3La_3Zr_2O_h0.85(Al_2O_3)$, $Li_3La_3Zr_2O_h0.9(Al_2O_3)$, $Li_3La_3Zr_2O_h0.95(Al_2O_3)$, $Li_3La_3Zr_2O_h(Al_2O_3)$, $Li_5La_3Zr_2O_h0.2(Al_2O_3)$, $Li_5La_3Zr_2O_h 0.25(Al_2O_3)$, $Li_5La_3Zr_2O_h0.3(Al_2O_3)$, $Li_5La_3Zr_2O_h0.35(Al_2O_3)$, $Li_5La_3Zr_2O_h0.4(Al_2O_3)$, $Li_5La_3Zr_2O_h0.45(Al_2O_3)$, $Li_5La_3Zr_2O_h0.5(Al_2O_3)$, $Li_5La_3Zr_2O_h0.55(Al_2O_3)$, $Li_5La_3Zr_2O_h0.6(Al_2O_3)$, $Li_5La_3Zr_2O_h0.55(Al_2O_3)$, $Li_5La_3Zr_2O_h0.7(Al_2O_3)$, $Li_5La_3Zr_2O_h0.75(Al_2O_3)$, $Li_5La_3Zr_2O_h0.8(Al_2O_3)$, $Li_5La_3Zr_2O_h0.85(Al_2O_3)$, $Li_5La_3Zr_2O_h0.9(Al_2O_3)$, $Li_5La_3Zr_2O_h0.95(Al_2O_3)$, $Li_5La_3Zr_2O_h(Al_2O_3)$, $Li_6La_3Zr_2O_h0.2(Al_2O_3)$, $Li_6La_3Zr_2O_h 0.25(Al_2O_3)$, $Li_6La_3Zr_2O_h0.3(Al_2O_3)$, $Li_6La_3Zr_2O_h0.35(Al_2O_3)$, $Li_6La_3Zr_2O_h0.4(Al_2O_3)$, $Li_3La_3Zr_2O_h0.45(Al_2O_3)$, $Li_6La_3Zr_2O_h0.5(Al_2O_3)$, $Li_6La_3Zr_2O_h0.55(Al_2O_3)$, $Li_6La_3Zr_2O_h0.6(Al_2O_3)$, $Li_6La_3Zr_2O_h0.55(Al_2O_3)$, $Li_6La_3Zr_2O_h0.7(Al_2O_3)$, $Li_6La_3Zr_2O_h0.75(Al_2O_3)$, $Li_6La_3Zr_2O_h0.8(Al_2O_3)$, $Li_6La_3Zr_2O_h0.85(Al_2O_3)$, $Li_6La_3Zr_2O_h0.9(Al_2O_3)$, $Li_6La_3Zr_2O_h0.95(Al_2O_3)$, $Li_6La_3Zr_2O_h(Al_2O_3)$, $Li_7La_3Zr_2O_h0.2(Al_2O_3)$, $Li_7La_3Zr_2O_h0.25(Al_2O_3)$, $Li_7La_3Zr_2O_h0.3(Al_2O_3)$, $Li_7La_3Zr_2O_h0.35(Al_2O_3)$, $Li_7La_3Zr_2O_h0.4(Al_2O_3)$, $Li_7La_3Zr_2O_h0.45(Al_2O_3)$, $Li_7La_3Zr_2O_h0.5(Al_2O_3)$, $Li_7La_3Zr_2O_h0.55(Al_2O_3)$, $Li_7La_3Zr_2O_h0.6(Al_2O_3)$, $Li_7La_3Zr_2O_h0.65(Al_2O_3)$, $Li_7La_3Zr_2O_h0.7(Al_2O_3)$, $Li_7La_3Zr_2O_h0.75(Al_2O_3)$, $Li_7La_3Zr_2O_h0.8(Al_2O_3)$, $Li_7La_3Zr_2O_h0.85(Al_2O_3)$, $Li_7La_3Zr_2O_h 0.9(Al_2O_3)$, $Li_7La_3Zr_2O_h0.95(Al_2O_3)$, or $Li_7La_3Zr_2O_h(Al_2O_3)$, $Li_7La_3Zr_2O_h0.3(Al_2O_3)$, $Li_7La_3Zr_2O_h0.35(Al_2O_3)$, $Li_7La_3Zr_2O_h0.4(Al_2O_3)$, $Li_7La_3Zr_2O_h0.45(Al_2O_3)$, $Li_7La_3Zr_2O_h0.5(Al_2O_3)$, $Li_7La_3Zr_2O_h0.55(Al_2O_3)$, $Li_7La_3Zr_2O_h0.6(Al_2O_3)$, $Li_7La_3Zr_2O_h0.65(Al_2O_3)$, $Li_7La_3Zr_2O_h0.7(Al_2O_3)$, $Li_7La_3Zr_2O_h0.75(Al_2O_3)$, $Li_7La_3Zr_2O_h0.8(Al_2O_3)$, $Li_7La_3Zr_2O_h0.85(Al_2O_3)$, $Li_7La_3Zr_2O_h0.9(Al_2O_3)$, $Li_7La_3Zr_2O_h0.95(Al_2O_3)$, $Li_8La_3Zr_2O_h0.2(Al_2O_3)$, $Li_8La_3Zr_2O_h0.25(Al_2O_3)$, $Li_8La_3Zr_2O_h0.3(Al_2O_3)$, $Li_8La_3Zr_2O_h0.35(Al_2O_3)$, $Li_8La_3Zr_2O_h0.4(Al_2O_3)$, $Li_8La_3Zr_2O_h0.45(Al_2O_3)$, $Li_8La_3Zr_2O_h0.5(Al_2O_3)$, $Li_8La_3Zr_2O_h0.55(Al_2O_3)$, $Li_8La_3Zr_2O_h0.6(Al_2O_3)$, $Li_8La_3Zr_2O_h0.65(Al_2O_3)$, $Li_8La_3Zr_2O_h0.8(Al_2O_3)$, $Li_8La_3Zr_2O_h0.85(Al_2O_3)$, $Li_8La_3Zr_2O_h0.8(Al_2O_3)$, $Li_8La_3Zr_2O_h0.85(Al_2O_3)$, $Li_8La_3Zr_2O_h0.9(Al_2O_3)$, $Li_8La_3Zr_2O_h0.95(Al_2O_3)$, or $Li_8La_3Zr_2O_h(Al_2O_3)$, $Li_8La_3Zr_2O_h0.3(Al_2O_3)$, $Li_8La_3Zr_2O_h0.35(Al_2O_3)$, $Li_8La_3Zr_2O_h0.4(Al_2O_3)$, $Li_8La_3Zr_2O_h0.45(Al_2O_3)$, $Li_8La_3Zr_2O_h0.5(Al_2O_3)$, $Li_8La_3Zr_2O_h0.55(Al_2O_3)$, $Li_8La_3Zr_2O_h0.6(Al_2O_3)$, $Li_8La_3Zr_2O_h0.65(Al_2O_3)$, $Li_8La_3Zr_2O_h0.8(Al_2O_3)$, $Li_8La_3Zr_2O_h0.85(Al_2O_3)$, $Li_8La_3Zr_2O_h0.9(Al_2O_3)$, $Li_8La_3Zr_2O_h0.95(Al_2O_3)$, or $Li_8La_3Zr_2O_h(Al_2O_3)$. In these examples, subscript h is a number selected so that the chemical characterized by the formula is charge neutral. Subscript h can be any rational number greater than 0 or less than 15 as required to maintain charge neutrality. In some examples, his 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15. In certain examples, h is 9, 10, 11, 12, or 13. In some examples, h is 10, 11, or 12. In other examples, h is 11 or 12. In other examples, his 12 or 13. In certain examples, his 12.

In some examples, the electrolyte separator bulk is characterized by the chemical formula $Li_3La_3Zr_2O_{12}0.2(Al_2O_3)$, $Li_3La_3Zr_2O_{12}0.25(Al_2O_3)$, $Li_3La_3Zr_2O_{12}0.3(Al_2O_3)$, $Li_3La_3Zr_2O_{12}0.35(Al_2O_3)$, $Li_3La_3Zr_2O_{12}0.4(Al_2O_3)$, $Li_3La_3Zr_2O_{12}0.45(Al_2O_3)$, $Li_3La_3Zr_2O_{12}0.5(Al_2O_3)$, $Li_3La_3Zr_2O_{12}0.55(Al_2O_3)$, $Li_3La_3Zr_2O_{12}0.6(Al_2O_3)$, $Li_3La_3Zr_2O_{12}0.65(Al_2O_3)$, $Li_3La_3Zr_2O_{12}0.7(Al_2O_3)$, $Li_3La_3Zr_2O_{12}0.75(Al_2O_3)$, $Li_3La_3Zr_2O_{12}0.8(Al_2O_3)$, $Li_3La_3Zr_2O_{12}0.85(Al_2O_3)$, $Li_3La_3Zr_2O_{12}0.9(Al_2O_3)$, $Li_3La_3Zr_2O_{12}0.95(Al_2O_3)$, $Li_3La_3Zr_2O_{12}(Al_2O_3)$, $Li_5La_3Zr_2O_{12}0.2(Al_2O_3)$, $Li_5La_3Zr_2O_{12}$ $0.25(Al_2O_3)$, $Li_5La_3Zr_2O_{12}0.3(Al_2O_3)$, $Li_5La_3Zr_2O_{12}0.35(Al_2O_3)$, $Li_5La_3Zr_2O_{12}0.4(Al_2O_3)$, $Li_5La_3Zr_2O_{12}0.45(Al_2O_3)$, $Li_5La_3Zr_2O_{12}0.5(Al_2O_3)$, $Li_5La_3Zr_2O_{12}0.55(Al_2O_3)$, $Li_5La_3Zr_2O_{12}0.6(Al_2O_3)$, $Li_5La_3Zr_2O_{12}0.55(Al_2O_3)$, $Li_5La_3Zr_2O_{12}0.7(Al_2O_3)$, $Li_5La_3Zr_2O_{12}0.75(Al_2O_3)$, $Li_5La_3Zr_2O_{12}0.8(Al_2O_3)$, $Li_5La_3Zr_2O_{12}0.85(Al_2O_3)$, $Li_5La_3Zr_2O_{12}$ $0.9(Al_2O_3)$, $Li_5La_3Zr_2O_{12}0.95(Al_2O_3)$, $Li_5La_3Zr_2O_{12}(Al_2O_3)$, $Li_6La_3Zr_2O_{12}0.2(Al_2O_3)$, $Li_6La_3Zr_2O_{12}$ $0.25(Al_2O_3)$, $Li_6La_3Zr_2O_{12}0.3(Al_2O_3)$, $Li_6La_3Zr_2O_{12}0.35(Al_2O_3)$, $Li_6La_3Zr_2O_{12}0.4(Al_2O_3)$, $Li_3La_3Zr_2O_{12}0.45(Al_2O_3)$, $Li_6La_3Zr_2O_{12}0.5(Al_2O_3)$, $Li_6La_3Zr_2O_{12}0.55(Al_2O_3)$, $Li_6La_3Zr_2O_{12}0.6(Al_2O_3)$, $Li_6La_3Zr_2O_{12}0.55(Al_2O_3)$, $Li_6La_3Zr_2O_{12}0.7(Al_2O_3)$, $Li_6La_3Zr_2O_{12}0.75(Al_2O_3)$, $Li_6La_3Zr_2O_{12}0.8(Al_2O_3)$, $Li_6La_3Zr_2O_{12}0.85(Al_2O_3)$, $Li_6La_3Zr_2O_{12}0.9(Al_2O_3)$, $Li_6La_3Zr_2O_{12}0.95(Al_2O_3)$, $Li_6La_3Zr_2O_{12}(Al_2O_3)$, $Li_7La_3Zr_2O_{12}0.2(Al_2O_3)$, $Li_7La_3Zr_2O_{12}0.25(Al_2O_3)$, $Li_7La_3Zr_2O_{12}0.3(Al_2O_3)$, $Li_7La_3Zr_2O_{12}0.35(Al_2O_3)$, $Li_7La_3Zr_2O_{12}0.4(Al_2O_3)$, $Li_7La_3Zr_2O_{12}0.45(Al_2O_3)$, $Li_7La_3Zr_2O_{12}0.5(Al_2O_3)$, $Li_7La_3Zr_2O_{12}0.55(Al_2O_3)$, $Li_7La_3Zr_2O_{12}0.6(Al_2O_3)$, $Li_7La_3Zr_2O_{12}0.65(Al_2O_3)$, $Li_7La_3Zr_2O_{12}0.7(Al_2O_3)$, $Li_7La_3Zr_2O_{12}0.75(Al_2O_3)$, $Li_7La_3Zr_2O_{12}0.8(Al_2O_3)$, $Li_7La_3Zr_2O_{12}0.85(Al_2O_3)$, $Li_7La_3Zr_2O_{12}$ $0.9(Al_2O_3)$, $Li_7La_3Zr_2O_{12}0.95(Al_2O_3)$, or $Li_7La_3Zr_2O_{12}(Al_2O_3)$, $Li_7La_3Zr_2O_{12}0.3(Al_2O_3)$, $Li_7La_3Zr_2O_{12}0.35(Al_2O_3)$, $Li_7La_3Zr_2O_{12}0.4(Al_2O_3)$, $Li_7La_3Zr_2O_{12}0.45(Al_2O_3)$, $Li_7La_3Zr_2O_{12}0.5(Al_2O_3)$, $Li_7La_3Zr_2O_{12}0.55(Al_2O_3)$, $Li_7La_3Zr_2O_{12}0.6(Al_2O_3)$, $Li_7La_3Zr_2O_{12}0.65(Al_2O_3)$, $Li_7La_3Zr_2O_{12}0.7(Al_2O_3)$, $Li_7La_3Zr_2O_{12}0.75(Al_2O_3)$, $Li_7La_3Zr_2O_{12}0.8(Al_2O_3)$, $Li_7La_3Zr_2O_{12}0.85(Al_2O_3)$, $Li_7La_3Zr_2O_{12}0.9(Al_2O_3)$, $Li_7La_3Zr_2O_{12}0.95(Al_2O_3)$, $Li_7La_3Zr_2O_{12}(Al_2O_3)$, $Li_8La_3Zr_2O_{12}0.2(Al_2O_3)$, $Li_8La_3Zr_2O_{12}0.25(Al_2O_3)$, $Li_8La_3Zr_2O_{12}0.3(Al_2O_3)$, $Li_8La_3Zr_2O_{12}0.35(Al_2O_3)$, $Li_8La_3Zr_2O_{12}0.4(Al_2O_3)$, $Li_8La_3Zr_2O_{12}0.45(Al_2O_3)$, $Li_8La_3Zr_2O_{12}0.5(Al_2O_3)$, $Li_8La_3Zr_2O_{12}0.55(Al_2O_3)$, $Li_8La_3Zr_2O_{12}0.6(Al_2O_3)$, $Li_8La_3Zr_2O_{12}0.65(Al_2O_3)$, $Li_8La_3Zr_2O_{12}0.8(Al_2O_3)$, $Li_8La_3Zr_2O_{12}0.85(Al_2O_3)$, $Li_8La_3Zr_2O_{12}0.8(Al_2O_3)$, $Li_8La_3Zr_2O_{12}0.85(Al_2O_3)$, $Li_8La_3Zr_2O_{12}0.9(Al_2O_3)$, $Li_8La_3Zr_2O_{12}0.95(Al_2O_3)$, or $Li_8La_3Zr_2O_{12}(Al_2O_3)$, $Li_8La_3Zr_2O_{12}0.3(Al_2O_3)$, $Li_8La_3Zr_2O_{12}0.35(Al_2O_3)$, $Li_8La_3Zr_2O_{12}0.4(Al_2O_3)$, $Li_8La_3Zr_2O_{12}0.45(Al_2O_3)$, $Li_8La_3Zr_2O_{12}0.5(Al_2O_3)$, $Li_8La_3Zr_2O_{12}0.55(Al_2O_3)$, $Li_8La_3Zr_2O_{12}0.6(Al_2O_3)$, $Li_8La_3Zr_2O_{12}0.65(Al_2O_3)$, $Li_8La_3Zr_2O_{12}0.8(Al_2O_3)$, $Li_8La_3Zr_2O_{12}0.85(Al_2O_3)$, $Li_8La_3Zr_2O_{12}0.8(Al_2O_3)$, $Li_8La_3Zr_2O_{12}0.85(Al_2O_3)$, $Li_8La_3Zr_2O_{12}0.9(Al_2O_3)$, $Li_8La_3Zr_2O_{12}0.95(Al_2O_3)$, or $Li_8La_3Zr_2O_{12}(Al_2O_3)$.

In some examples, the electrolyte separator electrolyte bulk is characterized by a chemical formula different from the top or bottom surface of the electrolyte separator. In some examples, the electrolyte separator electrolyte bulk is characterized by the chemical formula $Li_{x1}La_3Zr_2O_{12}$ $y(Al_2O_3)$, wherein $3 \leq x1 \leq 8$ and $0 \leq y \leq 1$;

wherein the top or bottom surface or both is/are characterized by the chemical formula $Li_{x2}La_3Zr_2O_{12}$ $y(Al_2O_3)$, wherein $3 \leq x1 \leq 8$ and $0 \leq y \leq 1$, wherein x2 is less than x1.

In some examples, the electrolyte separator has either the top or bottom surface as characterized as having less than a 0.5 μm thick layer thereupon comprising a lithium carbonate, lithium hydroxide, lithium oxide, lithium peroxide, a hydrate thereof, an oxide thereof, or a combination thereof. In some examples, either the top or bottom surface is characterized as having less than a 0.35 μm thick layer thereupon comprising a lithium carbonate, lithium hydroxide, lithium oxide, lithium peroxide, a hydrate thereof, an oxide thereof, or a combination thereof. In other example, either the top or bottom surface is characterized as having less than a 0.25 μm thick layer thereupon comprising a lithium carbonate, lithium hydroxide, lithium oxide, lithium peroxide, a hydrate thereof, an oxide thereof, or a combination thereof. In certain examples, either the top or bottom surface is characterized as having less than a 0.15 μm thick layer thereupon comprising a lithium carbonate, lithium hydroxide, lithium oxide, lithium peroxide, a hydrate thereof, an oxide thereof, or a combination thereof. In some of these examples, either the top or bottom surface is characterized as having less than a 0.1 μm thick layer thereupon comprising a lithium carbonate, lithium hydroxide, lithium oxide, lithium peroxide, a hydrate thereof, an oxide thereof, or a combination thereof. In some examples, either the top or bottom surface is characterized as having less than a 0.05 μm thick layer thereupon comprising a lithium carbonate, lithium hydroxide, lithium oxide, lithium peroxide, a hydrate thereof, an oxide thereof, or a combination thereof. In some examples, both the top and bottom surfaces are characterized as having a similar thickness layer thereupon comprising a lithium carbonate, lithium hydroxide, lithium oxide, lithium peroxide, a hydrate thereof, an oxide thereof, or a combination thereof. In some examples, both the top and bottom surfaces are characterized as having no detectable presence of lithium carbonate, lithium hydroxide, lithium oxide, lithium peroxide, or a combination thereof as detected by XPS or FT-IR. In some examples, both the top and bottom surfaces are characterized as having no secondary phases present on the top or bottom surface, wherein secondary phases are selected from $LiAlO_2$, $Li_2ZrO_3$, $LaAlO_3$, $Li_5AlO_4$, $Li_6Zr_2O_7$, $La_2(Li_xAl_{1-x})O_4$, wherein x is from 0 to 1, or combinations thereof. In some examples, both the top and bottom surfaces are characterized as having the same thickness layer thereupon comprising a lithium carbonate, lithium hydroxide, lithium oxide, lithium peroxide, a hydrate thereof, an oxide thereof, or a combination thereof.

In some examples herein, the separator a Li-metal interface area specific resistance between 0 and 15 $\Omega cm^2$ at 60° C. In some examples, the Li-metal interface area specific resistance is less than 2 $\Omega cm^2$ at 60° C. In other examples, the Li-metal interface area specific resistance is less than 2 $\Omega cm^2$ at 25° C. In certain examples, the Li-metal interface area specific resistance is less than 20 $\Omega cm^2$ at −25° C.

In some examples, the separator is a pellet, a film, free-standing film, or a monolith.

In some examples herein, the lithium carbonate is characterized by $Li_x(CO_3)_y$ and x is from 0 to 2, and y is from 0 to 1.

In some examples herein, the lithium hydroxide is characterized by $Li_x(OH)_y$ and x and y are each, independently, from 0 to 1.

In some examples herein, the lithium oxide is characterized by $Li_xO_y$ and x and y are each, independently, from 0 to 2.

Figure 4:
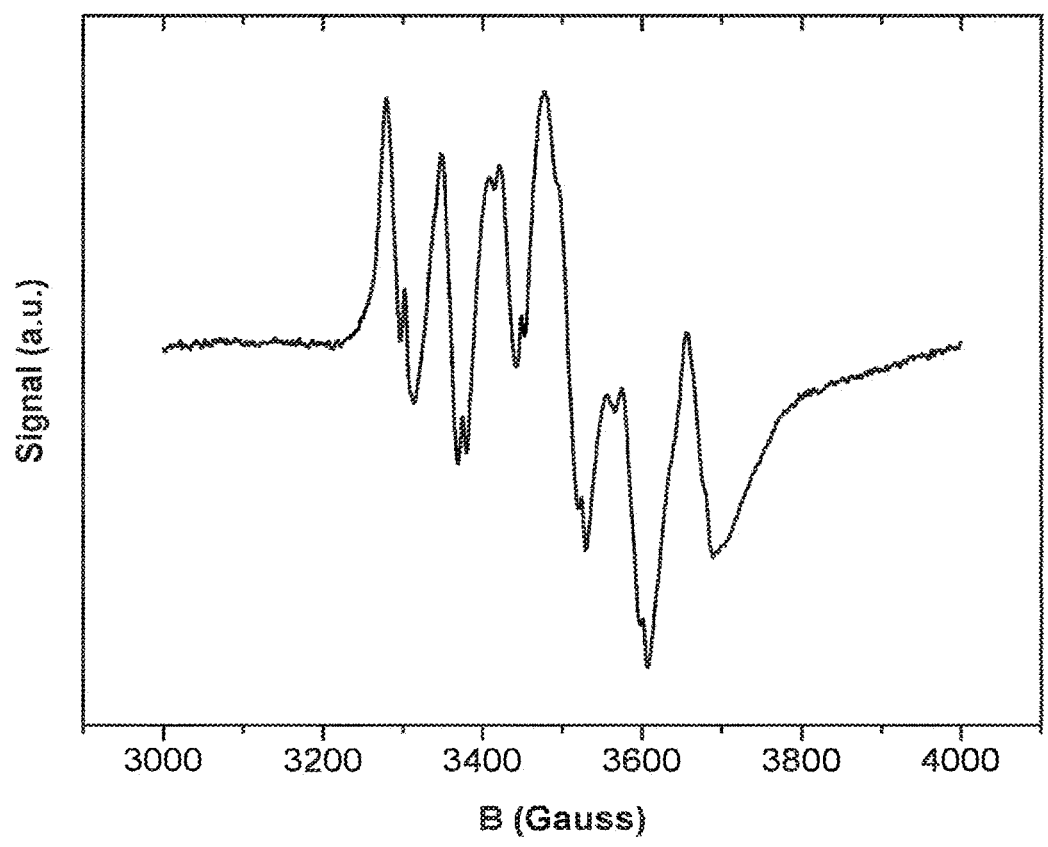
FIG. 4 shows an electron paramagnetic resonance (EPR) spectrum for Sample B prepared according to Example 2.

In some examples herein, the electrolyte separator is characterized by an EPR spectrum substantially as shown in FIG. 4.

Figure 9:
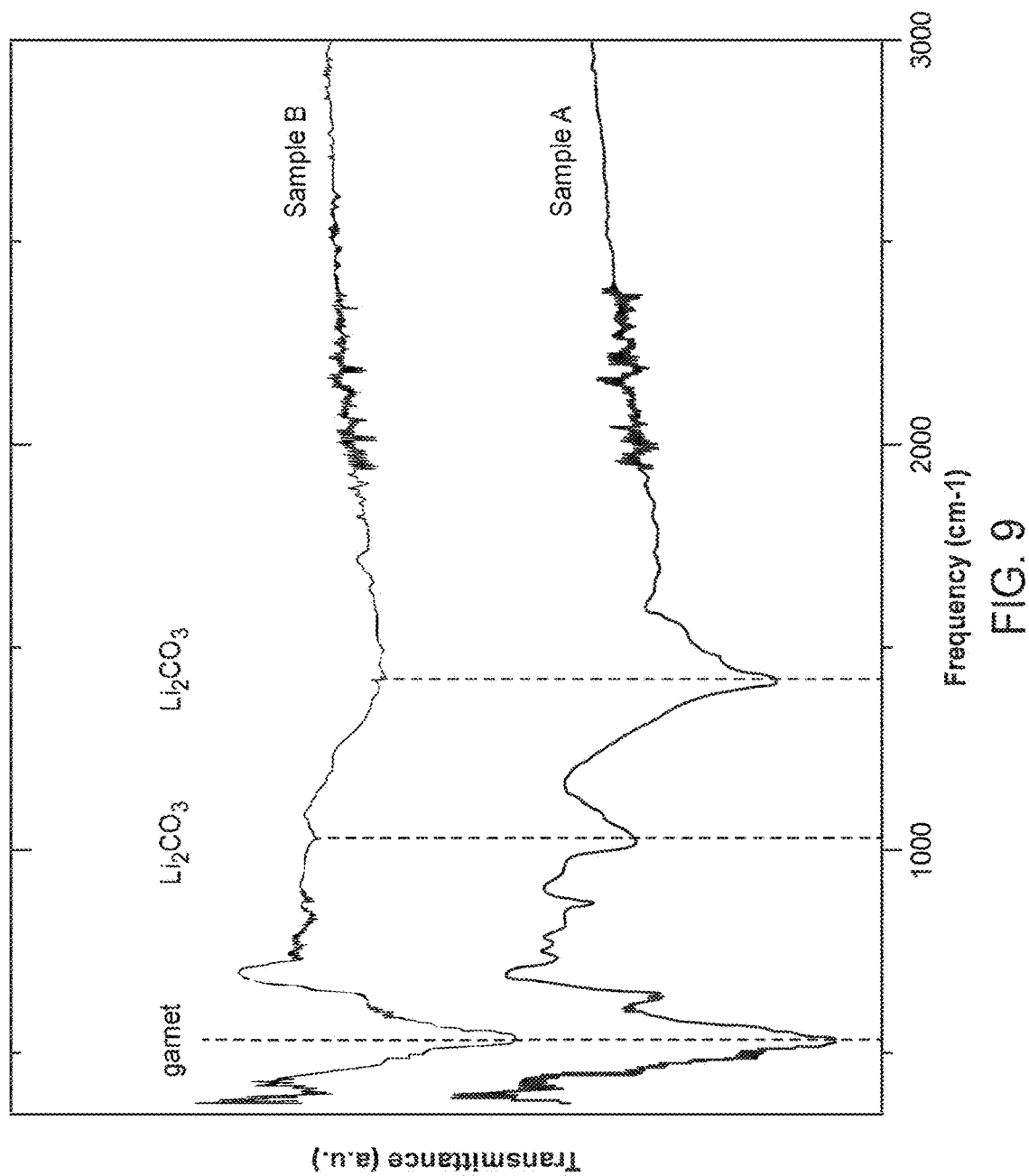
FIG. 9 shows an overlaid FT-IR spectra for Sample A (untreated) and B (treated annealed).

In some examples herein, the top or bottom surface of the electrolyte membrane or separator is characterized by an FT-IR spectrum substantially as shown in FIG. 9

Figure 10:
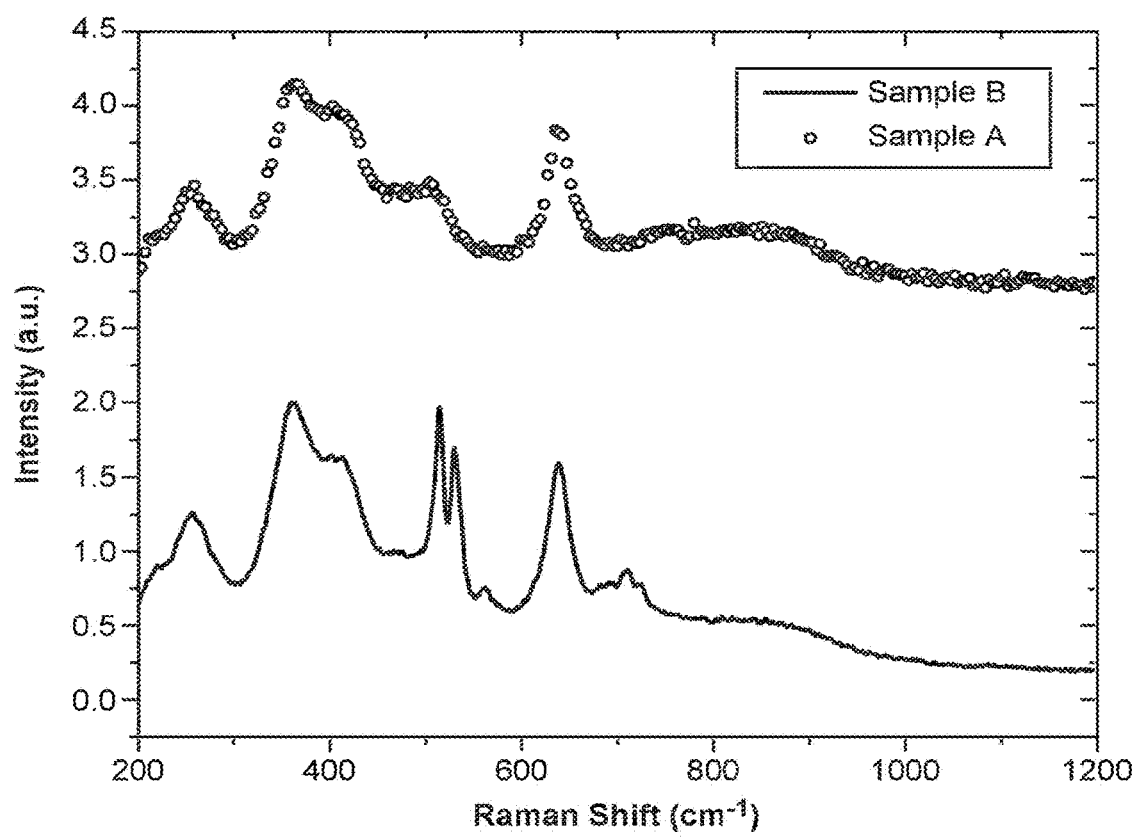
FIG. 10 shows Raman spectra for Samples A and B prepared according to Example 2.

In some of these examples, the top or bottom surface is characterized by a Raman spectrum substantially as shown in FIG. 10.

In some examples herein, set forth are electrolyte separators or membranes characterized by the chemical formula $Li_xLa_3Zr_2O_{12}+yAl_2O_3$, wherein $3 \leq x \leq 8$ and $0 \leq y \leq 1$ and having a top or bottom surface that has less than 5 atomic % of an amorphous material comprising carbon and oxygen. In some of these examples, the top or bottom surface is in direct contact with Li-metal.

In some examples, the top or bottom surface that has a carbon concentration at the surface of less than 5 atomic %.

In some examples, the top or bottom surface that has a hydrogen concentration at the surface of less than 5 atomic %.

In certain examples, the atomic % of carbon is measured by XPS.

In other examples, the atomic % of hydrogen is measured by SIMS.

In some examples herein, the electrolyte separator or membrane has an Oxygen (O) vacancy concentration characterized by an EPR signal spin density of $1 \times 10^{-18}/cm^3$ to $1 \times 10^{-20}/cm^3$.

In some examples herein, the electrolyte separator or membrane has a spin density equal to about $1 \times 10^{-19}/cm^3$.

In certain examples, the compositions and methods set forth herein include a Garnet-type electrolyte material selected from $Li_xLa_3Zr_2O_z \cdot yAl_2O_3$, wherein x is from 5 to 7.5; z is from 11 to 12.25; and y is from 0 to 1.

$Li_4La_BM'_CM''_DM_EO_F$, $Li_4La_uM'_CM''_DNb_EO_F$, wherein $4<A<8.5$, $1.5<B<4$, $0 \leq C \leq 2$, $0 \leq D \leq 2$; $0 \leq E<2$, $10<F<14$, and M' and M' are each, independently in each instance selected from Al, Mo, W, Nb, Sb, Ca, Ba, Sr, Ce, Hf, Rb, or Ta, or $Li_aLa_bZr_cAl_dMe''_eO_f$, wherein $5<a<7.7$; $2<b<4$; $0<c \leq 2.5$; $0 \leq d<2$; $0 \leq e<2$, $10<f<14$ and Me'' is a metal selected from Nb, Ta, V, W, Mo, or Sb, or combinations thereof.

In certain examples, the methods set forth herein include a Garnet-type electrolyte material selected from $Li_4La_B M'_CM''_DZr_EO_F$, $Li_4La_BM'_CM''_DTa_EO_F$, $Li_4La_BM'_CM''_D Nb_EO_F$, wherein $4<A<8.5$, $1.5<B<4$, $0 \leq C \leq 2$, $0 \leq D \leq 2$; $0 \leq E<2$, $10<F<14$, and M' and M'' are each, independently in each instance selected from Al, Mo, W, Nb, Sb, Ca, Ba, Sr, Ce, Hf, Rb, or Ta, or $Li_aLa_bZr_cAl_dMe''_eO_f$ wherein $5<a<7.7$; $2<b<4$; $0<c \leq 2.5$; $0 \leq d<2$; $0 \leq e<2$, $10<f<14$ and Me'' is a metal selected from Nb, Ta, V, W, Mo, or Sb, or combinations thereof.

In certain examples, the methods set forth herein include a Garnet-type electrolyte material selected from $Li_4La_B M'_CM''_DZr_EO_F$, $Li_4La_BM'_CM''_DTa_EO_F$, $Li_4La_BM'_CM''_D Nb_EO_F$, wherein $4<A<8.5$, $1.5<B<4$, $0 \leq C \leq 2$, $0 \leq D \leq 2$; $0 \leq E<2$, $10<F<13$, and M' and M'' are each, independently in each instance selected from Al, Mo, W, Nb, Sb, Ca, Ba, Sr, Ce, Hf, Rb, or Ta, or $Li_aLa_bZr_cAl_dMe''_eO_f$ wherein $5<a<7.7$; $2<b<4$; $0<c \leq 2.5$; $0 \leq d<2$; $0 \leq e<2$, $10<f<13$ and Me'' is a metal selected from Nb, Ta, V, W, Mo, or Sb, or combinations thereof.

In certain examples, the methods set forth herein include a Garnet-type electrolyte selected from $Li_4La_BM'_CM''_D Nb_EO_F$, wherein $4<A<8.5$, $1.5<B<4$, $0 \leq C \leq 2$, $0 \leq D \leq 2$; $0 \leq E<2$, $10<F<14$, and M' and M'' are each, independently in each instance selected from Al, Mo, W, Nb, Sb, Ca, Ba, Sr, Ce, Hf, Rb, or Ta, or combinations thereof.

In certain examples, the methods set forth herein include a Garnet-type electrolyte selected from $Li_4La_BM'_CM''_D Nb_EO_F$, wherein $4<A<8.5$, $1.5<B<4$, $0 \leq C \leq 2$, $0 \leq D \leq 2$; $0 \leq E<2$, $10<F<13$, and M' and M'' are each, independently in each instance selected from Al, Mo, W, Nb, Sb, Ca, Ba, Sr, Ce, Hf, Rb, or Ta.

In certain examples, the methods set forth herein include a Garnet-type electrolyte selected from $Li_aLa_bZr_cAl_d Me''_eO_f$, wherein $5<a<7.7$; $2<b<4$; $0<c \leq 2.5$; $0 \leq d<2$; $0 \leq e<2$, $10<f<14$ and Me'' is a metal selected from Nb, Ta, V, W, Mo, or Sb.

In certain examples, the methods set forth herein include a Garnet-type electrolyte selected from $Li_aLa_bZr_cAl_d Me''_eO_f$, wherein $5<a<7.7$; $2<b<4$; $0<c \leq 2.5$; $0 \leq d<2$; $0 \leq e<2$, $10<f<13$ and Me'' is a metal selected from Nb, Ta, V, W, Mo, or Sb.

In some embodiments, the garnet material described herein is used as an electrolyte. In some of these embodiments, the garnet has the formula $Li_xLa_3Zr_2O_{12} \cdot y\frac{1}{2}Al_2O_3$; wherein $5.0<x<9$ and $0.1<y<1.5$. In some of these examples, the electrolyte is $Li_xLa_3Zr_2O_{12} \cdot 0.35Al_2O_3$. In other of these examples, the electrolyte is $Li_7La_3Zr_2O_{12} \cdot 0.35Al_2O_3$.

In some of the examples wherein the garnet is an electrolyte, the garnet does not include any Nb, Ta, W or Mo, which is used herein to mean that the concentration of those elements (e.g., Nb, Ta, W, or Mo) is 10 parts per million (ppm) or lower. In some examples, the concentration of those elements (e.g., Nb, Ta, W, or Mo) is 1 parts per million (ppm) or lower. In some examples, the concentration of those elements (e.g., Nb, Ta, W, or Mo) is 0.1 parts per million (ppm) or lower.

In some examples, the Lithium stuffed garnet set forth herein can be represented by the general formula $Li_xA_3B_2O_{12}$, wherein $5<x<7$. In some of these examples, A is a large ion occupying an 8-fold coordinated lattice site. In some of these examples, A is La, Sr, Ba, Ca, or a combination thereof. In some examples, B is a smaller more highly charged ion occupying an octahedral site. In some of these examples, B is Zr, Hf, Nb, Ta, Sb, V, or a combination thereof. In certain of these examples, the composition is doped with 0.3 to 1 molar amount of Al per $Li_xA_3B_2O_{12}$. In certain of these examples, the composition is doped with 0.35 molar amount of Al per $Li_xA_3B_2O_{12}$.

In some examples, the lithium stuffed garnet is $Li_7La_3Zr_2O_{12}$ (LLZ) and is doped with alumina. In certain examples, the LLZ is doped by adding $Al_2O_3$ to the reactant precursor mix that is used to make the LLZ. In certain other examples, the LLZ is doped by the aluminum in an aluminum reaction vessel that contacts the LLZ.

In some examples, the alumina doped LLZ has a high conductivity, e.g., greater than $10^{-4}$ S/cm at room temperature.

In some examples, a higher conductivity is observed when some of the Zr is partially replaced by a higher valence species, e.g., Nb, Ta, Sb, or combinations thereof. In some examples, the conductivity reaches as high as $10^{-3}$ S/cm at room temperature.

In some examples, the composition set forth herein is $Li_xA_3B_2O_{12}$ doped with 0.35 molar amount of Al per $Li_xA_3B_2O_{12}$. In certain of these examples, x is 5. In certain other examples, x is 5.5. In yet other examples, x is 6.0. In some other examples, x is 6.5. In still other examples, x is 7.0. In some other examples, x is 7.5.

In some examples, the garnet-based composition is doped with 0.3, 0.35, 0.4, 0.45, 0.5, 0.55, 0.6, 0.65, 0.7, 0.75, 0.8, 0.85, 0.9, 0.95, or 1 molar amount of Al per $Li_xA_3B_2O_{12}$.

In some examples, the garnet-based composition is doped with 0.35 molar amount of Al per $Li_xA_3B_2O_{12}$.

In the examples, herein, the subscripts and molar coefficients in the empirical formulas are based on the quantities of raw materials initially batched to make the described examples.

In some examples, the instant disclosure provides a composition including a lithium stuffed garnet and $Al_2O_3$. In certain examples, the lithium stuffed garnet is doped with alumina. In some examples, the lithium-stuffed garnet is characterized by the empirical formula $Li_4La_BM'_CM''_D Zr_EO_F$, wherein $4<A<8.5$, $1.5<B<4$, $0 \le C \le 2$, $0 \le D \le 2$, $0 \le E \le 2$, $10<F \le 13$, and M' and M" are, independently in each instance, either absent or are each independently selected from Al, Mo, W, Nb, Sb, Ca, Ba, Sr, Ce, Hf, Rb, or Ta; and wherein the molar ratio of Garnet:$Al_2O_3$ is between 0.05 and 0.7.

In some examples, the instant disclosure provides a composition including a lithium stuffed garnet and $Al_2O_3$. In certain examples, the lithium stuffed garnet is doped with alumina. In some examples, the lithium-stuffed garnet is characterized by the empirical formula $Li_4La_BM'_CM''_D Zr_EO_F$, wherein $4<A<8.5$, $1.5<B<4$, $0 \le C \le 2$, $0 \le D \le 2$, $0 \le E \le 2$, $10<F \le 13$, and M' and M" are, independently in each instance, either absent or are each independently selected from Al, Mo, W, Nb, Sb, Ca, Ba, Sr, Ce, Hf, Rb, or Ta; and wherein the molar ratio of Li:Al is between 0.05 and 0.7.

In some examples, the instant disclosure provides a composition including a lithium stuffed garnet and $Al_2O_3$. In certain examples, the lithium stuffed garnet is doped with alumina. In some examples, the lithium-stuffed garnet is characterized by the empirical formula $Li_4La_BM'_CM''_D Zr_EO_F$, wherein $2<A<10$, $2<B<6$, $0 \le C \le 2$, $0 \le D \le 2$, $0 \le E \le 3$, $8<F \le 14$, and M' and M" are, independently in each instance, either absent or are each independently selected from Al, Mo, W, Nb, Sb, Ca, Ba, Sr, Ce, Hf, Rb, or Ta; and wherein the molar ratio of Garnet:$Al_2O_3$ is between 0.01 and 2.

In some examples, the instant disclosure provides a composition including a lithium stuffed garnet and $Al_2O_3$. In certain examples, the lithium stuffed garnet is doped with alumina. In some examples, the lithium-stuffed garnet is characterized by the empirical formula $Li_4La_BM'_CM''_D Zr_EO_F$, wherein $2<A<10$, $2<B<6$, $0 \le C \le 2$, $0 \le D \le 2$, $0 \le E \le 3$, $8<F \le 14$, and M' and M" are, independently in each instance, either absent or are each independently selected from Al, Mo, W, Nb, Sb, Ca, Ba, Sr, Ce, Hf, Rb, or Ta; and wherein the molar ratio of Li:Al is between 0.01 and 2.

In some examples, the lithium stuffed garnet is $Li_4La_B Zr_CM'_DM''_EO_{12}$ and $5<A<7.7$, $2<B<4$, $0<C<2.5$, M' comprises a metal dopant selected from a material including Al and $0<D<2$, M" comprises a metal dopant selected from a material including Nb, Ta, V, W, Mo, Sb, and wherein $0<e<2$. In some examples, the lithium stuffed garnet is a lithium stuffed garnet set forth in U.S. Provisional Patent Application No. 61/887,451, entitled METHOD AND SYSTEM FOR FORMING GARNET MATERIALS WITH SINTERING PROCESS, filed Oct. 7, 2013, the entire contents of which are herein incorporated by reference in its entirety for all purposes.

In some of the examples above, A is 6. In some other examples, A is 6.5. In other examples, A is 7.0. In certain other examples, A is 7.5. In yet other examples, A is 8.0.

In some of the examples above, B is 2. In some other examples, B is 2.5. In other examples, B is 3.0. In certain other examples, B is 3.5. In yet other examples, B is 3.5. In yet other examples, B is 4.0.

In some of the examples above, C is 0.5. In other examples C is 0.6. In some other examples, C is 0.7. In some other examples C is 0.8. In certain other examples C is 0.9. In other examples C is 1.0. In yet other examples, C is 1.1. In certain examples, C is 1.2. In other examples C is 1.3. In some other examples, C is 1.4. In some other examples C is 1.5. In certain other examples C is 1.6. In other examples C is 1.7. In yet other examples, C is 1.8. In certain examples, C is 1.9. In yet other examples, C is 2.0. In other examples C is 2.1. In some other examples, C is 2.2. In some other examples C is 2.3. In certain other examples C is 2.4. In other examples C is 2.5. In yet other examples, C is 2.6. In certain examples, C is 2.7. In yet other examples, C is 2.8. In other examples C is 2.9. In some other examples, C is 3.0.

In some of the examples above, D is 0.5. In other examples D is 0.6. In some other examples, D is 0.7. In some other examples D is 0.8. In certain other examples D is 0.9. In other examples D is 1.0. In yet other examples, D is 1.1. In certain examples, D is 1.2. In other examples D is 1.3. In some other examples, D is 1.4. In some other examples D is 1.5. In certain other examples D is 1.6. In other examples D is 1.7. In yet other examples, D is 1.8. In certain examples, D is 1.9. In yet other examples, D is 2.0. In other examples D is 2.1. In some other examples, D is 2.2. In some other examples D is 2.3. In certain other examples D is 2.4. In other examples D is 2.5. In yet other examples, D is 2.6. In certain examples, D is 2.7. In yet other examples, D is 2.8. In other examples D is 2.9. In some other examples, D is 3.0.

In some of the examples above, E is 0.5. In other examples E is 0.6. In some other examples, E is 0.7. In some other examples E is 0.8. In certain other examples E is 0.9. In other examples E is 1.0. In yet other examples, E is 1.1. In certain examples, E is 1.2. In other examples E is 1.3. In some other examples, E is 1.4. In some other examples E is 1.5. In certain other examples E is 1.6. In other examples E is 1.7. In yet other examples, E is 1.8. In certain examples, E is 1.9. In yet other examples, E is 2.0. In other examples E is 2.1. In some other examples, E is 2.2. In some other examples E is 2.3. In certain other examples E is 2.4. In other examples E is 2.5. In yet other examples, E is 2.6. In certain examples, E is 2.7. In yet other examples, E is 2.8. In other examples E is 2.9. In some other examples, E is 3.0.

In some of the examples above, F is 11.1. In other examples F is 11.2. In some other examples, F is 11.3. In some other examples F is 11.4. In certain other examples F is 11.5. In other examples F is 11.6. In yet other examples, F is 11.7. In certain examples, F is 11.8. In other examples F is 11.9. In some other examples, F is 12. In some other examples F is 12.1. In certain other examples F is 12.2. In other examples F is 12.3. In yet other examples, F is 12.3. In certain examples, F is 12.4. In yet other examples, F is 12.5. In other examples F is 12.6. In some other examples, F is 12.7. In some other examples F is 12.8. In certain other examples E is 12.9. In other examples F is 13.

In some particular examples, provided herein is a composition characterized by the empirical formula $Li_xLa_3Zr_2O_{12} \cdot y \frac{1}{2}Al_2O_3$; wherein $5.0<x<9$ and $0.1<y<1.5$.

In some examples, x is 5. In other examples, x is 5.5. In some examples, x is 6. In some examples, x is 6.5. In other examples, x is 7. In some examples, x is 7.5. In other examples x is 8. In some examples, y is 0.3. In some examples, y is 0.35. In other examples, y is 0.4. In some examples, y is 0.45. In some examples, y is 0.5. In other examples, y is 0.55. In some examples, y is 0.6. In other examples y is 0.7. In some examples, y is 0.75. In other examples, y is 0.8. In some examples, y is 0.85. In other examples y is 0.9. In some examples, y is 0.95. In other examples, y is 1.0.

In some examples, provided herein is a composition characterized by the empirical formula $Li_{7.0}La_3(Zr_{t1}+Nb_{t2}+Ta_{t3})O_{12}+0.35Al_2O_3$. In this formula, t1+t2+t3=subscript 2 so that the molar ratio of La to the combined amount of (Zr+Nb+Ta) is 3:2.

In some examples, provided herein is a composition is characterized by the empirical formula $Li_7La_3Zr_2O_{12}\cdot 0.35Al_2O_3$.

In some of the above examples, A is 5, 6, 7, or 8. In certain examples, wherein A is 7.

In some of the above examples, M' is Nb and M" is Ta.

In some of the above examples, E is 1, 1.5, or 2. In certain examples, E is 2.

In some of the above examples, C and D are 0.

In some examples, provided herein is a composition wherein the molar ratio of Garnet:$Al_2O_3$ is between 0.1 and 0.65. In some examples, the Li:Al ratio is between 7:0.2 to 7:1.3. In some examples, the Li:Al ratio is between 7:0.3 to 7:1.2. In some examples, the Li:Al ratio is between 7:0.3 to 7:1.1. In some examples, the Li:Al ratio is between 7:0.4 to 7:1.0. In some examples, the Li:Al ratio is between 7:0.5 to 7:0.9. In some examples, the Li:Al ratio is between 7:0.6 to 7:0.8. In some examples, the Li:Al ratio is about 7:0.7. In some examples, the Li:Al ratio is 7:0.7.

In some examples, provided herein is a composition wherein the molar ratio of Garnet:$Al_2O_3$ is between 0.15 and 0.55.

In some examples, provided herein is a composition wherein the molar ratio of Garnet:$Al_2O_3$ is between 0.25 and 0.45.

In some examples, provided herein is a composition wherein the molar ratio of Garnet:$Al_2O_3$ is 0.35.

In some examples, provided herein is a composition wherein the molar ratio of Al to garnet is 0.35.

In some examples, provided herein is a composition wherein the lithium-stuffed garnet is characterized by the empirical formula $Li_7La_3Zr_2O_{12}$ and is doped with aluminum.

In some examples, the lithium stuffed garnet is $Li_7La_3Zr_2O_{12}$ (LLZ) and is doped with alumina. In certain examples, the LLZ is doped by adding $Al_2O_3$ to the reactant precursor mix that is used to make the LLZ. In certain other examples, the LLZ is doped by the aluminum in an aluminum reaction vessel that contacts the LLZ. When the LLZ is doped with alumina, conductive holes are introduced which increases the conductivity of the lithium stuffed garnet. In some examples, this increased conductivity is referred to as increased ionic (e.g., $Li^+$) conductivity.

ii. Catholytes

Catholyte materials suitable for use with the components, devices, and methods set forth herein include, without limitation, a garnet material selected from $Li_A La_B M'_C M''_D Zr_E O_F$, $Li_A La_B M'_C M''_D Ta_E O_F$, $Li_A La_B M'_C M''_D Nb_E O_F$, wherein $4<A<8.5$, $1.5<B<4$, $0\leq C\leq 2$, $0\leq D\leq 2$, $0\leq E<2$, $10<F<14$, and M' and M" are each, independently in each instance selected from Al, Mo, W, Nb, Sb, Ca, Ba, Sr, Ce, Hf, Rb, or Ta, or $Li_a La_b Zr_c Al_d Me''_e O_f$, wherein $5<a<7.7$; $2<b<4$; $0\leq c\leq 2.5$; $0\leq d<2$; $0\leq e<2$, $10<f<14$ and Me" is a metal selected from Nb, Ta, V, W, Mo, or Sb. In some embodiments, the garnet material is $Li_A La_B M'_C M''_D Zr_E O_F$. In some other embodiments, the garnet material is $Li_A La_B M'_C M''_D Ta_E O_F$. In other embodiments, the garnet material is $Li_A La_B M'_C M''_D Nb_E O_F$.

In the above examples, the subscript value ($4<A<8.5$, $1.5<B<4$, $0\leq C\leq 2$, $0\leq D\leq 2$; $0\leq E<2$, $10<F<14$) characterize the ratio of reactants used to make the garnet material. Certain deviations from these reactant ratios may be present in the garnet products. As used herein, precursors to Garnet refers to the reactants used to produce or to synthesize the Garnet.

In the above examples, the subscript value (e.g., $4<A<8.5$, $1.5<B<4$, $0\leq C\leq 2$, $0\leq D\leq 2$; $0\leq E<2$, $10<F\leq 13$) characterize the ratio of reactants used to make the garnet material. Certain deviations from these reactant ratios may be present in the garnet products. As used herein, precursors to Garnet refers to the reactants used to produce Garnet.

In the above examples, the subscript values may also include $4<A<8.5$, $1.5<B<4$, $C<2$, $0\leq D\leq 2$; $0\leq E<2$, $10<F<14$. In some examples, C is equal to 1.99 or less.

In the above examples, the subscript values may also include $4<A<8.5$, $1.5<B<4$, $C<2$, $0\leq D\leq 2$; $0\leq E<2$, $10<F\leq 13$. In some examples, C is equal to 1.99 or less.

In certain embodiments, the garnet is a lithium-stuffed garnet.

In some embodiments, the garnet is characterized $Li_a La_b Zr_c Al_d Me''_e O_f$, wherein the subscripts are characterized by the values noted above.

In some embodiments, the lithium-stuffed garnet is a lithium lanthanum zirconium oxide that is mixed with aluminum oxide. In some of these examples, the lithium lanthanum zirconium oxide is characterized by the formula $Li_{7.0}La_3Zr_2O_{12}+0.35Al_2O_3$, wherein the subscript and coefficients represent molar ratios that are determined based on the reactants used to make the garnet.

In some embodiments, the ratio of La:Zr is 3:2. In some other examples, the garnet is $Li_{7.0}La_3(Zr_{t1}+Nb_{t2}+Ta_{t3})O_{12}+0.35Al_2O_3$; wherein (t1+t2+t3=subscript 2) so that the La:(Zr/Nb/Ta) ratio is 3:2.

In some examples, the garnet is $Li_xLa_3Zr_2O_{12}+yAl_2O_3$, wherein x ranges from 5.5 to 9; and y ranges from 0 to 1. In some examples x is 7 and y is 0.35.

The catholytes set forth herein include, in some embodiments, a hierarchical structure with a lithium conducting garnet scaffold filled with carbon electron conductive additive, lithium conductive polymer binder, and active material. The active material loading can be greater than 50 volume percent to enable high energy density. In some examples, the garnet is sintered and retains >70% porosity to allow for the volume of the other components. The disclosures herein overcomes several problems associated with the assembly of a solid energy storage device, for example, but not limited to, sintering composite electrodes having well developed contact points between particles and reduced particle-particle electrical resistance, which permits higher current flow without a significant voltage drop; also preparing methods for making entire device (electrodes, and electrolyte) in one step; also preparation methods for making solid state energy storage devices which eliminate the need to use a flammable liquid electrolyte, which is a safety hazard in some instances; and methods for FAST sintering films to reduce the process time and expense of making electrochemical devices; and methods for making FAST sintering and densifying components of electrode composites without significant interdiffusion or detrimental chemical reaction.

iii. Free Standing

In some examples, the disclosure sets forth herein a free-standing thin film Garnet-type electrolyte prepared by the method set forth herein. Exemplary free-standing thin films are found, for example, in US Patent Application Publication No. 2015/0099190, published on Apr. 9, 2015, entitled GARNET MATERIALS FOR LI SECONDARY BATTERIES AND METHODS OF MAKING AND USING GARNET MATERIALS, and filed Oct. 7, 2014, the contents of which are incorporated by reference in their entirety.

In some embodiments, disclosed herein is a free-standing thin film Garnet-type electrolyte prepared by a method set forth herein.

In some embodiments, the thickness of the free-standing film is less than 50 µm. In certain embodiments, the thickness of the film is less than 40 µm. In some embodiments, the thickness of the film is less than 30 µm. In some other embodiments, the thickness of the film is less than 20 µm. In other embodiments, the thickness of the film is less than 10 µm. In yet other embodiments, the thickness of the film is less than 5 µm.

In some embodiments, the thickness of the film is less than 45 µm. In certain embodiments, the thickness of the film is less than 35 µm. In some embodiments, the thickness of the film is less than 25 µm. In some other embodiments, the thickness of the film is less than 15 µm. In other embodiments, the thickness of the film is less than 5 µm. In yet other embodiments, the thickness of the film is less than 1 µm.

In some embodiments, the thickness of the film is about 1 µm to about 50 µm. In certain embodiments, the thickness of the film about 10 µm to about 50 µm. In some embodiments, the thickness of the film is about 20 µm to about 50 µm. In some other embodiments, the thickness of the film is about 30 µm to about 50 µm. In other embodiments, the thickness of the film is about 40 µm to about 50 µm.

In some embodiments, the thickness of the film is about 1 µm to about 40 µm. In certain embodiments, the thickness of the film about 10 µm to about 40 µm. In some embodiments, the thickness of the film is about 20 µm to about 40 µm. In some other embodiments, the thickness of the film is about 30 µm to about 40 µm. In other embodiments, the thickness of the film is about 20 µm to about 30 µm.

In some examples, set forth herein is a thin and free standing sintered garnet film, wherein the film thickness is less than 50 µm and greater than 10 nm, and wherein the film is substantially flat; and wherein the garnet is optionally bonded to a current collector (CC) film comprising a metal or metal powder on at least one side of the film.

In some examples, the thin and free standing sintered garnet film has thickness is less than 20 µm or less than 10 µm. In some examples, the thin and free standing sintered garnet film has a surface roughness of less than 5 µm. In some examples, the thin and free standing sintered garnet film has a surface roughness of less than 4 µm. In some examples, the thin and free standing sintered garnet film has a surface roughness of less than 2 µm. In some examples, the thin and free standing sintered garnet film has a surface roughness of less than 1 µm. In certain examples, the garnet has a median grain size of between 0.1 µm to 10 µm. In certain examples, the garnet has a median grain size of between 2.0 µm to 5.0 µm.

iv. Substrate Bound

In some examples, the films set forth herein include a film that is bound to a substrate that is selected from a polymer, a glass, or a metal. In some of these examples, the substrate adhered to or bound to the film is a current collector (CC). In some of these examples, the CC film includes a metal selected from the group consisting of Nickel (Ni), Copper (Cu), steel, stainless steel, combinations thereof, and alloys thereof. In some of these examples, the film is bonded to a metal current collector (CC) on one side of the film. In yet other examples, the CC is positioned between, and in contact with, two garnet films.

v. Film Dimensions

In some examples, the thin films set forth herein are less than 50 µm in thickness. In some other examples, the thin films set forth herein are less than 45 µm in thickness. In certain examples, the thin films set forth herein are less than 40 µm in thickness. In still other examples, the thin films set forth herein are less than 35 µm in thickness. In some examples, the thin films set forth herein are less than 30 µm in thickness. In some other examples, the thin films set forth herein are less than 25 µm in thickness. In certain examples, the thin films set forth herein are less than 20 µm in thickness. In still other examples, the thin films set forth herein are less than 15 µm in thickness. In some examples, the thin films set forth herein are less than 10 µm in thickness. In some other examples, the thin films set forth herein are less than 5 µm in thickness. In certain examples, the thin films set forth herein are less than 0.5 µm in thickness. In still other examples, the thin films set forth herein are less than 0.1 µm in thickness.

In some examples, provided herein is a composition formulated as a thin film having a film thickness of about 100 nm to about 100 µm. In certain examples, the thickness is 50 µm. In other examples, the thickness is 40 µm. In some examples, the thickness is 30 µm. In other examples, the thickness is 20 µm. In certain examples, the thickness is 10 µm. In other examples, the thickness is 5 µm. In some examples, the thickness is 1 µm. In yet other examples, the thickness is 0.5 µm.

In some of these examples, the films are 1 mm in length. In some other of these examples, the films are 5 mm in length. In yet other examples, the films are 10 mm in length. In still other examples, the films are 15 mm in length. In certain examples, the films are 25 mm in length. In other examples, the films are 30 mm in length. In some examples, the films are 35 mm in length. In some other examples, the films are 40 mm in length. In still other examples, the films are 45 mm in length. In certain examples, the films are 50 mm in length. In other examples, the films are 30 mm in length. In some examples, the films are 55 mm in length. In some other examples, the films are 60 mm in length. In yet other examples, the films are 65 mm in length. In still other examples, the films are 70 mm in length. In certain examples, the films are 75 mm in length. In other examples, the films are 80 mm in length. In some examples, the films are 85 mm in length. In some other examples, the films are 90 mm in length. In still other examples, the films are 95 mm in length. In certain examples, the films are 100 mm in length. In other examples, the films are 30 mm in length.

In some examples, the films are 1 cm in length. In some other examples, the films are 2 cm in length. In other examples, the films are 3 cm in length. In yet other examples, the films are 4 cm in length. In some examples, the films are 5 cm in length. In other examples, the films are 6 cm in length. In yet other examples, the films are 7 cm in length. In some other examples, the films are 8 cm in length. In yet other examples, the films are 9 cm in length. In still other examples, the films are 10 cm in length. In some examples, the films are 11 cm in length. In some other examples, the films are 12 cm in length. In other examples, the films are 13 cm in length. In yet other examples, the films are 14 cm in length. In some examples, the films are 15 cm in length. In other examples, the films are 16 cm in length. In yet other examples, the films are 17 cm in length. In some other examples, the films are 18 cm in length. In yet other examples, the films are 19 cm in length. In still other examples, the films are 20 cm in length. In some examples, the films are 21 cm in length. In some other examples, the films are 22 cm in length. In other examples, the films are 23 cm in length. In yet other examples, the films are 24 cm in length. In some examples, the films are 25 cm in length. In other examples, the films are 26 cm in length. In yet other examples, the films are 27 cm in length. In some other examples, the films are 28 cm in length. In yet other examples, the films are 29 cm in length. In still other examples, the films are 30 cm in length. In some examples, the films are 31 cm in length. In some other examples, the films are 32 cm in length. In other examples, the films are 33 cm in length. In yet other examples, the films are 34 cm in length. In some examples, the films are 35 cm in length. In other examples, the films are 36 cm in length. In yet other examples, the films are 37 cm in length. In some other examples, the films are 38 cm in length. In yet other examples, the films are 39 cm in length. In still other examples, the films are 40 cm in length. In some examples, the films are 41 cm in length. In some other examples, the films are 42 cm in length. In other examples, the films are 43 cm in length. In yet other examples, the films are 44 cm in length. In some examples, the films are 45 cm in length. In other examples, the films are 46 cm in length. In yet other examples, the films are 47 cm in length. In some other examples, the films are 48 cm in length. In yet other examples, the films are 49 cm in length. In still other examples, the films are 50 cm in length. In some examples, the films are 51 cm in length. In some other examples, the films are 52 cm in length. In other examples, the films are 53 cm in length. In yet other examples, the films are 54 cm in length. In some examples, the films are 55 cm in length. In other examples, the films are 56 cm in length. In yet other examples, the films are 57 cm in length. In some other examples, the films are 58 cm in length. In yet other examples, the films are 59 cm in length. In still other examples, the films are 60 cm in length. In some examples, the films are 61 cm in length. In some other examples, the films are 62 cm in length. In other examples, the films are 63 cm in length. In yet other examples, the films are 64 cm in length. In some examples, the films are 65 cm in length. In other examples, the films are 66 cm in length. In yet other examples, the films are 67 cm in length. In some other examples, the films are 68 cm in length. In yet other examples, the films are 69 cm in length. In still other examples, the films are 70 cm in length. In some examples, the films are 71 cm in length. In some other examples, the films are 72 cm in length. In other examples, the films are 73 cm in length. In yet other examples, the films are 74 cm in length. In some examples, the films are 75 cm in length. In other examples, the films are 76 cm in length. In yet other examples, the films are 77 cm in length. In some other examples, the films are 78 cm in length. In yet other examples, the films are 79 cm in length. In still other examples, the films are 80 cm in length. In some examples, the films are 81 cm in length. In some other examples, the films are 82 cm in length. In other examples, the films are 83 cm in length. In yet other examples, the films are 84 cm in length. In some examples, the films are 85 cm in length. In other examples, the films are 86 cm in length. In yet other examples, the films are 87 cm in length. In some other examples, the films are 88 cm in length. In yet other examples, the films are 89 cm in length. In still other examples, the films are 90 cm in length. In some examples, the films are 91 cm in length. In some other examples, the films are 92 cm in length. In other examples, the films are 93 cm in length. In yet other examples, the films are 94 cm in length. In some examples, the films are 95 cm in length. In other examples, the films are 96 cm in length. In yet other examples, the films are 97 cm in length. In some other examples, the films are 98 cm in length. In yet other examples, the films are 99 cm in length. In still other examples, the films are 100 cm in length. In some examples, the films are 101 cm in length. In some other examples, the films are 102 cm in length. In other examples, the films are 103 cm in length. In yet other examples, the films are 104 cm in length. In some examples, the films are 105 cm in length. In other examples, the films are 106 cm in length. In yet other examples, the films are 107 cm in length. In some other examples, the films are 108 cm in length. In yet other examples, the films are 109 cm in length. In still other examples, the films are 110 cm in length. In some examples, the films are 111 cm in length. In some other examples, the films are 112 cm in length. In other examples, the films are 113 cm in length. In yet other examples, the films are 114 cm in length. In some examples, the films are 115 cm in length. In other examples, the films are 116 cm in length. In yet other examples, the films are 117 cm in length. In some other examples, the films are 118 cm in length. In yet other examples, the films are 119 cm in length. In still other examples, the films are 120 cm in length.

In some examples, the garnet-based films are prepared as a monolith useful for a lithium secondary battery cell. In some of these cells, the form factor for the garnet-based film is a film with a top surface area of about 10 cm$^2$. In certain cells, the form factor for the garnet-based film with a top surface area of about 100 cm$^2$.

In some examples, the films set forth herein have a Young's Modulus of about 130-150 GPa. In some other examples, the films set forth herein have a Vicker's hardness of about 5-7 GPa.

In some examples, the films set forth herein have a porosity less than 20%. In other examples, the films set forth herein have a porosity less than 10%. In yet other examples, the films set forth herein have a porosity less than 5%. In still other examples, the films set forth herein have a porosity less than 3%.

VI. Electrochemical Cells

In some examples, set forth herein is an electrochemical cell having a positive electrode, a negative electrode, and an electrolyte between the positive and negative electrode, wherein the electrolyte comprises an electrolyte separator or membrane set forth herein.

In some examples, set forth herein is an electrochemical cell having an electrolyte separator set forth herein, wherein the electrochemical cell further includes a gel electrolyte.

In some examples, set forth herein is an electrochemical cell having an electrolyte separator set forth herein, wherein the electrochemical cell further includes a gel electrolyte between the positive electrode active material and the electrolyte separator.

In some examples, gel comprises a solvent, a lithium salt, and a polymer.

In some of these examples, the solvent is ethylene carbonate, propylene carbonate, diethylene carbonate, methylene carbonate, or a combination thereof.

In some of these examples, the lithium salt is LiPF$_6$, LiBOB, or LFTSi.

In some of these examples, the polymer is PVDF-HFP.

In some of these examples, the gel includes PVDF with the solvent dioxolane and the salt, lithium bis(trifluoromethane)sulfonimide (LiTFSI), at 1M concentration.

In some examples the polymer is polypropylene (PP), atactic polypropylene (aPP), isotactive polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), PE-co-poly(methylene cyclopentane) (PE-co-PMCP), poly methyl-methacrylate (and other acrylics), acrylic, polyvinylacetacetal resin, polyvinylbutylal resin, PVB, polyvinyl acetal resin, stereoblock polypropylenes, polypropylene polymethylpentene copolymer, polyethylene oxide (PEO), PEO block copolymers, silicone, or the like.

In some of these examples, the gel acetonitrile as a solvent and a 1M concentration of a lithium salt, such as LiPF$_6$.

In some of these examples, the gel includes a dioxolane solvent and a 1M concentration of a Lithium salt, such as LiTFSI or LiPF$_6$.

In certain examples, the gel includes PVDF polymer, dioxolane solvent and 1M concentration of LiFTSI or LiPF$_6$. In some other examples, the gel includes PVDF polymer, acetonitrile (ACN) solvent and 1M concentration of LiFTSI or LiPF$_6$. In some of these examples, the gel has a EC:PC solvent and a 1M concentration of a Lithium salt, such as LiTFSI or LiPF$_6$. In some of these examples, the composite and the gel show a low impedance of about 10 Ωcm$^2$.

In some examples, the gel is a composite electrolyte which includes a polymer and a ceramic composite with the polymer phase having a finite lithium conductivity. In some examples, the polymer is a single ion conductor (e.g., Li$^+$). In other examples, the polymer is a multi-ion conductor (e.g., Li$^+$ and electrons). The following non-limiting combinations of polymers and ceramics may be included in the composite electrolyte. The composite electrolyte may be selected from polyethyleneoxide (PEO) coformulated with LiCF$_3$SO$_3$ and Li$_3$N, PEO with LiAlO$_2$ and Li$_3$N, PEO with LiClO$_4$, PEO:LiBF4-TiO$_2$, PEO with LiBF$_4$—ZrO$_2$. In some of these composites, in addition to the polymers, the composite includes an additive selected from Li$_3$N; Al$_2$O$_3$, LiAlO$_3$; SiO$_2$, SiC, (PO$_4$)$^{3-}$, TiO$_2$; ZrO$_2$, or zeolites in small amounts. In some examples, the additives can be present at from 0 to 95% w/w. In some examples, the additives include Al$_2$O$_3$, SiO$_2$, Li$_2$O, Al$_2$O$_3$, TiO$_2$, P$_2$O$_5$, Li$_{1.3}$Ti$_{1.7}$Al$_{0.3}$(PO$_4$)$_3$, or (LTAP). In some of these composite electrolytes, the polymer present is polyvinylidenefluoride at about 10% w/w. In some of these as composite electrolytes, the composite includes an amount of a solvent and a lithium salt (e.g., LiPF$_6$). In some of these composites, the solvent is ethyl carbonate/dimethyl carbonate (EC/DMC) or any other solvent set forth herein. In some examples, the composite includes a solvent useful for dissolving lithium salts. In some of the composite electrolytes set forth herein, the polymer serves several functions. In one instance, the polymer has the benefit of ameliorating interface impedance growth in the solid electrolyte even if the polymer phase conductivity is much lower than the ceramic. In other instances, the polymer reinforces the solid electrolyte mechanically. In some examples, this mechanical reinforcement includes coformulating the solid electrolyte with a compliant polymer such as poly paraphenylene terephthalamide. These polymers can be one of a variety of forms, including a scaffold.

vii. Methods of Making Membrane and Separators

In some examples, set forth herein is method of surface treating an electrolyte separator, which includes providing chemical precursors to the electrolyte; calcining the chemical precursors to form a calcined electrolyte; providing a slurry comprising the calcined electrolyte; casting a film from the slurry; sintering the film to form a sintered electrolyte separator; and surface treating the sintered electrolyte separator in a reducing atmosphere. In some examples, surface treating comprises laser ablating, polishing, polishing in dry room atmosphere, annealing, etching, acid washing, plasma abating, and ozone treating.

In some examples, set forth herein is a method of annealing an electrolyte separator, including providing chemical precursors to the electrolyte separator; calcining the chemical precursors in an oxidizing atmosphere to form a calcined electrolyte; providing a slurry comprising the calcined electrolyte; casting a film from the slurry; sintering the film in a reducing or inert atmosphere to form a sintered electrolyte separator; and annealing the sintered electrolyte separator in a reducing or inert atmosphere.

In some examples, the methods further include milling or mixing the chemical precursors before the calcining step.

In some examples, the methods include an oxidizing atmosphere as Air.

In some examples, the sintering step in the methods herein becomes the annealing step by controlling or changing the reducing or inert atmosphere.

In some examples, the sintering step in the methods herein becomes the annealing step by changing temperature of the sintered electrolyte separator.

In some examples, the chemical precursors are garnet chemical precursors.

The method of claim 38 or 39, wherein the annealing comprises heating the sintered electrolyte from 200° C. to 1000° C. In some examples, the heating is to 210°, 220°, 230°, 240°, 250°, 260°, 270°, 280°, 290°, 300°, 310°, 320°, 330°, 340°, 350°, 360°, 370°, 380°, 390°, 300°, 410°, 420°, 430°, 440°, 450°, 460°, 470°, 480°, 490°, 400°, 510°, 520°, 530°, 540°, 550°, 560°, 570°, 580°, 590°, 500°, 210°, 620°, 630°, 640°, 650°, 660°, 670°, 680°, 690°, 700°, 710°, 720°, 730°, 740°, 750°, 760°, 770°, 780°, 790°, 800°, 910°, 920°, 930°, 940°, 950°, 960°, 970°, 980°, 990°, or 1000° Celsius (C), In some examples, the annealing comprises heating the sintered electrolyte from 500° C. to 800° C. In some examples, the annealing comprises heating the sintered electrolyte from 600° C. to 800° C. In some examples, the annealing comprises heating the sintered electrolyte from 700° C. to 800° C. In some examples, the annealing comprises heating the sintered electrolyte from 500° C. to 700° C. In some examples, the annealing comprises heating the sintered electrolyte from 500° C. to 600° C. In some examples, the annealing comprises heating the sintered electrolyte from 550° C. to 650° C. The method of claim 39, wherein the annealing comprises heating the sintered electrolyte from 600° C. to 700° C.

In some examples, the methods further include laser ablation of the electrolyte surface in a(n) Ar, N$_2$, He, and/or O$_2$ atmosphere.

In some examples, the methods include plasma ablation in Ar, N$_2$, H$_2$, He and/or O$_2$ environment.

In some examples, the methods include heating the sintered electrolyte from 200° C. to 1000° C. in an inert atmosphere selected from the group consisting of He, Ne, Ar, Xe, N$_2$, and combinations thereof.

In some examples, the methods include heating the sintered electrolyte from 200° C. to 1000° C. in an inert atmosphere selected from He, Ne, Ar, Xe, or $N_2$.

In some examples, the methods include heating the sintered electrolyte from 200° C. to 1000° C. in an inert atmosphere selected from He:$H_2$, Ne:$H_2$, Ar:$H_2$, Xe:$H_2$, or $N_2$:$H_2$. In some of these examples, the ratio of the two gases is 100:0 to 50:50 v/v. In certain examples, In some examples, the ratio of Ar:$H_2$ is 100:0 to 50:50 v/v.

In some examples, the annealing includes heating the sintered electrolyte from 200° C. to 1000° C. in an Argon:$H_2$ atmosphere until the top or bottom surface of the electrolyte does not have a layer thereupon comprising a lithium carbonate, lithium hydroxide, lithium oxide, lithium peroxide, a hydrate thereof, an oxide thereof, or a combination thereof.

In some examples, the annealing further includes cooling the electrolyte at least 10° C./min, in an Air atmosphere to room temperature after the calcining step.

In some examples, the methods herein further include comprising depositing Li metal onto the polished surface within 2 days of the annealing step.

EXAMPLES

Example 1—Preparation of Electrolyte Separator

In this example, a lithium stuffed garnet electrolyte separator was prepared.

Lithium-Stuffed Garnet Powder. Calcined lithium-stuffed garnet powder was produced by the following series of steps. First, lithium hydroxide (LiOH), aluminum nitrate [Al($NO_3$)$_3$9$H_2$O], zirconia ($ZrO_2$), and lanthanum oxide ($La_2O_3$) were massed (i.e., weighed) and mixed into a combination wherein the molar ratio of the constituent elements was $Li_7La_3Zr_2O_{12}0.5Al_2O_3$. This combination was mixed and milled, using wet-milling techniques and $ZrO_2$ milling media, until the combination had a $d_{50}$ particle size of 100 nm 5 μm. Also included with the milling media was a Rhodaline™ dispersant. The milled combination of reactants was separated from the milling media after milling to the $d_{50}$ particle size. The separated milled reactants was then placed in an alumina crucible and calcined at about nine-hundred degrees Celsius (900° C.) for approximately six (6) hours in an oven with a controlled oxidizing atmosphere in contact with the calcining reactants. The calcination process burned and/or combusted residual solvents as well as the dispersant, binder, and surfactant. The calcination caused the inorganic reactants to react to form the lithium-stuffed garnet. The calcined product was removed from the alumina crucibles after it cooled to room temperature. The product is characterized by a variety of analytical techniques, including x-ray powder diffraction (XRD) and scanning electron microscopy. This product is referred to as calcined lithium-stuffed garnet and has an empirical formula of approximately $Li_7La_3Zr_2O_{12}0.5Al_2O_3$.

The milled and calcined product were then mixed with a plasticizer, a binder selected from acrylic, polyvinylbuturate (PVB), or polyvinylacetate (PVA), a solvent selected from THF, IPA, or butanol. The organic components constituted 10-20 weight percent of the slurry. The remainder of the slurry was the solid calcined product.

The slurry mixture was then tape cast using a doctor blade setting of 20-400 μm to produce 10-200 μm thin films of calcined but unsintered lithium-stuffed garnet in combination with surfactants, binders, plasticizers, and dispersants.

The tape cast thin films were allowed to dry. These dry calcined by unsintered thin films are referred to as green films.

The green films were placed between garnet ceramic setter plates and calcined in an oven filled with an Argon:$H_2$O mixture (calcination step) followed by an Argon:$H_2$ mixture and heated to 1200° C. for six (6) hours (sintering step). Setter plates were used as substantially set forth in U.S. Provisional Patent Application No. 62/148,337, filed Apr. 16, 2015, entitled LITHIUM STUFFED GARNET SETTER PLATES FOR SOLID ELECTROLYTE FABRICATION. In some samples, the green films were sintered at a temperature selected from 1100° C., 1125° C., 1150° C., or 1175° C. for 6 hours in an oven with a controlled atmosphere in contact with the calcining reactants.

The sintered films were, for some samples, then stored in an Argon-filled glove box, and, for other samples, were stored in air.

Example 2—Annealing Electrolyte Separators to Remove Surface Species

In this example, a lithium stuffed garnet electrolyte separator was made according to Example 1 and then subsequently annealed to remove surface species which result in an increased ionic impedance in the separator. Also in this example a different sample of a lithium stuffed garnet electrolyte separator was made according to Example 1 but not subsequently annealed to remove surface species and instead was exposed to air at room temperature for two hours after being made according to Example 1. The sample which was not annealed is referred to herein as Sample A. The sample which was annealed is referred to herein as Sample B.

Following the synthesis described in Example 1, the separator was placed in nickel crucible in a tubular furnace with a controlled atmosphere in contact with the annealing separator. The controlled atmosphere included a gas phase protection environment. Suitable gas phase protection environments used were Ar, He, Kr, $N_2$, $H_2$ and mixtures in both static and flowing conditions. The pressure was maintained at 1 atmosphere.

The samples were annealed at temperature selected from 350° C. to 900° C. as follows:

| Annealing Temperature | Annealing Time (hours) |
| --- | --- |
| 350° C. | 12 |
| 450° C. | 12 |
| 550° C. | 8 |
| 650° C. | 2 |
| 750° C. | 2 |
| 850° C. | 2 |
| 950° C. | 2 |

Example 3—Physical Characterization

In this example, the lithium stuffed garnet electrolyte separators were characterized.

Electrolyte samples were prepared using a FEI Helio Focused Ion Beam (FIB) electron microscope. The sample had a thickness less 200 nm for TEM imaging. After sample preparation, the sample was stored in an air-tight (i.e., hermetically sealed) container for transfer to the TEM for imaging and without exposure to air. A FEI Tecnai G2 F20

Transmission electron microscope (TEM) was used for sample imaging for both bright field and dark field imaging.

Attenuated Total Reflection Fourier Transformed Infrared Resonance (ATR-FTIR) spectrum was collected on a Bruker Alpha FTIR spectrometer. Diamond Optics were used for sample mounting.

X-ray photo-electron spectroscopy (XPS) was conducted a PHI-5600 System, equipped with Al—K X-ray sources. After sample preparation, the sample was stored in an air-tight (i.e., hermetically sealed) container for transfer to the XPS instrument for analysis. Annealed samples were not exposed to air prior to analysis.

Cross-section imaging was performed using a FEI Quanta 400F Scanning Electron Microscope (SEM). The cross-section was prepared by fracturing specimen and followed by a thin layer of Au coating.

Figure 2:
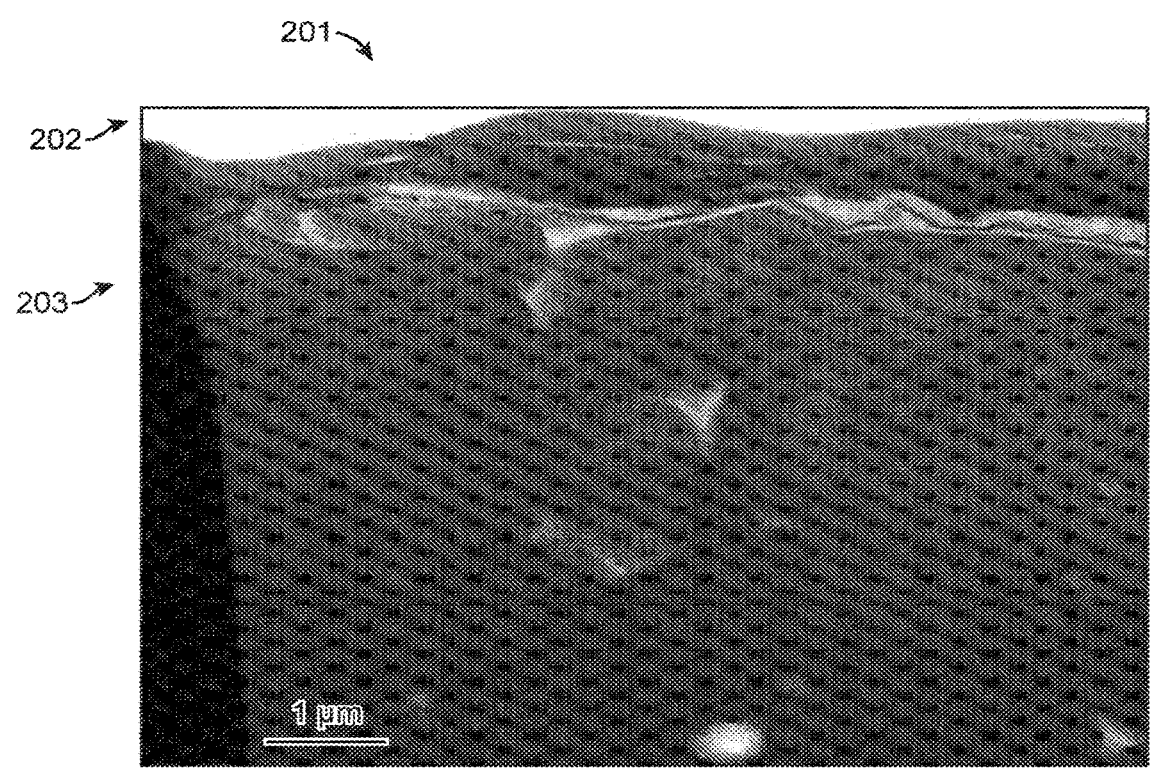
FIG. 2 shows a TEM image of Sample B (treated annealed)—a lithium-stuffed garnet prepared according to Example 2. The scale bar in the image is 1.0 µm.

As shown in the TEM in FIG. 1, Sample A included an electrolyte separator 101. This separator has an observable layer 102 on top of the electrolyte separator 103. As shown in the TEM in FIG. 2, Sample B included electrolyte separator 201. This separator does not have an observable layer on top of electrolyte separator 202. The Sample B (annealed) does not have the surface species which are present on the surface of Sample A.

Figure 3:
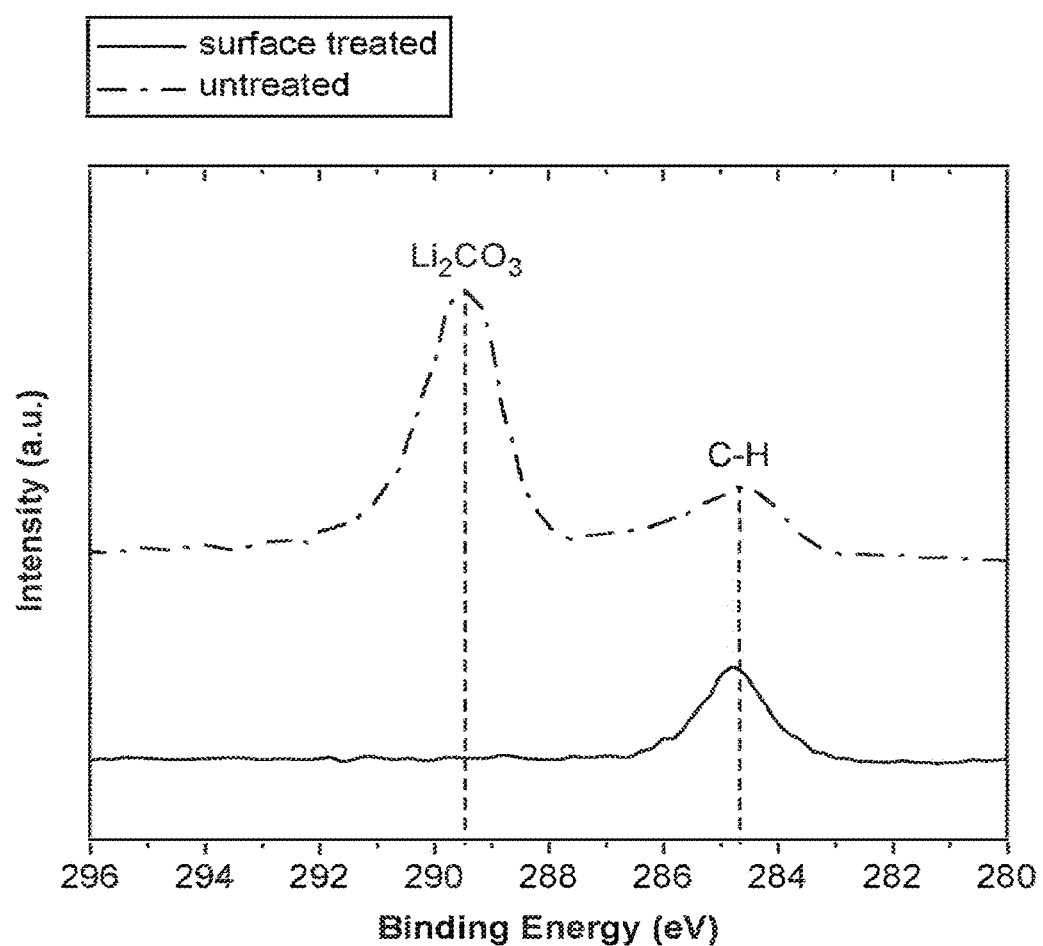
FIG. 3 shows an overlaid x-ray photoelectron spectroscopy (XPS) spectra for lithium-stuffed garnet electrolyte membranes, Sample A and Sample B, prepared according to Example 2.

As shown in the XPS spectrum in FIG. 3, the annealed sample B does not have $Li_2CO_3$ on the surface. The untreated (i.e., unannealed) sample A shows a $Li_2CO_3$ coating on the surface of the electrolyte separator.

As shown in the EPR spectra in FIG. 4, in this example, spin density of Sample B is approximately in the order of $1\times10^{-19}/cm^3$.

Figure 5:
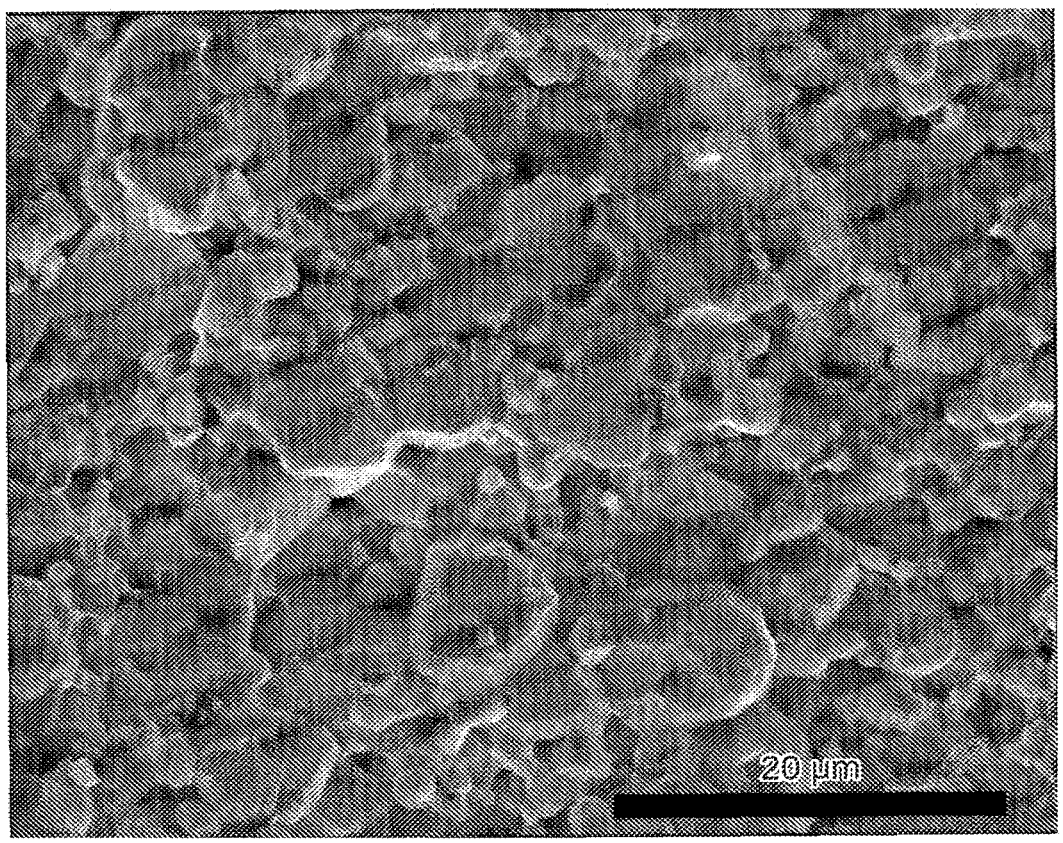
FIG. 5 shows a scanning electron micrograph (SEM) of Sample B prepared according to Example 2.

As shown in the SEM in FIG. 5, the fracture cross-section image evidences small and uniform grain sizes in the electrolyte separator.

As shown in the Raman spectra in FIG. 10, Sample A, which was not annealed, shows Raman stretches characteristic of the garnet crystal structure and can be associated with $ZrO_6$, $LaO_8$ and $LiO_4$ chemical units. Sample B, which was annealed, shows Raman stretches characteristic of the garnet crystal structure and can be associated with $ZrO_6$, $LaO_8$ and $LiO_4$ chemical units and additional peaks at 515, 531 $cm^{-1}$ and 711 $cm^{-1}$. The additional peaks show enhanced surface features in Sample B which are observable on account of the removal of the surface species through the annealing methods in Example 2.

These results show that electrolyte separators having grain sizes between 5 μm and 20 μm, and thicknesses between 80-100 μm, can be prepared by Example 1 and subsequently annealed according to Example 2. Samples produced by Example 1, when exposed to air, have a surface layer (about 2 nm in thickness or more) which includes $LiCO_3$, LiOH, other surface species. By annealing these samples according to Example 2, herein, these surface species can be removed.

Example 4—Electrochemical Characterization—EIS

Figure 6:
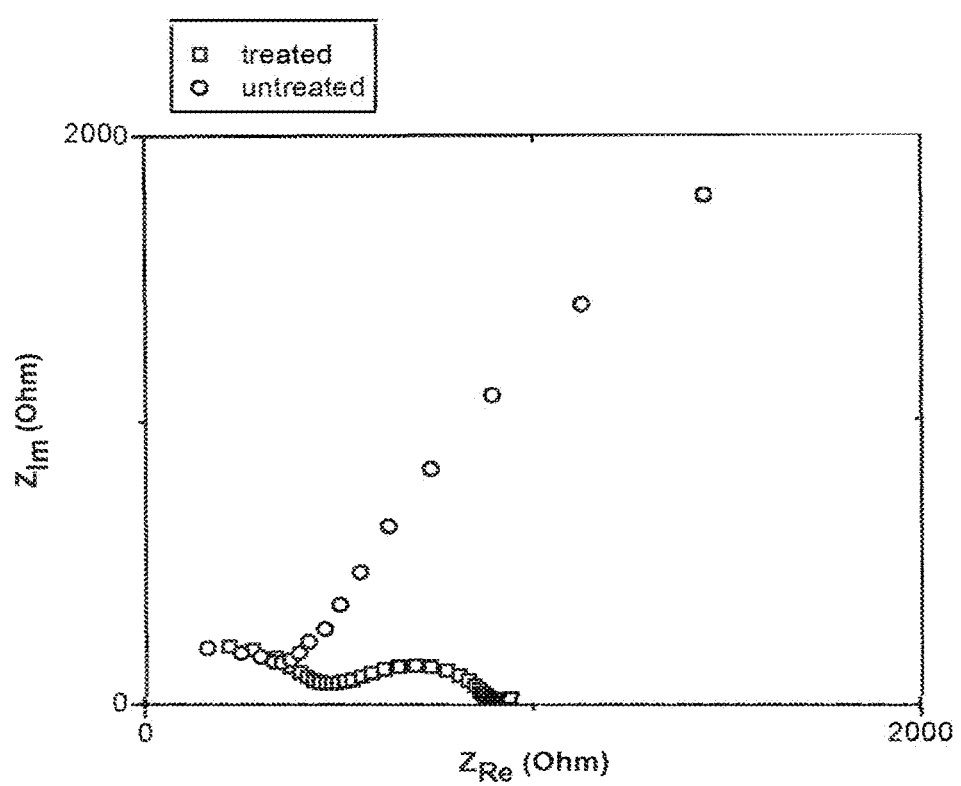
FIG. 6 shows overlaid electrical impedance spectra for Samples (untreated) A and B (treated annealed).
Figure 7:
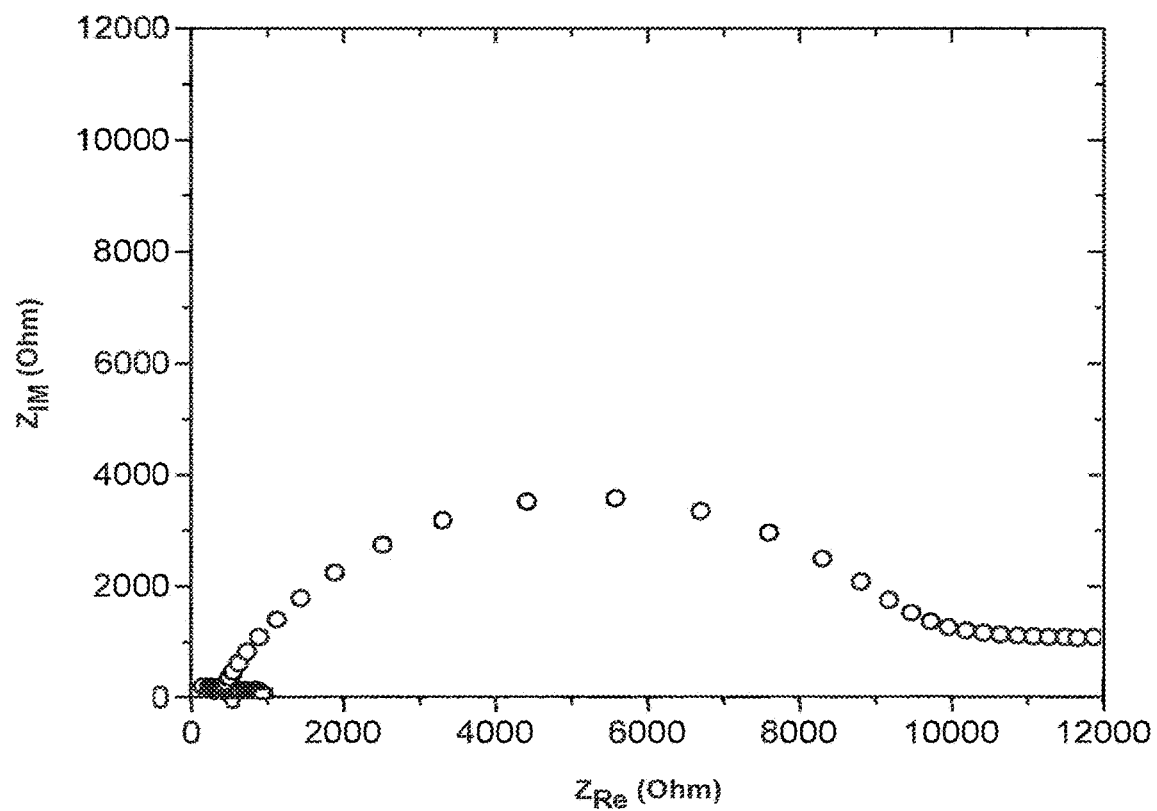
FIG. 7 shows a reduced magnification of FIG. 6.

In some examples, a two (2) μm thick metallic Li layer was evaporated on both side of the electrolyte separator to create electrodes. The electrolyte having Li layer(s) thereupon was assembled into an electrochemical cell housing. EIS Nyquist plots were collected using a Biologic VMP-300 potential-stat using a frequency range of 1 MHz 1 Hz. The bulk and interfacial impedances were determined by the Nyquist plot FIG. 7 shows an EIS Nyquist plot of a Li-garnet-Li cell for two electrochemical cells, one with a Sample A electrolyte separator and the other with a Sample B electrolyte separator. FIG. 6 is a magnified imagine of the low impedance (high frequency) portion of the EIS signal. This plot shows that the annealed sample, Sample B, has a resistance which is much lower than Sample A, which was not annealed.

| Annealing Temperature | Mean ASR (80 C.) | Mean ASR (50 C.) |
|---|---|---|
| Annealed Sample B | <1 Ω-$cm^2$ | <1 Ω-cm2 |
| Not annealed Sample A | 30 Ω-$cm^2$ | 182 Ω-cm2 |

The ASR values were extrapolated from the EIS measurement at as function of the testing conditions. ASR measurements at both 50° C. and 80° C. confirmed that interfacial ASR was significantly reduced in those cells having Sample B electrolyte separators.

| Condition | Average lateral conductivity at ambient temperature | Standard Deviation percentage |
|---|---|---|
| Annealed Sample B | $1.0*10^{-4}$ S/cm | 6.6% |
| Not annealed Sample A | $7.8*10^{-6}$ S/cm | 13.3% |

The lateral ionic conductivity at ambient temperature (~22° C.) was also improved by two orders of magnitude on average for those cells having Sample B electrolytes as compared to those cells having Sample A electrolytes. Sample B membranes also have a more uniform ionic conductivity across the electrolyte's top or bottom surface as compared to Sample A membranes. The results herein show that at the same current density and testing conditions, Sample A (unannealed) electrolytes have a higher total impedance and also have voltage instability. The results herein show that at the same current density and testing conditions, Sample B (annealed) electrolytes have voltage stability and cycle performance.

Example 5—Electrochemical Characterization—Electrochemical Cycling

In this example, a cell is constructed with two lithium electrodes, one on either side of the solid state electrolyte which in one sample is a Sample A electrolyte and in another sample is a Sample B electrolyte. A constant current was applied across the cell for a predetermined amount of time and then reversed for an equal duration. The cells were then cycled at 130° C. at a current density of 2 mA/$cm^2$ with a charge throughput of 4 mAh/cm2/cycle (about 20 μm Li/cycle).

Figure 8A:
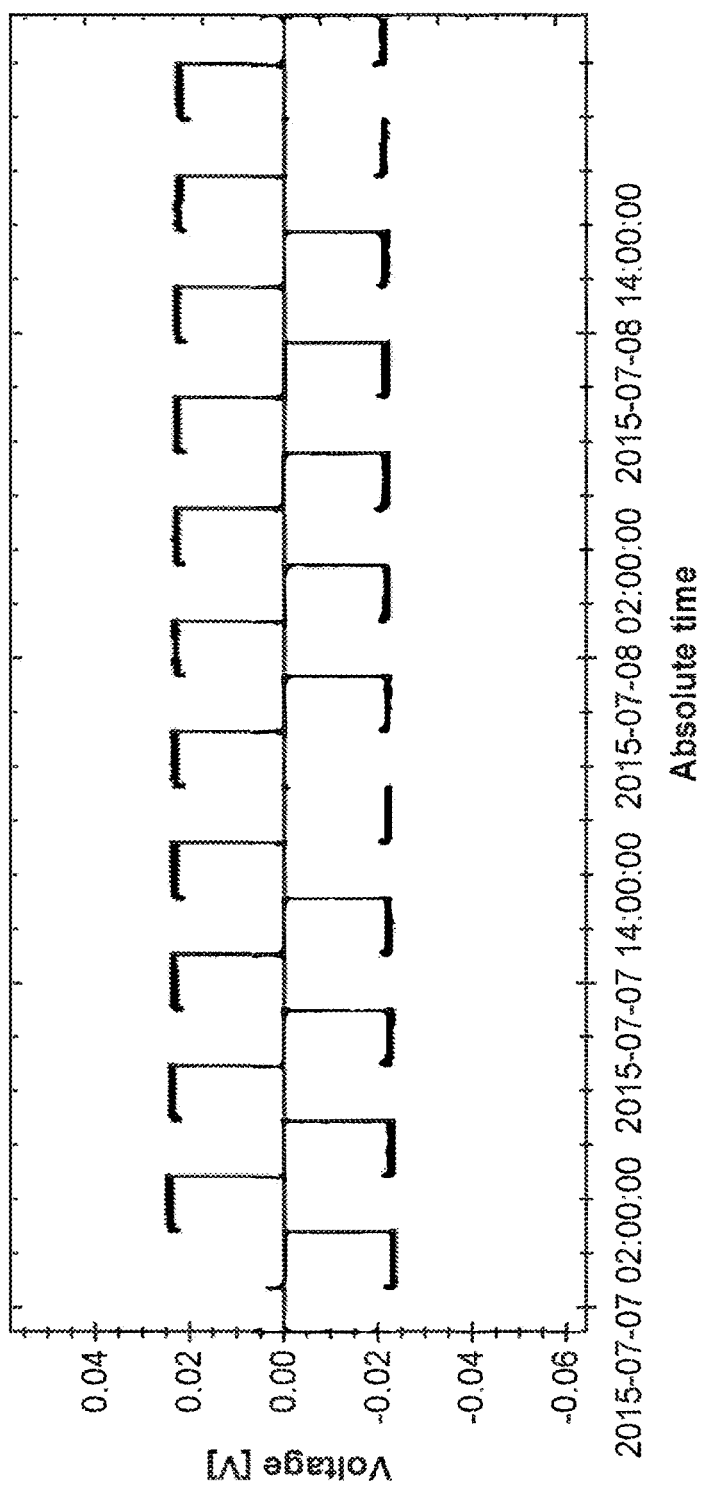
FIG. 8A shows electrochemical cycling data for a lithium-stuffed garnet electrolyte membrane of Sample B, in a symmetric Li-metal cell, which was cycled at 2 $mA/cm^2$, for the first three cycles (FIG. 8A), and then 2 $mA/cm^2$, for forty-six (46 days) at 130° C.
Figure 8B:
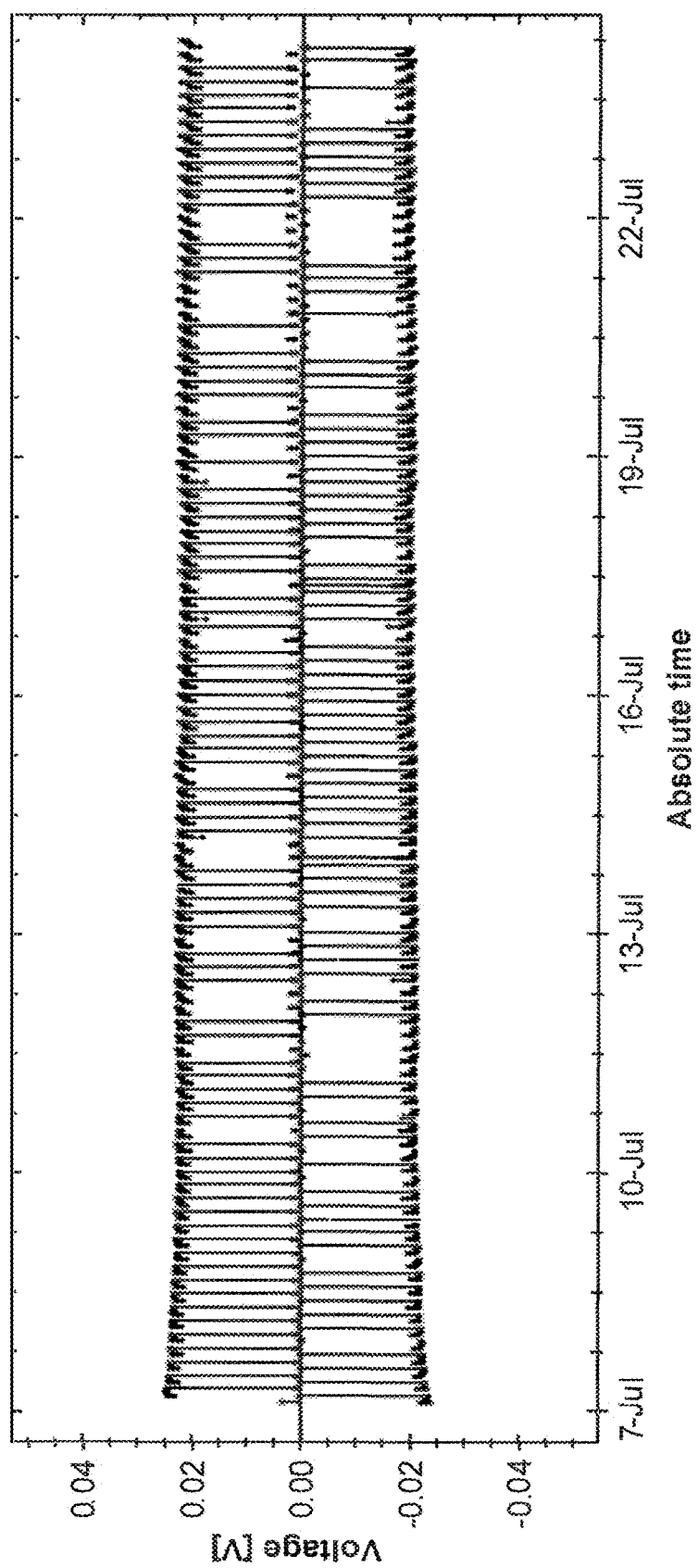
(FIG. 8B). Each cycle passes 20 µm of lithium in both directions (i.e. a half cycle is approximately 4 $mAh/cm^2$).

As shown in FIGS. 8, 9A, and 9B, the electrochemical cell which included the annealed Sample B as the electrolyte membrane was shown to cycle at high current density for more cycles than a garnet electrolyte membrane has been cycled to date. This shows that Sample B electrolyte membranes have a longer cycle life and voltage stability. The voltage stability is evidenced by the flat plateaus in the electrochemical cycling data in FIGS. 8A and 8B.

The cell which included the annealed Sample B as the electrolyte membrane was observed to have a high conductance as evidenced by the total overpotential of about 25 mV at a current density of 2 mA/$cm^2$. This demonstrates a total resistance of 12.5 Ω$cm^2$. This same cell was also observed to have a symmetric and flat voltage profile. This shows that the Sample B electrolyte membrane was cycled reversibly and in a stable condition at a high current density of 2 mA/cm². Prior to the instant disclosure, this high of a current density (>1 mA/cm²) of Li⁺ ions, and for this amount of time which included passing more than 10 μm of lithium per cycle, has not been publically demonstrated for this type of electrolyte membrane.

Example 6—Electrochemical Characterization—Electrochemical Cycling

Figure 11:
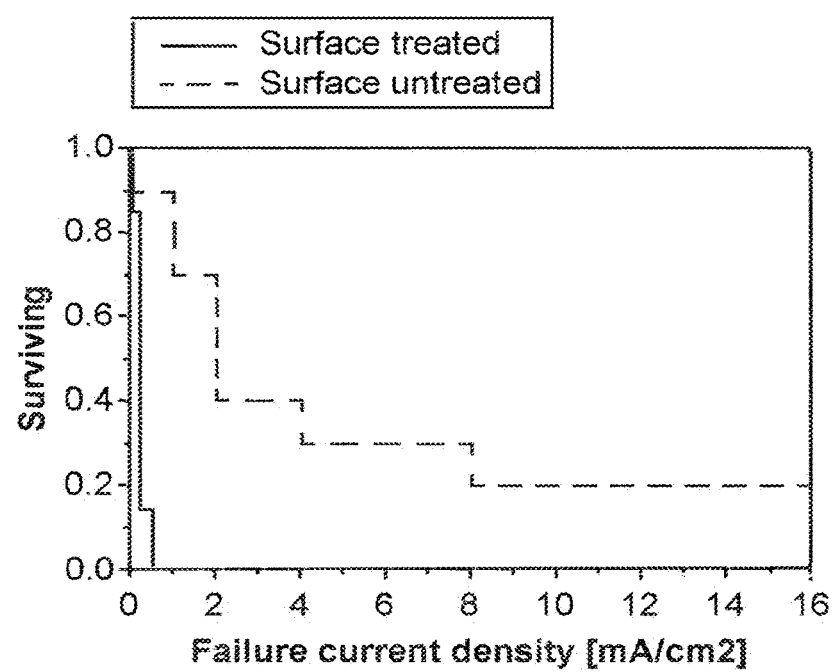
FIG. 11 shows a plot of the survival electrochemical cells as a function of failure current density ($mA/cm^2$).
Figure 12:
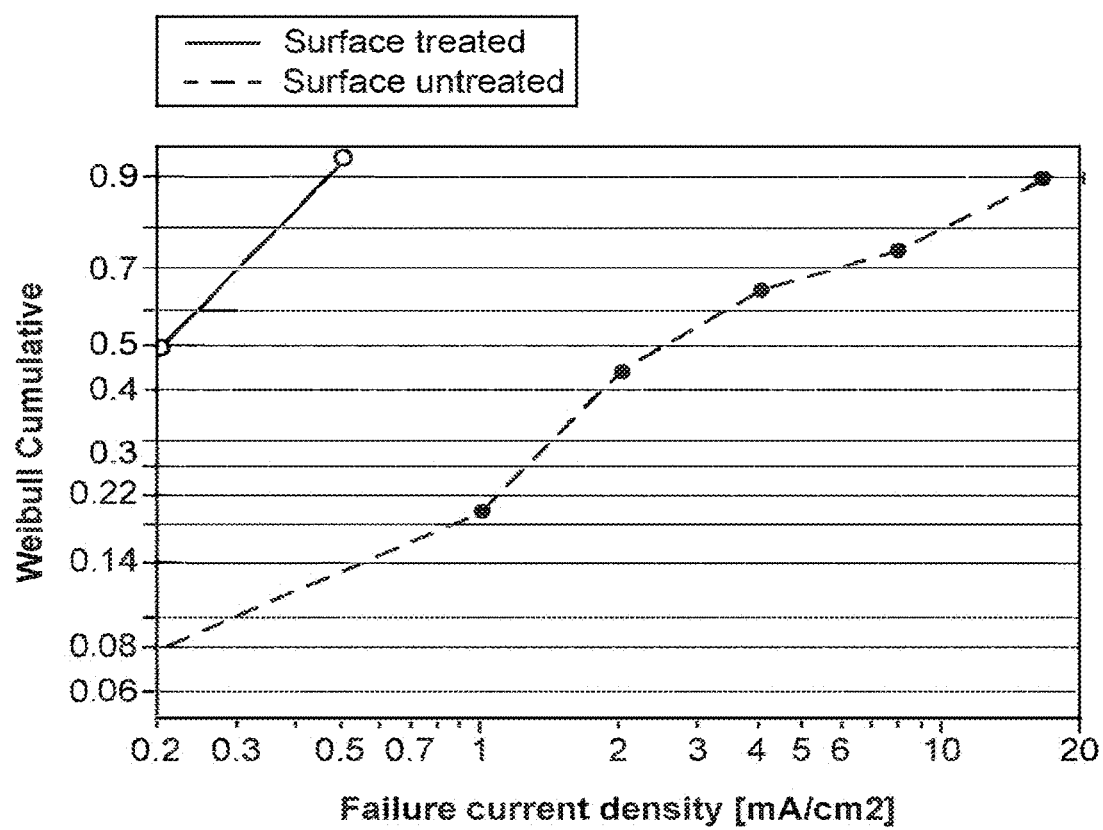
FIG. 12 shows a plot Weibull cumulative failure as a function of current density.

Cells prepared as those cells in Example 5 were tested at various current densities and failure current density was evaluated. Surviving rates were plotted as function of failure current density. A Weibull cumulative plot was generated based on the failure testing data and is plotted as shown in FIGS. 11 and 12.

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An electrolyte separator,
having top and bottom surfaces and a bulk therebetween, wherein the bulk has a thickness;
wherein the top surface or bottom surface length or width is greater than the thickness of the bulk by a factor of ten (10) or more, and the thickness of the bulk is from about 10 nm to about 100 μm;
wherein the bulk is characterized by the chemical formula $$Li_4La_BM'_CM''_DZr_EO_F,$$

$$Li_4La_BM'_CM''_DTa_EO_F, \text{ or}$$

$$Li_4La_BM'_CM''_DNb_EO_F,$$

wherein $4<A<8.5$, $1.5<B<4$, $0 \leq C \leq 2$, $0 \leq D \leq 2$; $0 \leq E < 2$, $10<F<13$, and M' and M" are each, independently in each instance selected from Al, Mo, W, Nb, Sb, Ca, Ba, Sr, Ce, Hf, Rb, and Ta; or
wherein the bulk is characterized by the chemical formula $Li_aLa_bZr_cAl_dMe''_eO_f$, wherein $5<a<7.7$; $2<b<4$; $0<c \leq 2.5$; $0 \leq d<2$; $0 \leq e<2$, $10<f<13$ and Me" is a metal selected from Nb, Ta, V, W, Mo, and Sb;
wherein either the top surface or bottom surface is characterized as having a layer thereupon, greater than 1 nm and less than 1 μm, comprising a lithium carbonate, lithium hydroxide, lithium oxide, lithium peroxide, a hydrate thereof, an oxide thereof, or a combination thereof.

2. The electrolyte separator of claim 1, wherein the bulk is characterized by the formula $Li_xLa_3Zr_2O_z$ $y(Al_2O_3)$, wherein $5 \leq x \leq 7.5$, $11 \leq z \leq 12.25$, and $0 \leq y \leq 1$.

3. The electrolyte separator of claim 2, wherein x is 5, 5.5, 6, 6.5, 7, or 7.5.

4. The electrolyte separator of claim 1, wherein the top surface or bottom surface length or width is from about 100 μm to 100 cm.

5. The electrolyte separator of claim 1, wherein the electrolyte bulk is characterized by the chemical formula
$Li_5La_3Zr_2O_h0.2(Al_2O_3)$, $Li_5La_3Zr_2O_h0.25(Al_2O_3)$,
$Li_5La_3Zr_2O_h0.3(Al_2O_3)$, $Li_5La_3Zr_2O_h0.35(Al_2O_3)$,
$Li_5La_3Zr_2O_h0.4(Al_2O_3)$, $Li_5La_3Zr_2O_h0.45(Al_2O_3)$,
$Li_5La_3Zr_2O_h0.5(Al_2O_3)$, $Li_5La_3Zr_2O_h0.55(Al_2O_3)$,
$Li_5La_3Zr_2O_h0.6(Al_2O_3)$, $Li_5La_3Zr_2O_h0.65(Al_2O_3)$,
$Li_5La_3Zr_2O_h0.7(Al_2O_3)$, $Li_5La_3Zr_2O_h0.75(Al_2O_3)$,
$Li_5La_3Zr_2O_h0.8(Al_2O_3)$, $Li_5La_3Zr_2O_h0.85(Al_2O_3)$,
$Li_5La_3Zr_2O_h0.9(Al_2O_3)$, $Li_5La_3Zr_2O_h0.95(Al_2O_3)$,
$Li_5La_3Zr_2O_h(Al_2O_3)$, $Li_6La_3Zr_2O_h0.2(Al_2O_3)$,
$Li_6La_3Zr_2O_h0.25(Al_2O_3)$, $Li_6La_3Zr_2O_h0.3(Al_2O_3)$,
$Li_6La_3Zr_2O_h0.35(Al_2O_3)$, $Li_6La_3Zr_2O_h0.4(Al_2O_3)$,
$Li_6La_3Zr_2O_h0.45(Al_2O_3)$, $Li_6La_3Zr_2O_h0.5(Al_2O_3)$,
$Li_6La_3Zr_2O_h0.55(Al_2O_3)$, $Li_6La_3Zr_2O_h0.6(Al_2O_3)$,
$Li_6La_3Zr_2O_h0.65(Al_2O_3)$, $Li_6La_3Zr_2O_h0.7(Al_2O_3)$,
$Li_6La_3Zr_2O_h0.75(Al_2O_3)$, $Li_6La_3Zr_2O_h0.8(Al_2O_3)$,
$Li_6La_3Zr_2O_h0.85(Al_2O_3)$, $Li_6La_3Zr_2O_h0.9(Al_2O_3)$,
$Li_6La_3Zr_2O_h0.95(Al_2O_3)$, $Li_6La_3Zr_2O_h(Al_2O_3)$,
$Li_7La_3Zr_2O_h0.2(Al_2O_3)$, $Li_7La_3Zr_2O_h0.25(Al_2O_3)$,
$Li_7La_3Zr_2O_h0.3(Al_2O_3)$, $Li_7La_3Zr_2O_h0.35(Al_2O_3)$,
$Li_7La_3Zr_2O_h0.4(Al_2O_3)$, $Li_7La_3Zr_2O_h0.45(Al_2O_3)$,
$Li_7La_3Zr_2O_h0.5(Al_2O_3)$, $Li_7La_3Zr_2O_h0.55(Al_2O_3)$,
$Li_7La_3Zr_2O_h0.6(Al_2O_3)$, $Li_7La_3Zr_2O_h0.65(Al_2O_3)$,
$Li_7La_3Zr_2O_h0.7(Al_2O_3)$, $Li_7La_3Zr_2O_h0.75(Al_2O_3)$,
$Li_7La_3Zr_2O_h0.8(Al_2O_3)$, $Li_7La_3Zr_2O_h0.85(Al_2O_3)$,
$Li_7La_3Zr_2O_h0.9(Al_2O_3)$, $Li_7La_3Zr_2O_h0.95(Al_2O_3)$, or $Li_7La_3Zr_2O_h(Al_2O_3)$;
wherein subscript h is a rational number from 11 to 12.25 and is selected to maintain charge neutrality.

6. The electrolyte separator of claim 5, wherein subscript h is 12.

7. The electrolyte separator of claim 1, wherein the bulk of the electrolyte separator is characterized by a chemical formula different from the top surface or bottom surface of the electrolyte separator.

8. The electrolyte separator of claim 1,
wherein the bulk of the electrolyte separator is characterized by the chemical formula $Li_{x1}La_3Zr_2O_{12}$ $y(Al_2O_3)$, wherein $5 \leq x1 \leq 7.5$ and $0 \leq y \leq 1$;
wherein the top surface or bottom surface or both is/are characterized by the chemical formula $Li_{x2}La_3Zr_2O_{12}$ $y(Al_2O_3)$, wherein $5 \leq x2 \leq 7.5$ and $0 \leq y \leq 1$;
wherein x2 is less than x1.

9. The electrolyte separator of claim 1, wherein either the top surface or bottom surface is characterized as having less than a 0.5 μm thick layer thereupon comprising a lithium carbonate, lithium hydroxide, lithium oxide, lithium peroxide, a hydrate thereof, an oxide thereof, or a combination thereof.

10. The electrolyte separator of claim 9, wherein either the top surface or bottom surface is characterized as having less than a 0.35 μm thick layer thereupon comprising a lithium carbonate, lithium hydroxide, lithium oxide, lithium peroxide, a hydrate thereof, an oxide thereof, or a combination thereof.

11. The electrolyte separator of claim 10, wherein either the top surface or bottom surface is characterized as having less than a 0.25 μm thick layer thereupon comprising a lithium carbonate, lithium hydroxide, lithium oxide, lithium peroxide, a hydrate thereof, an oxide thereof, or a combination thereof.

12. The electrolyte separator of claim 11, wherein either the top surface or bottom surface is characterized as having less than a 0.15 µm thick layer thereupon comprising a lithium carbonate, lithium hydroxide, lithium oxide, lithium peroxide, a hydrate thereof, an oxide thereof, or a combination thereof.

13. The electrolyte separator of claim 12, wherein either the top surface or bottom surface is characterized as having less than a 0.1 µm thick layer thereupon comprising a lithium carbonate, lithium hydroxide, lithium oxide, lithium peroxide, a hydrate thereof, an oxide thereof, or a combination thereof.

14. The electrolyte separator of claim 13, wherein either the top surface or bottom surface is characterized as having less than a 0.05 µm thick layer thereupon comprising a lithium carbonate, lithium hydroxide, lithium oxide, lithium peroxide, a hydrate thereof, an oxide thereof, or a combination thereof.

15. The electrolyte separator of claim 1, wherein both the top surface and bottom surfaces are characterized as having a similar thickness layer thereupon comprising a lithium carbonate, lithium hydroxide, lithium oxide, lithium peroxide, a hydrate thereof, an oxide thereof, or a combination thereof.

16. The electrolyte separator of claim 1, wherein both the top surface and bottom surfaces are characterized as having no secondary phases present on the top surface or bottom surface, wherein secondary phases are selected from $LiAlO_2$, $Li_2ZrO_3$, $LaAlO_3$, $Li_5AlO_4$, $Li_6Zr_2O_7$, $La_2(Li_xAl_{1-x})O_4$, wherein x is from 0 to 1, or combinations thereof.

17. The electrolyte separator of claim 1, wherein both the top surface and bottom surfaces are characterized as having the same thickness layer thereupon comprising a lithium carbonate, lithium hydroxide, lithium oxide, lithium peroxide, a hydrate thereof, an oxide thereof, or a combination thereof.

18. The electrolyte separator of claim 1, having a Li-metal interface area specific resistance between 0 and 15 $\Omega cm^2$ at 60° C.

19. The electrolyte separator of claim 18, wherein the Li-metal interface area specific resistance is less than 2 $\Omega cm^2$ at 60° C.

20. The electrolyte separator of claim 1, having a Li-metal interface area specific resistance of less than 2 $\Omega cm^2$ at 25° C.

21. The electrolyte separator of claim 1, having a Li-metal interface area specific resistance of less than 20 $\Omega cm^2$ at −25° C.

22. The electrolyte separator of claim 1, wherein the separator is a pellet, a film, free-standing film, or a monolith.

23. The electrolyte separator of claim 1, wherein the lithium carbonate is characterized by $Li_x(CO_3)_y$ and x is from greater than 0 to less than or equal to 2, and y is from greater than 0 to less than or equal to 1.

24. The electrolyte separator of claim 1, wherein the lithium hydroxide is characterized by $Li_x(OH)_y$ and x and y are each, independently, from greater than 0 to less than or equal to 1.

25. The electrolyte separator of claim 1, wherein the lithium oxide is characterized by $Li_xO_y$ and x and y are each, independently, from greater than 0 to less than or equal to 2.

26. The electrolyte separator of claim 1, wherein the electrolyte separator is characterized by an EPR spectrum having a spin density of approximately in the order of $1 \times 10^{-18}$ $cm^3$ to $1 \times 10^{-20}/cm^3$.

27. The electrolyte separator of claim 1, wherein the top surface or bottom surface is characterized by an FT-1R spectrum substantially absent of peaks corresponding to $Li_2CO_3$.

28. The electrolyte separator of claim 1, wherein the top surface or bottom surface is characterized by a Raman spectrum having stretches characteristic of the garnet crystal structure and associated with $ZrO_6$, $LaO_8$ and $LiO_4$ chemical units and additional peaks at 515, 531 $cm^{-1}$ and 711 $cm^{-1}$.

29. The electrolyte separator of claim 1, wherein the top surface or bottom surface is in direct contact with Li-metal.

30. The electrolyte separator of claim 1, having a top surface or bottom surface that has a carbon concentration at the surface of less than 5 atomic %.

31. The electrolyte separator of claim 30, wherein the atomic % of carbon is measured by XPS.

32. The electrolyte separator of claim 1, having a top surface or bottom surface that has a hydrogen concentration at the surface of less than 5 atomic %.

33. The electrolyte separator of claim 32, wherein the atomic % of hydrogen is measured by SIMS.

34. The electrolyte separator of claim 1, having an oxygen (O) vacancy concentration characterized by an EPR signal spin density of $1 \times 10^{-18}/cm^3$ to $1 \times 10^{-20}/cm^3$.

35. The electrolyte separator of claim 34, having a spin density equal to about $1 \times 10^{-19}/cm^3$.

36. An electrochemical cell comprising a positive electrode, a negative electrode, and an electrolyte between the positive and negative electrode, wherein the electrolyte comprises the electrolyte separator of claim 1.

37. A method of cycling lithium through a solid state lithium ion conducting ceramic, comprising
providing an electrolyte separator according claim 1, in contact with a lithium metal anode;
applying a pressure of at least 300 pounds per square inch (PSI) to the electrolyte separator and anode; and
cycling at least 10 µm of lithium metal at a current of at least 1 $mA/cm^2$ or greater.

38. A method of cycling lithium through a solid state lithium ion conducting ceramic, comprising
providing an electrolyte separator according to claim 1 in contact with a lithium metal anode;
applying a pressure of at least 20 PSI to the electrolyte separator and anode; and
cycling at least 20 µm of lithium metal at a current of at least 2 $mA/cm^2$ or greater.

39. The method of claim 38, comprising applying a pressure of at least 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, or 320 PSI to the electrolyte separator and anode.

40. The method of claim 38, comprising applying a pressure of at least 320 PSI to the electrolyte separator and anode.

41. An electrochemical cell comprising the electrolyte separator of claim 1, wherein the electrochemical cell further includes a gel electrolyte.

42. An electrochemical cell comprising the electrolyte separator of claim 1, wherein the electrochemical cell further includes a gel electrolyte between the positive electrode active material and the electrolyte separator.

43. The electrochemical cell of any one of claims 41-42 wherein the gel comprises a solvent, a lithium salt, and a polymer.

44. The electrochemical cell of claim 43, wherein the solvent is ethylene carbonate, propylene carbonate, diethylene carbonate, methylene carbonate, or a combination thereof.

45. The electrochemical cell of claim 43, wherein the lithium salt is $LiPF_6$, LiBOB, or LFTSi.

46. The electrochemical cell of claim 43, wherein the polymer is PVDF-HFP.

47. The electrolyte separator of claim 1, made by a process which comprises a step of annealing the top surface or bottom surface at a temperature of 350° C. or higher.

* * * * *